(12) United States Patent
Kohno et al.

(10) Patent No.: US 8,219,702 B2
(45) Date of Patent: Jul. 10, 2012

(54) VIDEO DELIVERY APPARATUS AND METHOD

(75) Inventors: Akihiro Kohno, Tokyo (JP); Takao Fujita, Yokohama (JP); Yoshiro Hikida, Inagi (JP); Toshiyuki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1958 days.

(21) Appl. No.: 11/119,055

(22) Filed: Apr. 29, 2005

(65) Prior Publication Data

US 2005/0262258 A1  Nov. 24, 2005

(30) Foreign Application Priority Data

Apr. 30, 2004 (JP) .................................. 2004-136019
Apr. 30, 2004 (JP) .................................. 2004-136022
Apr. 30, 2004 (JP) .................................. 2004-136023

(51) Int. Cl.
*G06F 15/16* (2006.01)

(52) U.S. Cl. ......... 709/232; 709/226; 709/229; 709/231

(58) Field of Classification Search .......... 709/225–227, 709/229–235
See application file for complete search history.

(56) References Cited

U.S. PATENT DOCUMENTS

| 5,809,298 | A | | 9/1998 | Nakada | |
|---|---|---|---|---|---|
| 6,133,941 | A | * | 10/2000 | Ono | 348/14.05 |
| 6,631,240 | B1 | * | 10/2003 | Salesin et al. | 386/290 |
| 6,986,139 | B1 | * | 1/2006 | Kubo | 718/105 |
| 6,996,630 | B1 | * | 2/2006 | Masaki et al. | 709/239 |
| 7,099,826 | B2 | | 8/2006 | Akabane et al. | |
| 7,502,834 | B2 | * | 3/2009 | Ehrich et al. | 709/217 |
| 2003/0005453 | A1 | * | 1/2003 | Rodriguez et al. | 725/87 |
| 2003/0167472 | A1 | * | 9/2003 | Barbanson et al. | 725/131 |
| 2005/0076136 | A1 | * | 4/2005 | Cho et al. | 709/231 |

(Continued)

FOREIGN PATENT DOCUMENTS

JP  06-125411  5/1994

(Continued)

OTHER PUBLICATIONS

The above references were cited in a Apr. 10, 2009 Japanese Office Action that issued in Japanese Patent Application No. 2004-136019, a copy of which is enclosed without English Translation.

*Primary Examiner* — Hieu Hoang
*Assistant Examiner* — Julian Chang
(74) *Attorney, Agent, or Firm* — Cowan, Liebowitz & Latman, P.C.

(57) ABSTRACT

A video delivery apparatus for delivering a video stream with a property according to a request from a client. The video delivery apparatus includes reception means for receiving a delivery request from one client, first estimation means for estimating a current processing load by calculating a sum total of the processing loads for other clients connected to deliver a video stream upon reception of the delivery request from the one client, second estimation means for estimating a processing load upon delivering the video stream to the one client according to the delivery request, and delivery control means for performing the delivery control of the video stream on the basis of at least one of the current processing load estimated by the first estimation means and the processing load upon delivering the video stream to the one client according to the delivery request, which is estimated by the second estimation means.

15 Claims, 70 Drawing Sheets

U.S. PATENT DOCUMENTS

2008/0106597 A1 * 5/2008 Amini et al. .................. 348/143

FOREIGN PATENT DOCUMENTS

| JP | 08-083232 A | 3/1996 |
| --- | --- | --- |
| JP | 08-317384 A | 11/1996 |
| JP | 10-164420 | 6/1998 |
| JP | 2002-152307 A | 5/2002 |
| JP | 2002-261860 A | 9/2002 |
| JP | 2002-358092 A | 12/2002 |
| JP | 2003-009126 | 1/2003 |
| JP | 2003-015836 A | 1/2003 |
| JP | 2003-069638 A | 3/2003 |
| JP | 2003-299062 A | 10/2003 |
| JP | 2004-021329 A | 1/2004 |

* cited by examiner

FIG. 4

| FORMAT | SIZE | LOAD |
|---|---|---|
| JPEG | 800 × 600 | 25 |
| | 640 × 480 | 16 |
| | 320 × 240 | 4 |
| | 160 × 120 | 1 |

| VIEWER | IMAGE SIZE |
|---|---|
| VIEWER 109-1 | 640 × 480 |
| VIEWER 109-2 | 160 × 120 |
| ⋮ | ⋮ |
|  |  |

| FORMAT | SIZE | CAMERA CONTROL | LOAD |
|---|---|---|---|
| JPEG | 800 × 600 | ON | 26 |
| | | OFF | 25 |
| | 640 × 480 | ON | 17 |
| | | OFF | 16 |
| | 320 × 240 | ON | 5 |
| | | OFF | 4 |
| | 160 × 120 | ON | 2 |
| | | OFF | 1 |

| VIEWER | IMAGE SIZE | CAMERA CONTROL |
|---|---|---|
| VIEWER 109-1 | 640 × 480 | OFF |
| VIEWER 109-2 | 160 × 120 | ON |
| ⋮ | ⋮ | ⋮ |
| | | |

| FORMAT | SIZE | CAMERA CONTROL |
|---|---|---|
| JPEG | 320 × 240 | ON |
| | | OFF |
| | 160 × 120 | ON |
| | | OFF |

270

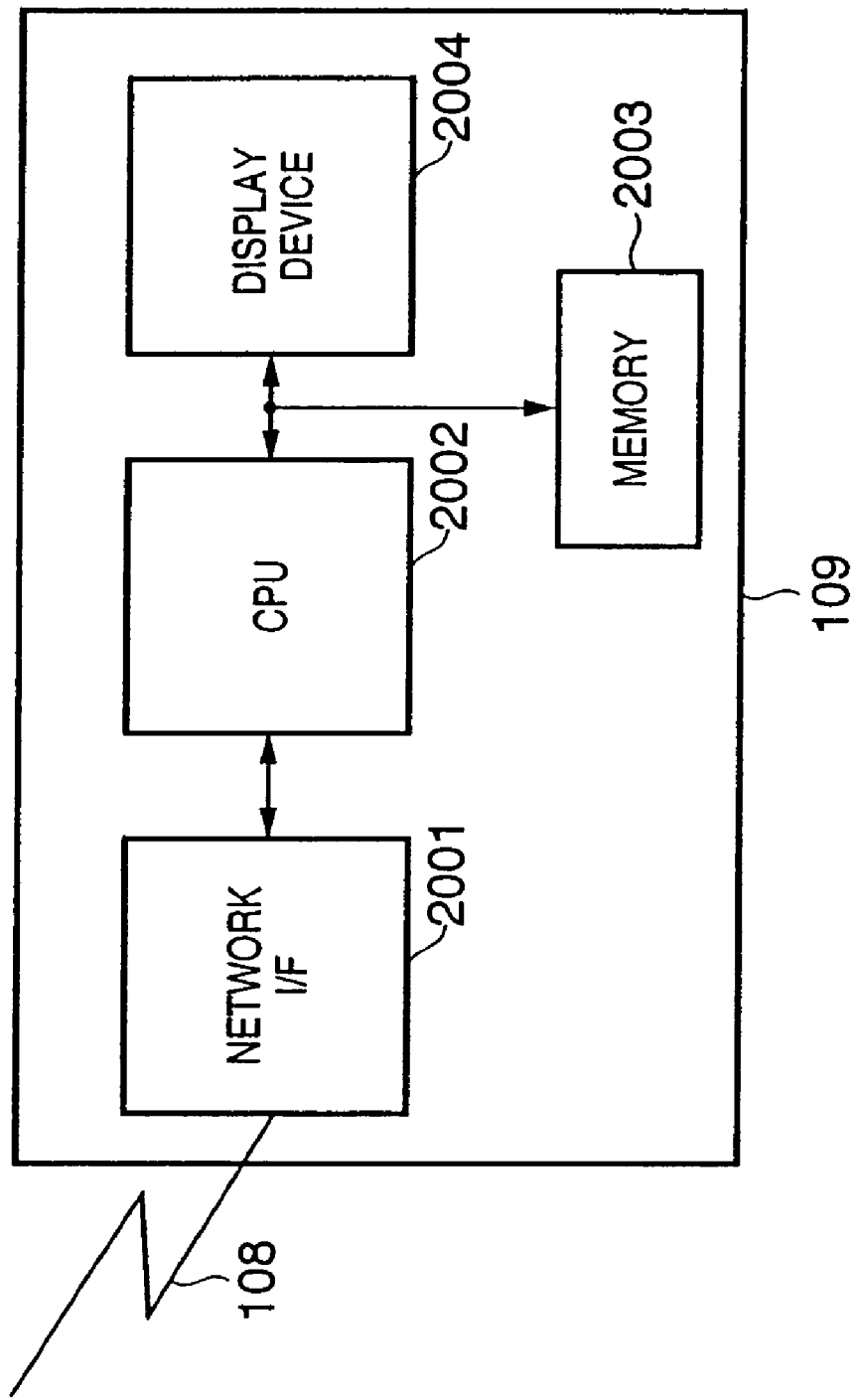

FIG. 18

| FORMAT | SIZE | CAMERA CONTROL | LOAD |
|---|---|---|---|
| JPEG | 800 × 600 | ON | 26 |
| | | OFF | 25 |
| | 640 × 480 | ON | 17 |
| | | OFF | 16 |
| | 320 × 240 | ON | 5 |
| | | OFF | 4 |
| | 160 × 120 | ON | 2 |
| | | OFF | 1 |

| FORMAT | SIZE | CAMERA CONTROL |
|---|---|---|
| JPEG | 320 × 240 | ON |
| | | OFF |
| | 160 × 120 | ON |
| | | OFF |

| VIEWER | IMAGE SIZE | CAMERA CONTROL |
|---|---|---|
| VIEWER 109-1 | 800 × 600 | OFF |
| VIEWER 109-2 | 160 × 120 | ON |
| VIEWER 109-3 | 640 × 480 | OFF |
| VIEWER 109-4 | 800 × 6000 | OFF |
| ⋮ | ⋮ | ⋮ |
|  |  |  |

| FORMAT | SIZE | CAMERA CONTROL | PRIORITY |
|---|---|---|---|
| JPEG | 800 × 600 | ON | 0 |
| | | OFF | 0 |
| | 640 × 480 | ON | 10 |
| | | OFF | 10 |
| | 320 × 240 | ON | 2 |
| | | OFF | 0 |
| | 160 × 120 | ON | 2 |
| | | OFF | 2 |

| FORMAT | SIZE | CAMERA CONTROL | PRIORITY-DEPENDENT LOAD ASSUMED VALUE |
|---|---|---|---|
| JPEG | 800 × 600 | ON | 26 |
| | | OFF | 25 |
| | 640 × 480 | ON | 27 |
| | | OFF | 26 |
| | 320 × 240 | ON | 7 |
| | | OFF | 4 |
| | 160 × 120 | ON | 4 |
| | | OFF | 3 |

| FORMAT | SIZE | CAMERA CONTROL |
|---|---|---|
| JPEG | 800 × 600 | OFF |
| | 320 × 240 | ON |
| | | OFF |
| | 160 × 120 | ON |
| | | OFF |

| VIEWER | PRIORITY |
|---|---|
| VIEWER 109-1 | 10 |
| VIEWER 109-2 | 20 |
| VIEWER 109-3 | 20 |
| VIEWER 109-4 | 0 |
| ⋮ | ⋮ |
|  |  |

| FORMAT | SIZE | CAMERA CONTROL | PRIORITY-DEPENDENT LOAD ASSUMED VALUE |
|---|---|---|---|
| JPEG | 800 × 600 | ON | 36 |
| | | OFF | 35 |
| | 640 × 480 | ON | 27 |
| | | OFF | 26 |
| | 320 × 240 | ON | 15 |
| | | OFF | 14 |
| | 160 × 120 | ON | 12 |
| | | OFF | 11 |

| FORMAT | SIZE | CAMERA CONTROL | LOAD |
|---|---|---|---|
| JPEG | 800 × 600 | ON | 26 |
| | | OFF | 25 |
| | 640 × 480 | ON | 17 |
| | | OFF | 16 |
| | 640 × 480 (ENLARGEMENT OF 320 × 240) | ON | 9 |
| | | OFF | 8 |
| | 320 × 240 | ON | 5 |
| | | OFF | 4 |
| | 160 × 120 | ON | 2 |
| | | OFF | 1 |

| FORMAT | SIZE | MEASURED VALUE | |
|---|---|---|---|
| JPEG | 800 × 600 | | ~3405 |
| | 640 × 480 | | ~3402 |
| | 320 × 240 | | ~3403 |
| | 160 × 120 | | ~3404 |

| | | |
|---|---|---|
| NON-LOAD DATA | | ~3401 |
| DELIVERY LOAD DATA | | ~3406 |

1320

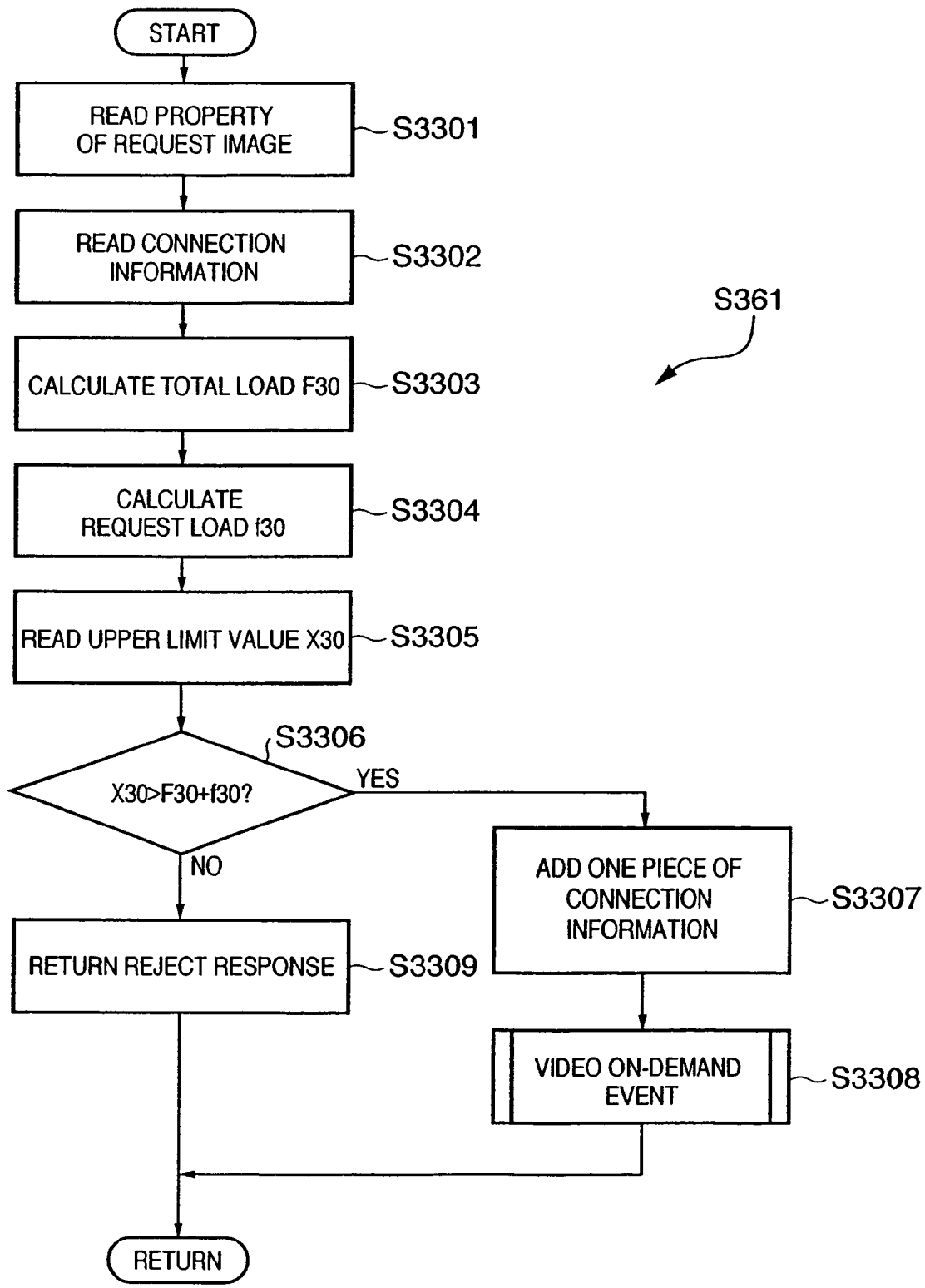

FIG. 39

| VIEWER | IMAGE SIZE | VIDEO TRANSMISSION RATE |
|---|---|---|
| VIEWER 109-1 | 640 × 480 | 30 |
| VIEWER 109-2 | 160 × 120 | 30 |
| ⋮ | ⋮ | ⋮ |
|  |  |  |

260

F I G. 40
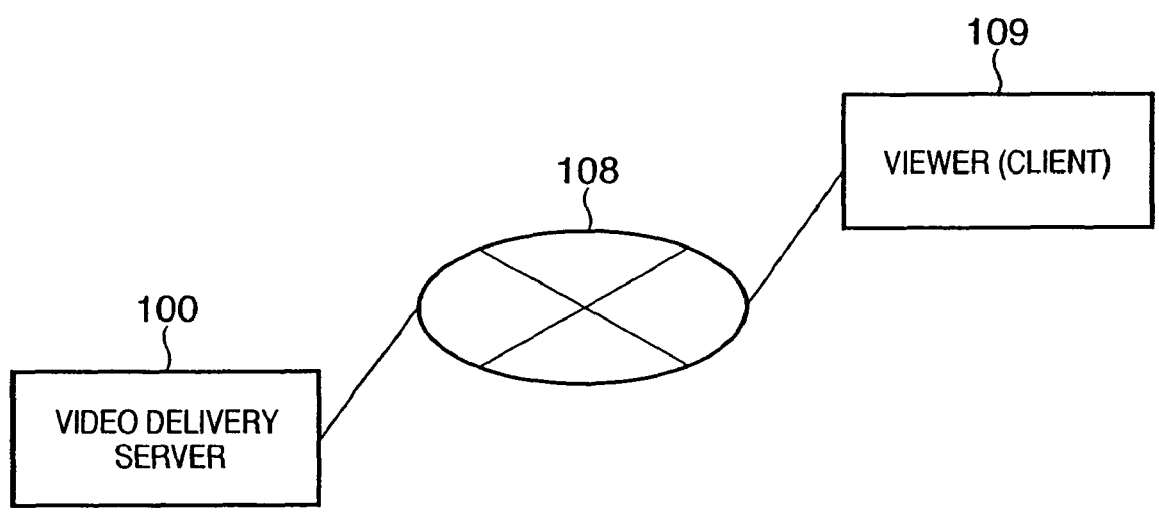

FIG. 45

| POLICY | FUNCTION | REMARKS |
|---|---|---|
| RESOLUTION PRIORITY | S1 | PRIORITY UP OF LARGE IMAGE |
| FRAME RATE PRIORITY | S2 | PRIORITY UP OF LIGHT LOAD |
| SERVER OPTIMUM | S3 | HANDLE SUBSTITUTE STREAMS SO AS NOT TO EXCEED SERVER LOAD |
| CLIENT OPTIMUM | S4 | SUBSTITUTE STREAM NG |
| ………. | ………. | ………. |
|  |  |  |

FIG. 52

| PROCESSING NUMBER | PRIORITY | PROCESSING TYPE | ENCODING METHOD | RESOLUTION | QUALITY 1 | QUALITY 2 | CONNECTION COUNT |
|---|---|---|---|---|---|---|---|
| 0 | 0 | COMPRESSION | M-JPEG | 320×240 | Q=50 | 30fps | 10 |
| 1 | 1 | COMPRESSION | M-JPEG | 800×600 | Q=40 | 30fps | 2 |
| 2 | 2 | EXPANSION | M-JPEG | 320×240 | Q=50 | 30fps | 1 |
| 3 | 3 | COMPRESSION | MPEG4 | 320×240 | bitrate=128kbps | 30fps | 4 |
| 4 | 4 | COMPRESSION | MPEG4 | 160×120 | bitrate=64kbps | 20fps | 2 |
| 5 | 5 | COMPRESSION | M-JPEG | 640×480 | Q=80 | 15fps | 1 |

F I G. 54
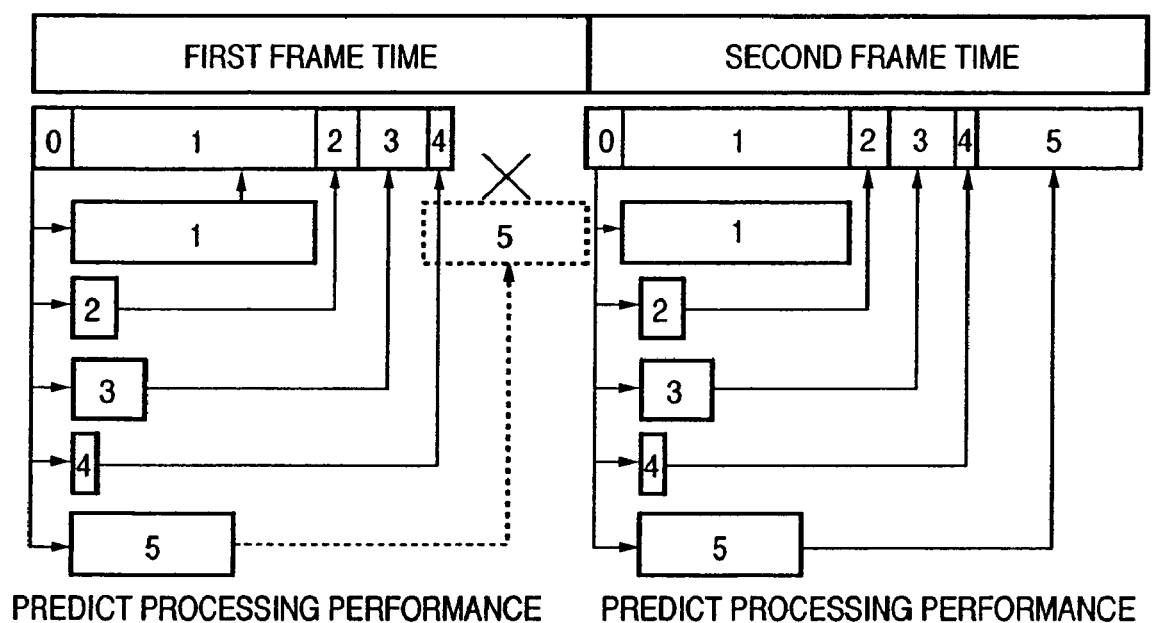

F I G. 57A

| PROCESSING NUMBER | PRIORITY | PROCESSING TYPE | ENCODING METHOD | RESOLUTION | QUALITY 1 | QUALITY 2 | CONNECTION COUNT |
|---|---|---|---|---|---|---|---|
| 0 | 1 | COMPRESSION | M-JPEG | 320×240 | Q=50 | 30fps | 10 |
| 1 | 2 | COMPRESSION | M-JPEG | 1024×768 | Q=40 | 30fps | 2 |
| 2 | 2 | COMPRESSION | MPEG4 | 320×240 | bitrate=128kbps | 30fps | 4 |
| NEW 3 | 3 | COMPRESSION | M-JPEG | 160×120 | Q=50 | 30fps | 1 |

F I G. 57B

| PROCESSING NUMBER | PRIORITY | PROCESSING TYPE | ENCODING METHOD | RESOLUTION | QUALITY 1 | QUALITY 2 | CONNECTION COUNT |
|---|---|---|---|---|---|---|---|
| 0 | 2 | COMPRESSION | M-JPEG | 320 × 240 | Q=50 | 30fps | 10 |
| 1 | 2 | COMPRESSION | M-JPEG | 1024 × 768 | Q=40 | 30fps | 2 |
| 2 | 2 | COMPRESSION | MPEG4 | 320 × 240 | bitrate=128kbps | 30fps | 4 |
| 3 | 1 | COMPRESSION | M-JPEG | 160 × 120 | Q=50 | 30fps | 1 |
| NEW 4 | 3 | COMPRESSION | M-JPEG | 640 × 480 | Q=80 | 30fps | 1 |
| NEW 5 | 3 | COMPRESSION | M-JPEG | 320 × 240 | Q=30 | 30fps | 1 |
| NEW 6 | 3 | COMPRESSION | M-JPEG | 320 × 240 | Q=50 | 15fps | 1 |

F I G. 60

| PROCESSING NUMBER | PRIORITY | PROCESSING TYPE | ENCODING METHOD | RESOLUTION | QUALITY 1 | QUALITY 2 | CONNECTION COUNT |
|---|---|---|---|---|---|---|---|
| 0 | 1 | COMPRESSION | M-JPEG | 320×240 | Q=50 | 30fps | 10 |
| 1 | 0 | COMPRESSION | M-JPEG | 800×600 | Q=80 | 30fps | 0 (STORAGE) |
| 2 | 1 | COMPRESSION | M-JPEG | 320×240 | Q=50 | 30fps | 1 |
| 3 | 2 | COMPRESSION | MPEG4 | 320×240 | bitrate=128kbps | 30fps | 4 |
| 4 | 3 | COMPRESSION | MPEG4 | 160×120 | bitrate=64kbps | 20fps | 2 |
| 5 | 3 | COMPRESSION | M-JPEG | 640×480 | Q=50 | 15fps | 1 |

FIG. 62

| PROCESSING NUMBER | PRIORITY | PROCESSING TYPE | ENCODING METHOD | RESOLUTION | QUALITY 1 | QUALITY 2 | QUALITY 3 | CONNECTION COUNT |
|---|---|---|---|---|---|---|---|---|
| 0 | 1 | COMPRESSION | M-JPEG | 320×240 | Q=50 | 30fps | REAL TIME | 10 |
| 1 | 0 | COMPRESSION | M-JPEG | 800×600 | Q=80 | 30fps | REAL TIME | 0 (STORAGE) |
| 2 | 1 | EXPANSION | M-JPEG | 320×240 | Q=50 | 30fps | ......... | 1 |
| 3 | 2 | COMPRESSION | MPEG4 | 320×240 | bitrate=128kbps | 30fps | ......... | 4 |
| 4 | 3 | COMPRESSION | MPEG4 | 160×120 | bitrate=64kbps | 20fps | ......... | 2 |
| 5 | 3 | COMPRESSION | M-JPEG | 640×480 | Q=50 | 15fps | ......... | 1 |

VIDEO DELIVERY APPARATUS AND METHOD

FIELD OF THE INVENTION

The present invention relates to a video delivery technique and, more particularly, to control of video stream delivery in a video delivery apparatus that delivers a video stream with a property according to a demand from a client.

BACKGROUND OF THE INVENTION

Along with the development of the streaming technique in recent years, it is a common practice to browse video data delivered from a server on a client. In this case, a stream is selected in accordance with various properties (encoding/decoding, image quality, bit rate, and the like) demanded by the client, undergoes image conversion or the like, and is delivered.

In terms of QoS (Quality of Service) and the like, delivery data control between the server and client is executed.

In addition, a video delivery system using a built-in device type camera server is available. By making camera control according to a user's demand, a desired video stream can be obtained.

A typical example of video delivery control is as follows. For example, a server that makes video delivery is simultaneously connected to a plurality of clients, and receives demands for delivery of video streams from the respective clients. The processing load on the video delivery server becomes heavier with increasing number of clients to which video delivery is made at the same time. When this processing load exceeds the processing performance of the video delivery server, the overall performance drops, thus disturbing smooth streaming. Hence, in the conventional system, the following control is made. That is, the number of clients to be simultaneously connected is limited, and when clients are connected up to the upper limit, if a demand for delivery comes from another client, that demand for delivery is rejected.

However, when a system in which a client can demand to deliver a video stream (multi-stream) of an arbitrary property and the video delivery server delivers a video stream of the property according to the demand from that client is assumed, effective delivery control cannot be implemented even when the number of clients to be simultaneously connected is limited as in the conventional system. This is because the properties of video streams to be handled vary for respective clients, and the processing loads also vary depending on differences in properties. For this reason, even when the number of clients to be simultaneously connected is small, if respective clients demand to deliver video data with quality of the highest level, the processing load exceeds the processing performance of the video delivery server, and possibility of delayed streaming cannot be eliminated.

Especially, the built-in device type camera server has poor performance compared to a general video delivery server, and its processing performance is spared not only to the image process but also various kinds of device control unlike in the video delivery server. Hence, the aforementioned problem becomes more conspicuous.

This problem is not limited to the processing performance of the server, and the processing performance of the whole system also changes depending on that of the client.

The client user must find out an optimal video stream by repeating trial and error so as to select a video stream with appropriate image properties that match the processing performance of the client.

Furthermore, when the processing performance of the video delivery server is shared to clients which are connected simultaneously, the delivery control technique that can share the processing performance in diversified terms in place of simple sharing is required.

SUMMARY OF THE INVENTION

In view of the above problems in the conventional art, the present invention has an object to realize optimal delivery control of a video stream in accordance with the processing performance of a video delivery server and client.

In one aspect of the present invention, a video delivery apparatus for delivering a video stream with a property according to a request from a client, includes reception means for receiving a delivery request from one client, first estimation means for estimating a current processing load by calculating a sum total of the processing loads for other clients connected to deliver a video stream upon reception of the delivery request from the one client, second estimation means for estimating a processing load upon delivering the video stream to the one client according to the delivery request, and delivery control means for performing the delivery control of the video stream on the basis of at least one of the current processing load estimated by the first estimation means and the processing load upon delivering the video stream to the one client according to the delivery request, which is estimated by the second estimation means.

The above and other objects and features of the present invention will appear more fully hereinafter from a consideration of the following description taken in conjunction with the accompanying drawing wherein one example is illustrated by way of example.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows an example of the configuration of stream load data in the first embodiment;

FIG. 5 shows an example of the configuration of connection information in the first embodiment;

FIG. 8 shows an example of the configuration of stream load data in the second embodiment;

FIG. 9 shows an example of the configuration of connection information in the first embodiment;

FIG. 12 shows an example of the configuration of stream option set information in the third embodiment;

FIG. 14 is a block diagram showing the arrangement of a viewer (client) in the embodiment of the present invention;

FIG. 18 shows an example of client stream load data in the sixth embodiment;

FIG. 19 shows an example of the configuration of stream option set information in the sixth embodiment;

FIG. 22 shows an example of connection information in the seventh embodiment;

FIG. 24 shows an example of the configuration of a priority table in the seventh embodiment;

FIG. 25 shows an example of priority-dependent stream load assumed data in the seventh embodiment;

FIG. 26 shows an example of stream option set information in the seventh embodiment;

FIG. 28 shows an example of the configuration of a priority table in the ninth embodiment;

FIG. 29 shows an example of priority-dependent stream load assumed data in the ninth embodiment;

FIG. 34 shows an example of stream load data in the 12th embodiment;

FIG. 36 shows an example of CPU load data in the 13th Embodiment;

FIG. 38 is a flowchart showing a delivery control process in the 13th embodiment;

FIG. 39 shows an example of the configuration of connection information in the 13th embodiment;

FIG. 40 is a schematic diagram showing the arrangement of a video delivery system according to the 14th embodiment;

FIG. 45 shows an example of a policy table in the 14th Embodiment;

FIG. 52 shows an example of a parameter list of processes of which the video delivery system is demanded in the 16th embodiment of the present invention;

FIG. 54 is a is a view for explaining a processing performance prediction process in the 16th embodiment of the present invention;

FIGS. 57A and 57B show an example of a parameter list of processes of which a video delivery system is demanded in the 18th embodiment of the present invention;

FIG. 60 shows an example of a parameter list of processes of which a video delivery system is demanded in the 19th embodiment of the present invention;

FIG. 62 shows an example of a parameter list of processes of which the video delivery system is demanded in the 20th embodiment of the present invention;

DESCRIPTION OF THE PREFERRED EMBODIMENTS

Figure 1:
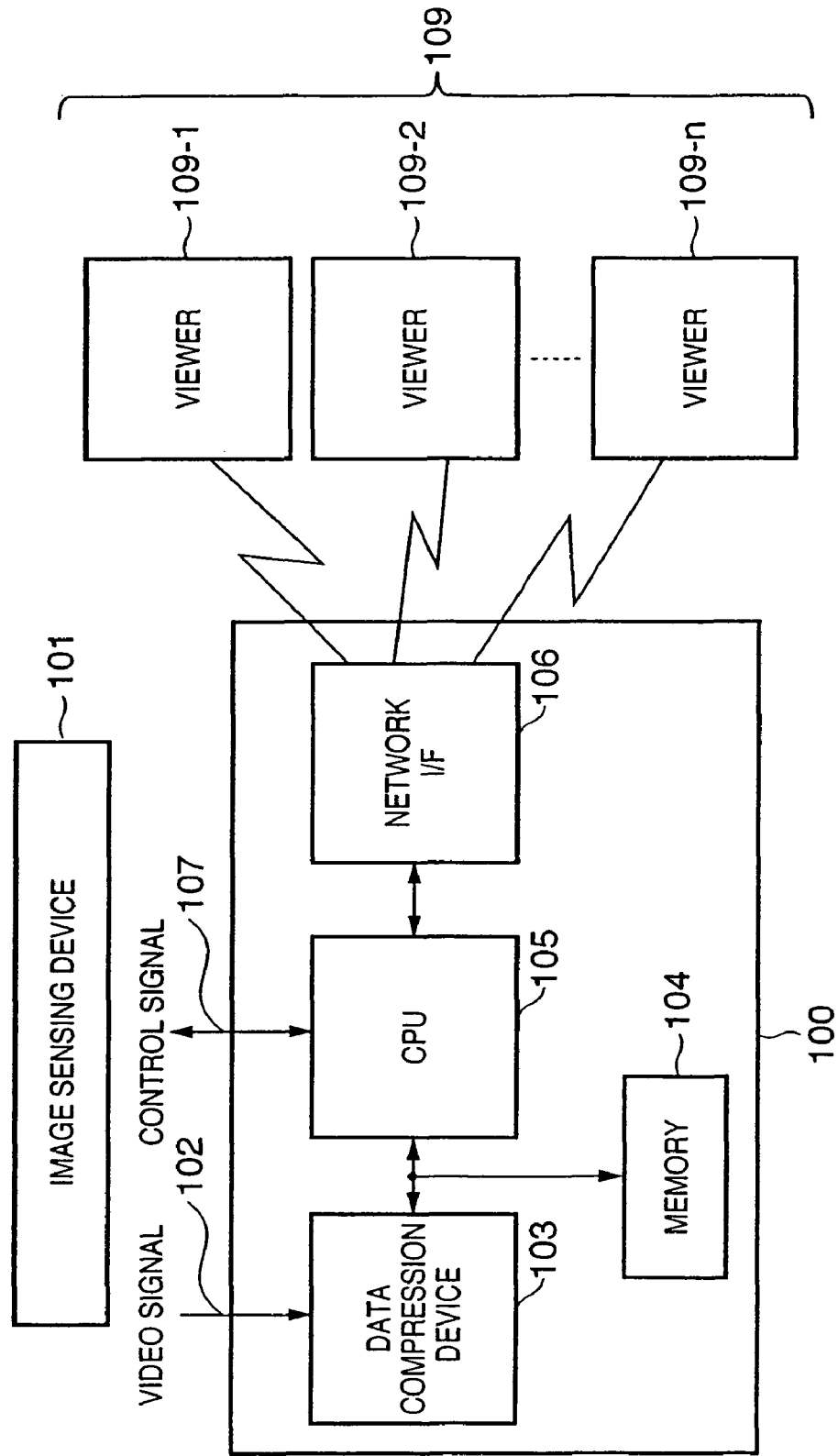
FIG. 1 is a block diagram showing the arrangement of a video delivery system according to an embodiment of the present invention.

Preferred embodiments of the present invention will be described in detail in accordance with the accompanying drawings. The present invention is not limited by the disclosure of the embodiments and all combinations of the features described in the embodiments are not always indispensable to solving means of the present invention.

Although various embodiments will be explained hereinafter, the same reference numerals denote common components and processes among embodiments, and a repetitive description thereof will be avoided. However, if components and processes with common reference numerals include different contents from those mentioned before, such differences will be noted in each case.

First Embodiment

FIG. 1 is a block diagram showing the arrangement of a video delivery system according to an embodiment of the present invention.

A video delivery server 100 as a video delivery apparatus has an arrangement including a data compression device 103 for receiving a video signal 102 from an image sensing device 101 and compressing data, a memory 104 for storing a boot program and various data, a central processing unit (CPU) 105 for controlling arithmetic operations and processes, and a network interface (I/F) 106 for connecting a network.

The image sensing device 101 receives a control signal 107 of the video delivery server 100, and outputs the video signal 102. In this embodiment, the video delivery server 100 and image sensing device 101 have independent arrangements, as shown in FIG. 1, but they may be integrated.

The data compression device 103 is implemented by, e.g., a compression chip, compresses the video signal to output data of a given format such as JPEG, MPEG, or the like, and stores the compressed data in the memory 104.

The network interface (I/F) 106 is implemented by, e.g., a network chip, and provides I/O functions of data between a network 108 and the CPU 105.

A plurality of clients (information processing terminals) 109 (clients 109-1, 109-2, ..., 109-n) serve as viewers, each of which receives and displays data delivered by the video delivery server 100 via the network 108. Each client 109 can be implemented by a personal computer (PC), portable computer (PDA), portable phone, or the like.

Figure 2:
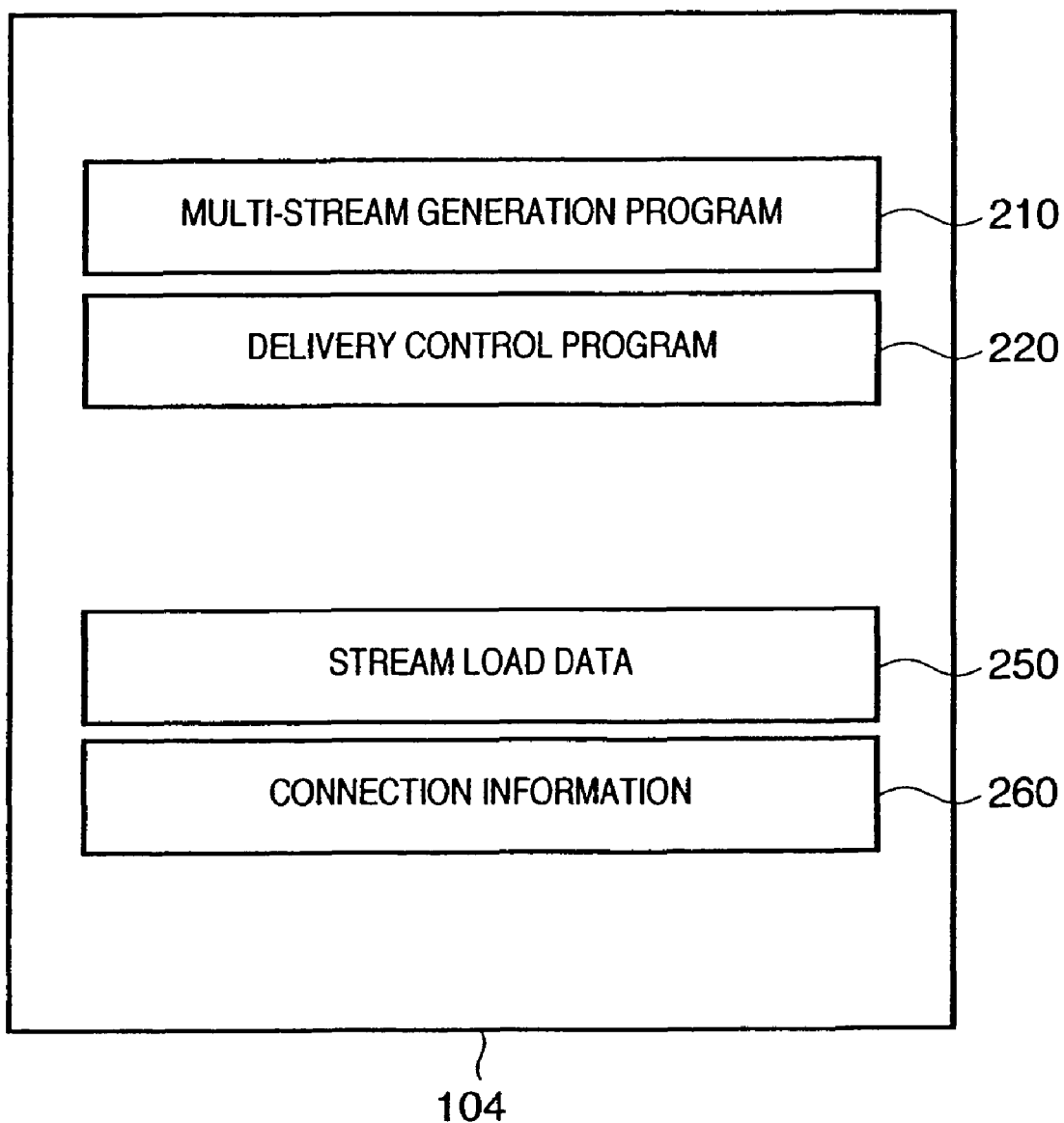
FIG. 2 shows programs and data stored in a memory of a video deliver server in the first embodiment.

The memory 104 stores a multi-stream generation program 210, delivery control program 220, stream load data 250, connection information 260, and the like, as shown in FIG. 2.

Figure 3A:
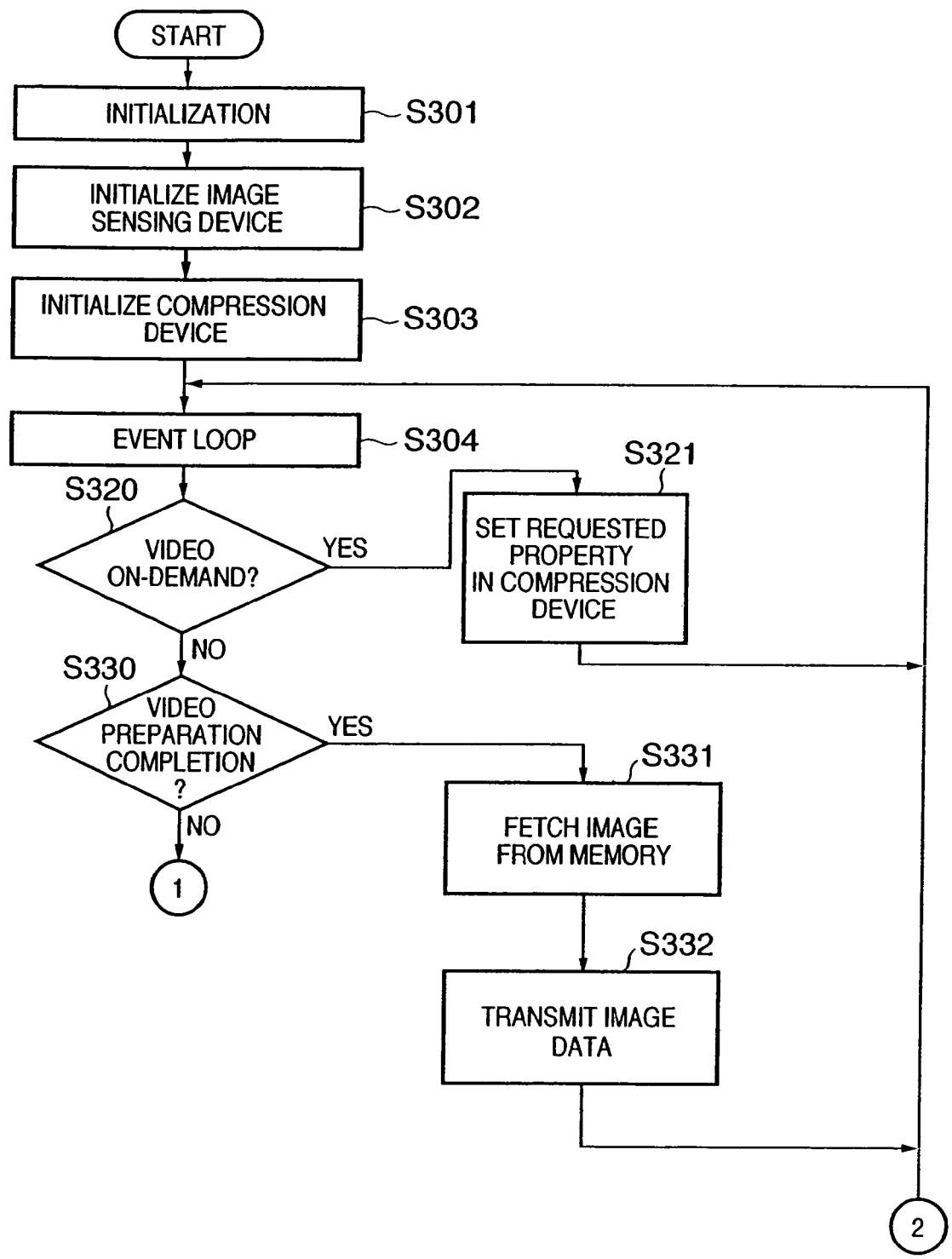
FIGS. 3A and 3B are flowcharts showing a multi-stream generation process in the first embodiment.
Figure 3B:
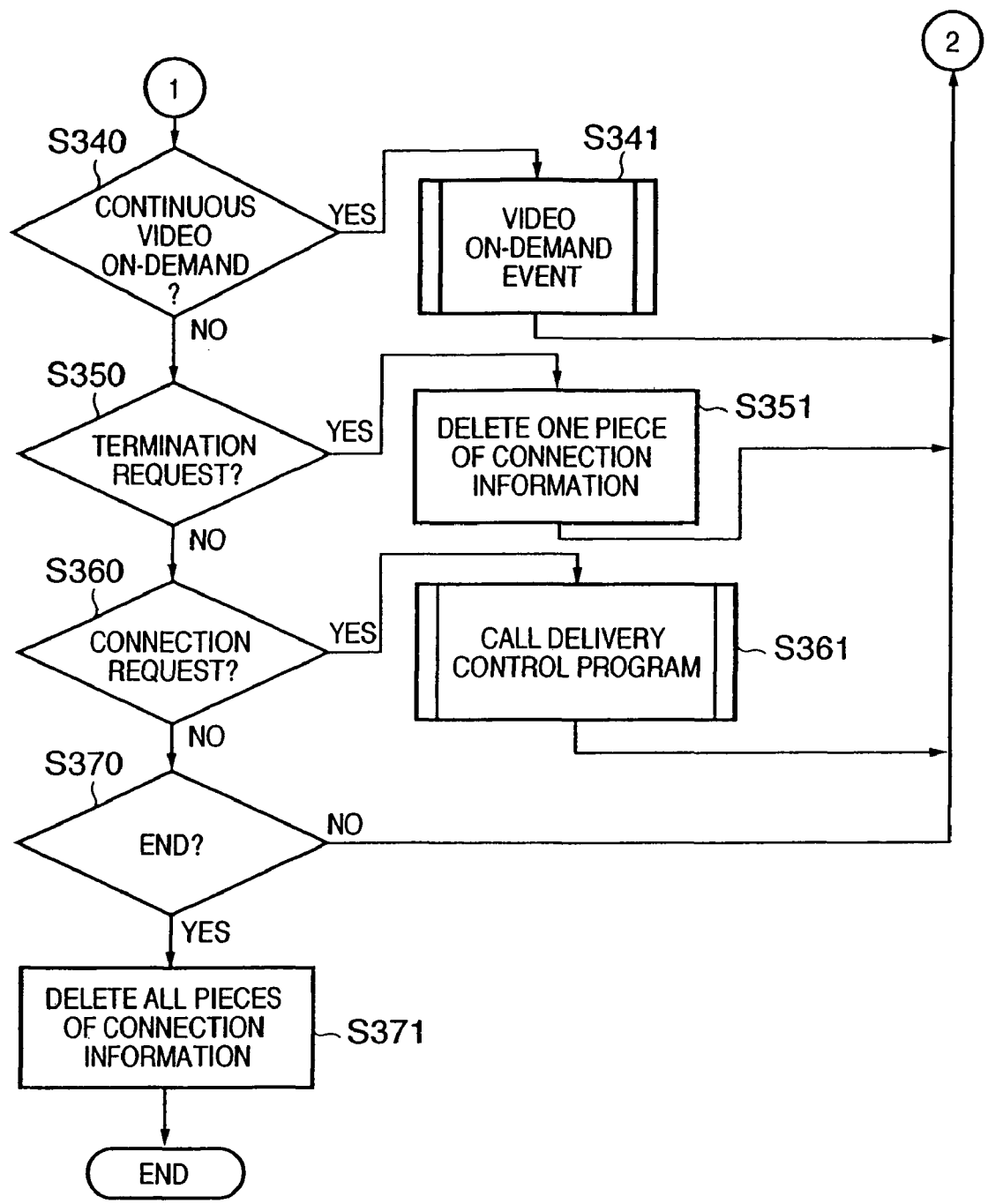

FIGS. 3A and 3B are flowcharts showing a multi-stream generation process by the video delivery server 100 of this embodiment. A program corresponding to these flowcharts is included in the multi-stream generation program 210, and is executed by the CPU 105. A case will be exemplified below wherein JPEG multi-streams having image sizes of 640×480, 320×240, and 160×120 are to be handled.

In step S301, various setting parameters in the memory 104 are initialized. In this case, the stream load data 250 with the configuration shown in FIG. 4, a setting value X as an upper limit value of a server process to be described later, and the like are loaded. The stream load data 250 has a processing load value for each image size as a property. FIG. 4 shows an example of the loads required to process stream delivery of respective image sizes of the video delivery server 100 to have the processing load required for the image size of 160×120 as a reference (=1). The data shown in FIG. 4 may be values obtained via experiments or estimated values. That is, the processing load for 320×240 is 4, that for 640×480 is 16, and that for 800×600 is 25.

In step S302, the image sensing device 10 is initialized using image sensing parameters set in step S301. This setting can be done using the control signal 107 to the image sensing device 101.

In step S303, the data compression device 103 is initialized using data compression parameters set in step S301. This setting includes, e.g., an image size to be compressed and the like.

In step S304, the control waits for an event such as an interrupt or the like. Following steps S320, S330, S340, S350, S360, and S370 are those for checking the types of received events.

If the received event is a video on-demand event (YES in step S320), the size as a property of demanded video data is set in the data compression device 103 (step S321), and the flow then returns to the event loop in step S304.

If a video preparation completion event is received from the data compression device 103 (YES in step S330), the corresponding video data is read out from the memory 104 (step S331), and is transmitted to the client that issued the video on-demand event in accordance with the connection information 260 with the configuration shown in FIG. 5 (step S332). The connection information 260 describes the currently connected clients and the image sizes demanded from these clients, as shown in FIG. 5, and is updated by a process to be described later in accordance with a change in connection condition.

If a continuous video on-demand event is received from the client 109 via the network interface 106 (YES in step S340), a video on-demand event is issued to execute the same process as in step S321 (step S341), and the flow then returns to the event loop in step S304. Note that the continuous video on-demand event is an event that demands continuous delivery of video data from the video delivery server 100 to the client 109.

If a termination request event is received from the client 109 via the network interface 106 (YES in step S350), one corresponding data is deleted from the connection information 260 (step S351), and the flow then returns to the event loop in step S304. Note that the termination request event is an event which is demanded from the client 109 to the video delivery server 100 so as to disconnect the connection between the video delivery server 100 and client 109. Also, this termination request event can be issued when a communication from the video delivery server 100 to the client 109 is interrupted for some reason.

The video delivery mechanism of this embodiment is implemented by the processes in steps S320 to S351 above.

If a connection request event is received from the client 109 via the network interface 106 (YES in step S360), a delivery control process is executed on the basis of the delivery control program 220 (step S361). This connection request event includes property information (to be referred to as a demanded video property hereinafter) of a video stream demanded from the client.

Figure 6:
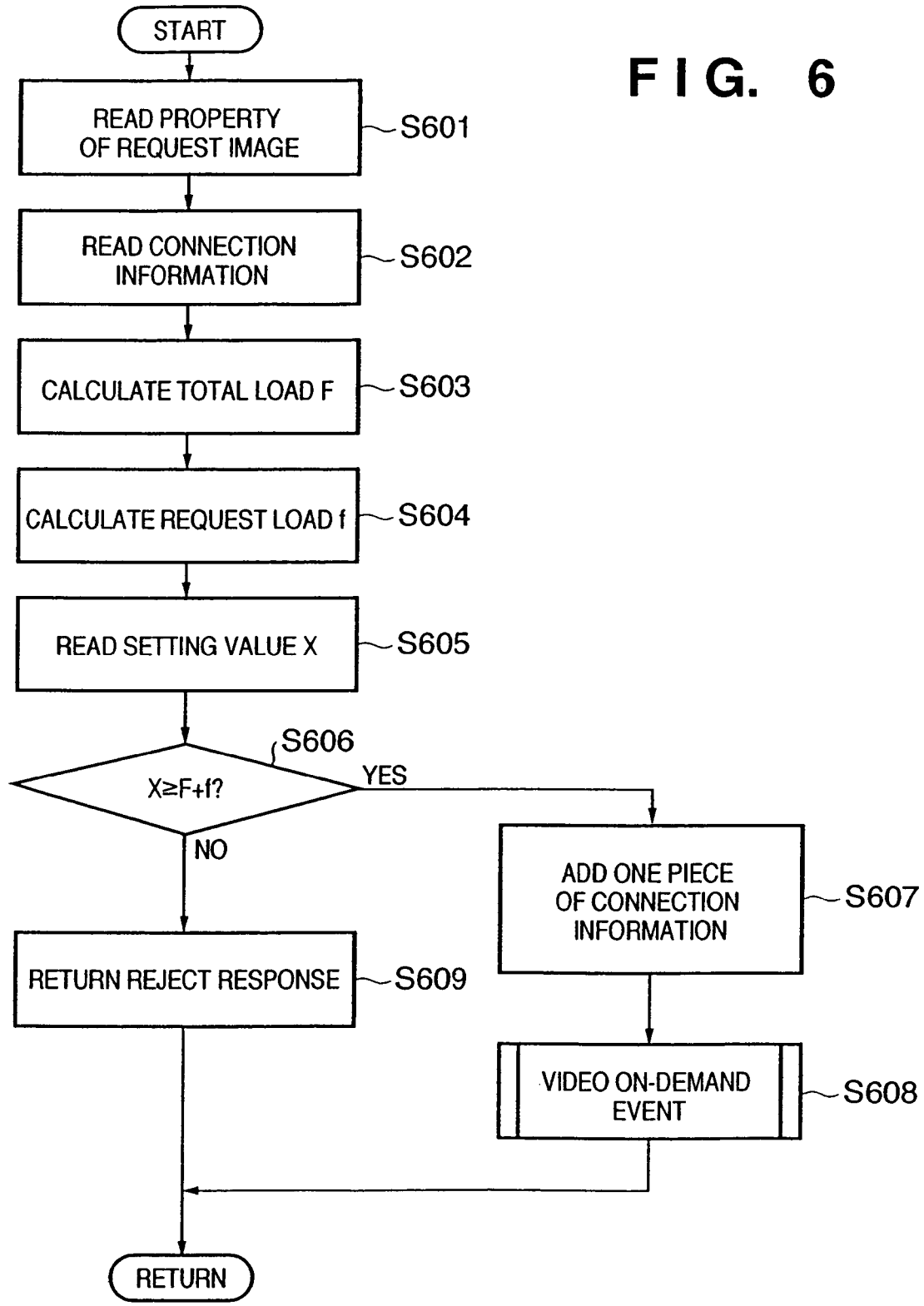
FIG. 6 is a flowchart showing a delivery control process in the first embodiment.

The delivery control process in step S361 by the video delivery server 100 will be described below using the flowchart of FIG. 6.

The demanded video property included in the connection request event is loaded in step S601, and the connection information 260 is loaded in step S602. By referring to this connection information 260, all currently connected clients can be specified.

In step S603, loads corresponding to connected clients are read out and summed up with reference to the stream load data 250 to calculate their sum total as a total load F. With this total load F, the current processing load is estimated.

An example will be explained below based on the connection information 260 in FIG. 5, and the stream load data 250 in FIG. 4. As can be seen from the connection information 260 in FIG. 5, the clients 109-1 and 109-2 are currently connected to the video delivery server 100. Also, the client 109-1 demands video data having an image size of 640×480, while the client 109-2 demands video data having an image size of 160×120. By referring to the stream load data 250 in FIG. 4, since the processing load of the video data with the image size of 640×480 is 16 and that of the video data with the image size of 160×120 is 1, the total load F in this case (i.e., the current processing load) is F=16+1=17.

In step S604, a load f for the currently demanded video data is acquired with reference to the stream load data 250. For example, if video data with an image size of 320×240 is demanded, it is estimated with reference to the stream load data 250 that the load f for the currently demanded video data is 4.

If delivery of the currently demanded new video data is to be executed, the total processing load at that time is the sum of the current processing load (total load F) and the load f for the currently demanded video data. If this value exceeds a limit of the processing performance of the video delivery server 100, the overall performance drops, and smooth stream may be disturbed. In step S605, the setting value X as the upper limit value of the server process loaded in step S301 (to be referred to as "upper limit value X" hereinafter) is read out, and it is checked in step S606 if the sum of the total load F and load f (=the total processing load if delivery of the currently demanded new video data is to be executed) is equal to or smaller than the upper limit value X (i.e., if $X \geq F+f$). If $X \geq F+f$, the flow advances to step S607 to register information of the client as the issuance source of the connection request event in the connection information 260. After that, a video on-demand event is issued to execute the same process as in step S321 (step S608). On the other hand, if $X \geq F+f$ is not satisfied, a reject response is returned to the issuance source of the connection request event (step S609).

The upper limit value X will be explained below. This upper limit value X is a value which can be changed by, e.g., the system administrator of the video delivery server 100. Typically, the system administrator who recognizes the operation condition of the system sets this value X as an upper limit value of the processing performance that he or she allows. The upper limit value X may be set in advance in the memory 104 as a fixed value, or may be set in the memory 104 by a mechanism, e.g., telnet, FTP, RPC, or the like.

In the conventional system, this upper limit value is designated by the number of clients to be connected or the like, but does not represent an upper limit value of the performance that the system administrator allows. When the upper limit value adopts the number of clients to be connected as in the conventional system, if only streams with heavy loads are selected, they exceed the processing performance of the video delivery apparatus, and delivery of all streams is disturbed. On the contrary, if only streams with light loads are selected, delivery may be rejected since the number of connections has reached the upper limit value, although the processing performance of the video delivery apparatus has reserve capacity.

On the other hand, since the upper limit value X of this embodiment is a value that directly indicates the load on the image process and the like in place of the number of clients to be connected or the like, the processing performance of the video delivery server can be utilized more effectively.

The description will revert to the flowcharts of FIGS. 3A and 3B. Upon completion of the delivery control process in step S361, the flow returns to the event loop in step S304.

If an end event is received (YES in step S370), the flow advances to step S371 to delete all data of the connection information 260, thus ending this multi-stream generation process.

According to the first embodiment mentioned above, upon reception of the connection request, the video delivery server estimates the total processing load (F+f) when generation and delivery of a video stream corresponding to that request are to be executed. If the total processing load exceeds the predetermined upper limit value (X), connection associated with that request is rejected. In this way, a situation in which the processing performance of the video delivery server 100 exceeds the performance limit, the overall performance drops, and smooth streaming is disturbed can be prevented.

Especially, this effect is high for a video delivery server with relatively poor processing performance such as a built-in device type camera server or the like. In case of such device, the limitation on the processing performance of the device is stricter than that on a transfer channel, and the performance of the transfer channel is higher than that of the device. Hence, appropriate delivery control cannot be made by limiting the number of connections, the transfer size, or the like as in the conventional system. However, by executing delivery control based on the processing performance of the device, the processing performance of the video delivery server can be utilized more effectively.

Note that connection to the video delivery server in this embodiment aims at delivery, but connections aiming at other processes are not taken into consideration. Therefore, an expression "reject connection" is equivalent to "reject video delivery" (the same applies to the following description).

In the example of the above embodiment, the video property indicates an image size. As video properties, encoding/decoding, image quality, a frame rate, and a combination thereof are available in addition to the image size, and the present invention can also be applied to these properties, as can be understood by those who are skilled in the art.

Second Embodiment

In the first-embodiment, the image size, image quality, frame rate, and the like are handled as video properties, and delivery control of video streams according to these properties have been explained. In this embodiment, delivery control of video streams is executed in consideration of not only these video properties but also "processing property" indicating the control contents of an image sensing device (camera).

Figure 7:
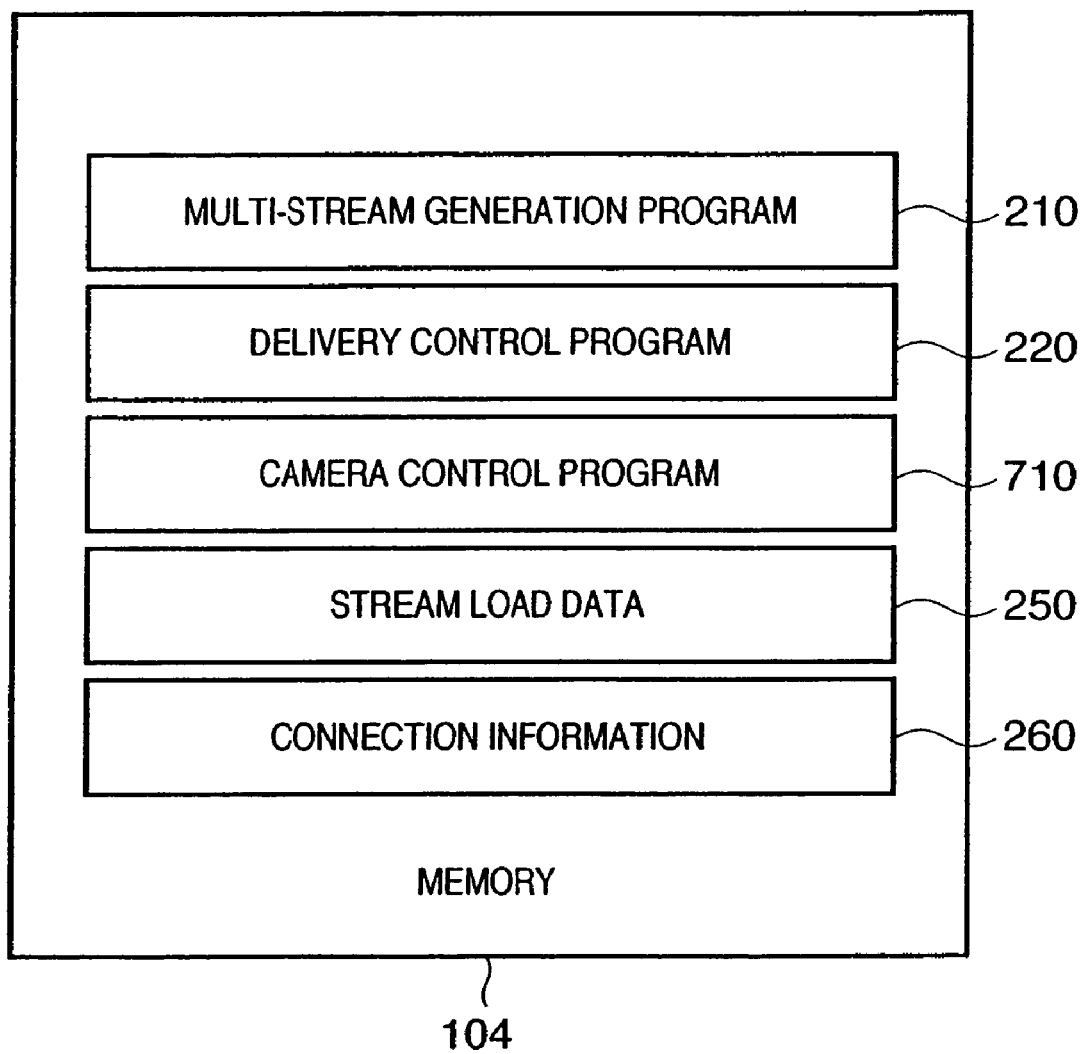
FIG. 7 shows programs and data stored in a memory of a video delivery server in the second embodiment.

The arrangement of the video delivery system according to this embodiment is the same as that shown in FIG. 1. However, the memory 104 stores a camera control program 710 as a means for controlling the image sensing device 101, as shown in FIG. 7, in addition to the multi-stream generation program 210, delivery control program 220, stream load data 250, and connection information 260 as in the first embodiment. Whether or not this camera control program 710 is to be executed can be arbitrarily set by the user. When the camera control program 710 is executed, camera control such as a turning process for turning the direction of the image sensing device 101, a moving object tracing process for moving the direction of the image sensing device to detect a moving object and to trace its movement, and the like is executed. Note that whether or not these processes are to be executed is preferably individually set by the user. However, in this embodiment, only execution/non-execution of the camera control program 710 is set for the sake of simplicity. In the following description, "execution/non-execution of the camera control program 710" will be simply referred to as "camera control=ON/OFF" hereinafter.

If camera control=ON, the process of the CPU 105 is spared not only to the delivery process of video streams but also to this camera control. In this embodiment, the stream load data 250 describes processing loads when camera control=ON and those when camera control=OFF, in consideration of the above situation. FIG. 8 shows an example of the configuration of this stream load data 250. The example of FIG. 8 describes the processing loads of respective cases to have the processing load when the image size is 160×120 and camera control=OFF as a reference (=1). Likewise, the connection information 260 describes information of camera control=ON/OFF in addition to the image sizes in correspondence with currently connected clients.

The multi-stream generation process in this embodiment is executed in substantially the same manner as in the processes (FIGS. 3A and 3B and FIG. 6) of the first embodiment.

In this embodiment, the total load F is calculated as follows in step S603 in FIG. 6. By referring to the connection information 260 in FIG. 9, the clients 109-1 and 109-2 are currently connected to the video delivery server 100. The client 109-1 demands video data with an image size of 640×480, and its camera control setting is "OFF". On the other hand, the client 109-2 demands video data with an image size of 160×120, and its camera control setting is "ON". By referring to the stream load data 250 in FIG. 8, the processing load for the video data with the image size of 640×480 and camera control=OFF is 16, and that for the video data with the image size of 160×120 and camera control=ON is 2. In this case, the total load F is F=16+2=18.

In step S604 that calculates the load f for generating the currently demanded video stream, for example, when video data with an image size of 320×240 is demanded and the camera control setting is ON, the load f=5 is estimated with reference to the stream load data 250 in FIG. 8.

As in the first embodiment, this upper limit value X is a setting value which can be changed by, e.g., the system administrator of the video delivery server 100. Typically, the system administrator who recognizes the operation condition of the system sets this value X as an upper limit value of the processing performance that he or she allows. In the first embodiment, typically, the upper limit value X is set as that for the sum total of the compression processing loads. However, in this embodiment, the upper limit value X is set as that for the sum total of processing loads that include the loads required for the camera control in addition to the compression process.

Third Embodiment

In the first and second embodiments described above, upon reception of a connection request, the total load (F+f) when generation and delivery of a video stream corresponding to that request are to be executed is estimated. When the estimated value exceeds the predetermined upper limit value (X), connection associated with this request is rejected.

In this embodiment, when the total load exceeds the upper limit value (X), property candidates of video streams that can be provided within the reserve capacity range of the video delivery server are provided as options. In this way, this embodiment aims at eliminating connection failures of users, and providing at least a low-load stream. In the following description, differences will be mainly explained on the basis of the second embodiment. However, this embodiment can also be applied to the first embodiment.

Figure 10:
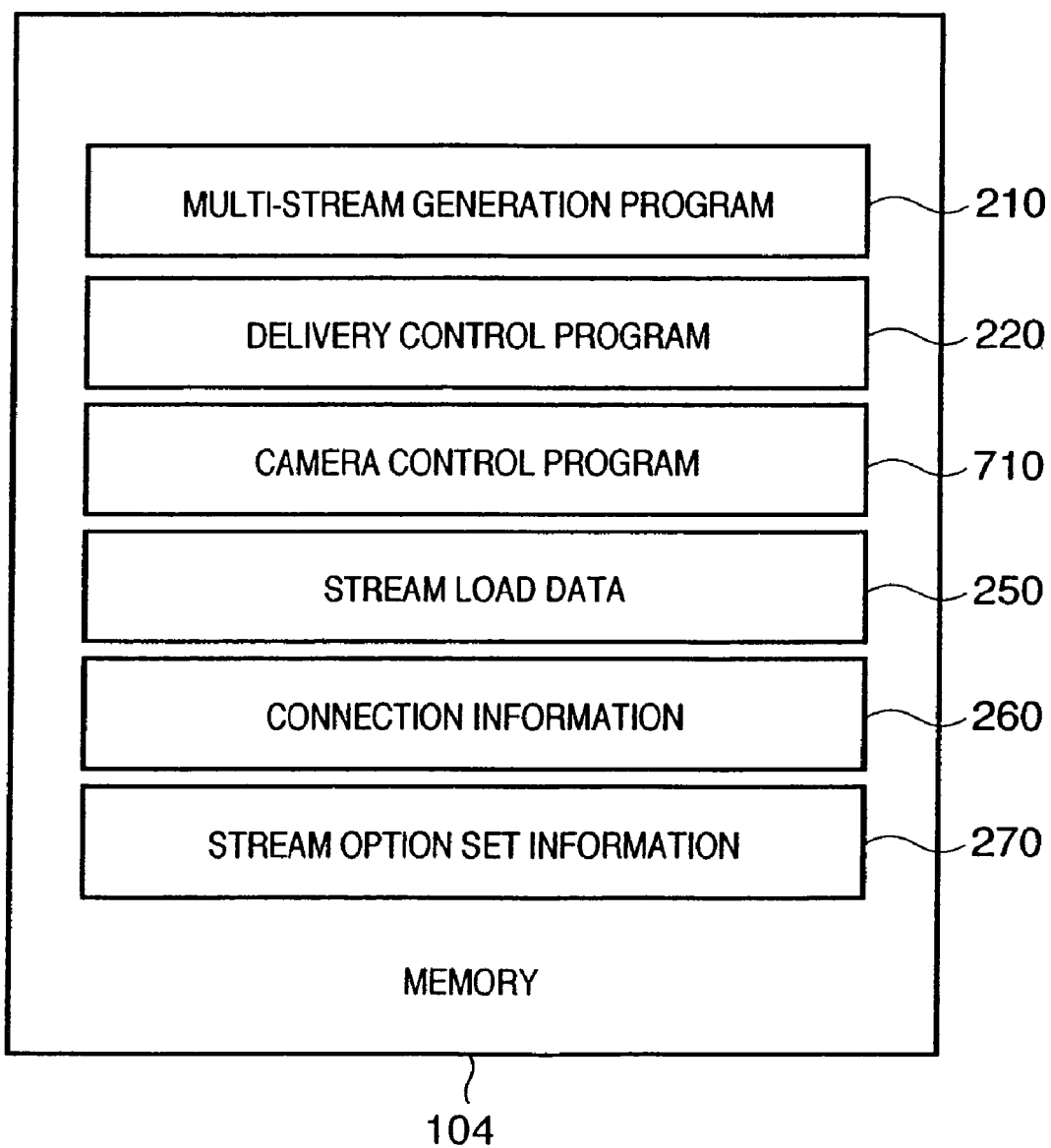
FIG. 10 shows programs and data stored in a memory of a video delivery server in the third embodiment.

The arrangement of the video delivery system according to this embodiment is the same as that shown in FIG. 1. However, the memory 104 stores stream option set information 270, as shown in FIG. 10, in addition to the multi-stream generation program 210, delivery control program 220, camera control program 710, stream load data 250, and connection information 260 as in the second embodiment. Also, the stream load data 250 and connection information 260 of this embodiment respectively have the configurations shown in FIGS. 8 and 9 as in the second embodiment.

The multi-stream generation process by the video delivery server 100 of this embodiment is basically executed in the substantially same manner as the processes (FIGS. 3A and 3B) in the first and second embodiments. However, in this embodiment, the delivery control process in step S361 is executed according to the flowchart in FIG. 11.

In step S1001, the connection information 260 is loaded. Also, the demanded video property included in the connection request event is loaded as in step S601 in the first and second embodiments.

In step S1002, processing loads for respective connected clients are obtained with reference to the connection information 260 and stream load data 250 to calculate their sum total as a total load F (current processing load). In step S1003, a load f for the currently demanded video data is acquired with reference to the stream load data 250.

In step S1004, the upper limit value X of the server process loaded in step S301 is read out. As described above, the upper limit value X is a value which is set by the system administrator who recognizes the operation condition of the system as an upper limit value of the processing performance that he or she allows. It is checked in step S1005 if the sum of the total load F and load f (=the total processing load if delivery of the currently demanded new video data is to be executed) is equal to or smaller than the upper limit value X (i.e., if X≧F+f). If X≧F+f, the flow advances to step S1006 to register information of the client as the issuance source of the connection request event in the connection information 260. After that, a video on-demand event is issued to execute the same process as in step S321 (step S1007), thus ending this process.

On the other hand, if it is determined in step S1005 that X≧F+f is not satisfied, the flow advances to step S1008 to calculate a reserve capacity Y of the video delivery server 100. The reserve capacity Y of the video delivery server 100 is given by the upper limit value X−the total load F.

In step S1009, property candidates of video streams that can be provided are read out from the stream load data 250 on the basis of the calculated reserve capacity Y, and the stream option set information 270 with the configuration shown in FIG. 12 is written in the memory 104. For example, assuming that the upper limit value X=25 and the total load F=18, the reserve capacity Y=25−18=7. After that, sets of properties whose load values are equal to or smaller than 7 (=reserve capacity) are extracted, and the stream option set information 270 including these sets as candidates is formed. In this example, "JPEG 320×240, camera control=OFF", "JPEG 320×240, camera control=ON", "JPEG 160×120, camera control=OFF", and "JPEG 160×120, camera control=ON" are extracted in practice, and the stream option set information 270 shown in FIG. 12 is formed.

Next, the stream option set information 270 is sent to the client in step S1010, and the control waits for an event in step S1011.

If a property specifying request event based on the options is received from the client, to which the stream option set information 270 is passed, in step S1012, the flow advances to step S1013, and the properties of the demanded video data are loaded. At this time, the properties may be received as a selection number or the like of the stream option set information 270. In step S1014, information of the client as the issuance source of the property specifying request event is registered in the connection information 260 as in step S607. In step S1015, a video on-demand event is issued to execute the same process as in step S321.

If a termination request event is received from the client, to which the stream option set information 270 is passed, in step S1016, or if a predetermined period of time has elapsed after the stream option set information 270 is passed to the client and a time-out event is issued in step S1017, this delivery control process ends.

As described above, according to the third embodiment, the client is informed of candidates of video streams according to the reserve capacity of the video delivery server 100 (i.e., video streams that can be provided within the range wherein the total processing load of the video delivery server 100 does not exceed the upper limit value X) as options, and the user can select the next best video stream accordingly. In this way, connection failures of users can be eliminated, and at least a low-load stream can be provided.

In the above processing example, if the sum of the total load F and load f, i.e., the total processing load upon executing delivery of the currently demanded video stream, exceeds the upper limit value X in step S1005, the processes in step S1008 and subsequent steps are executed to inform the client of the options. However, the client may be informed of the options irrespective of whether or not the sum of the total load F and load f exceeds the upper limit value X.

Fourth Embodiment

In the third embodiment described above, the user is informed of options of the properties of video streams that can be provided with the reserve capacity range of the video delivery server 100. However, since the load imposed on the video delivery server changes every second, the reserve capacity changes accordingly. Hence, this embodiment monitors the reserve capacity of the video delivery server, and if the candidates of properties of video streams that can be provided with the reserve capacity range change, options are informed again.

Figure 13A:
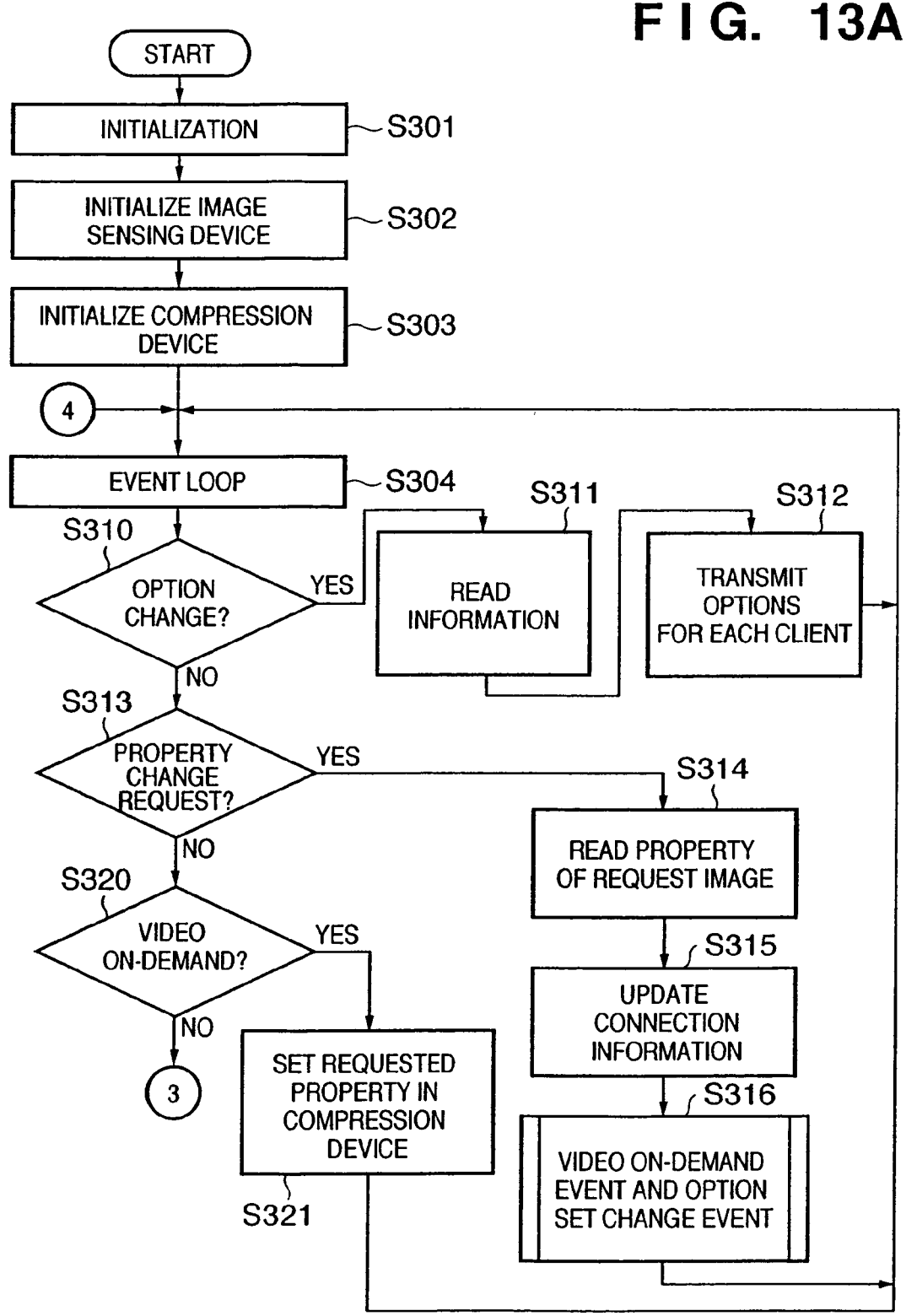
FIGS. 13A and 13B are flowcharts showing a multi-stream generation process in the fourth embodiment.
Figure 13B:
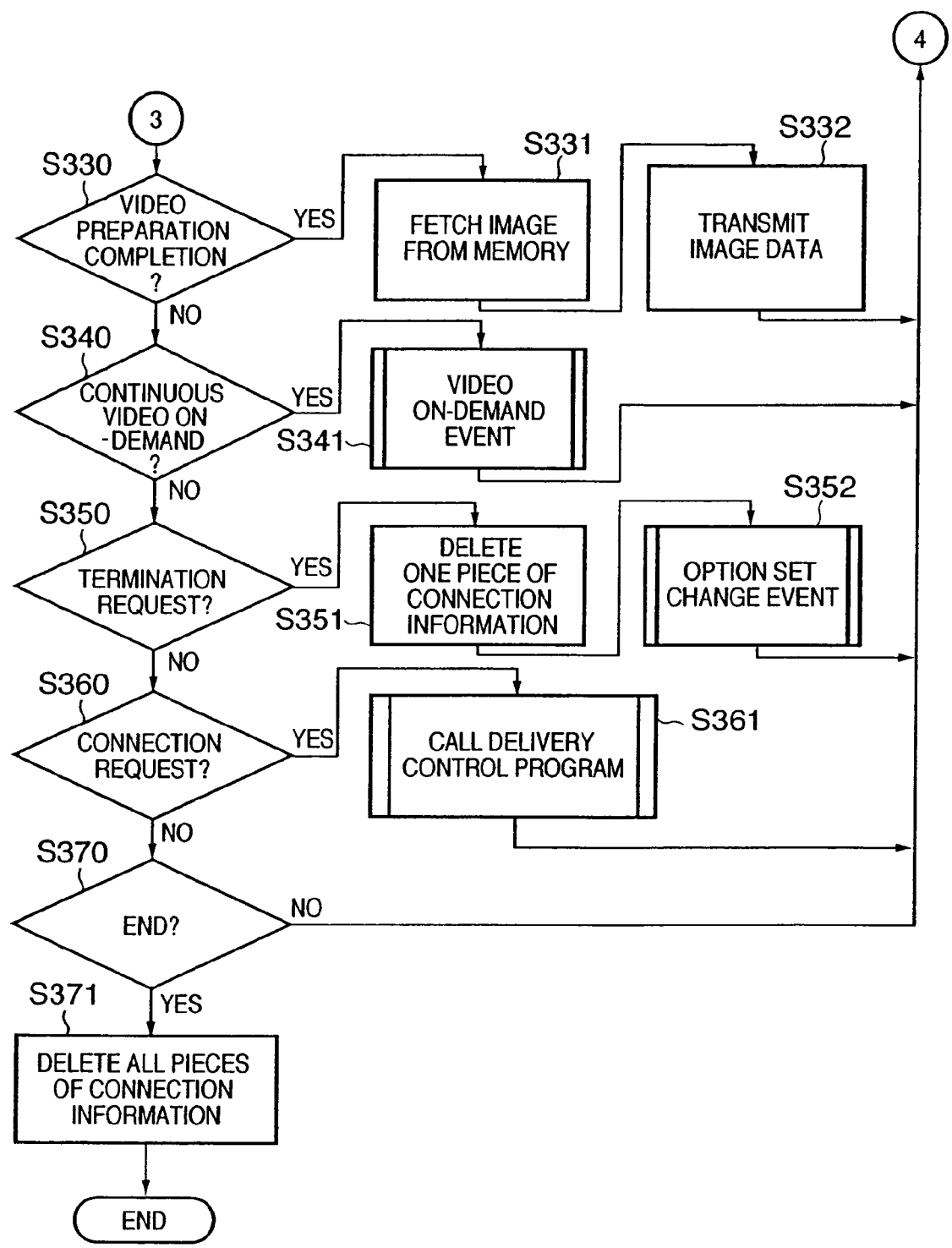

FIGS. 13A and 13B are flowcharts showing the multi-stream generation process by the video delivery server 100 according to this embodiment. Since many steps in these flowcharts are the same as those in the flowcharts of FIGS. 3A and 3B, the same step numbers denote the steps with the same contents, a description thereof will be omitted, and only steps different from those in FIGS. 3A and 3B will be explained.

As can be seen from comparison with FIGS. 3A and 3B, the processes in steps S310 to S316 are inserted between steps S304 and S320 in the flowcharts of FIGS. 13A and 13B.

If it is determined in step S310 that the received event is an option set change event, which is issued when property candidates of video streams that can be provided within the reserve capacity range have changed, the stream load data 250 and connection information 260 are loaded (step S311), and options are informed via a series of following operations for each client (step S312).

More specifically, the processing loads for currently connected clients are obtained with reference to the connection information 260 and stream load data 250 to calculate their sum total as the total load F (current processing load). Next, a difference between the upper limit value X and total load F is calculated as the reserve capacity Y. Based on the reserve capacity Y, property candidates of video streams that can be provided are read out from the stream load data 250 to update the stream option set information 270 stored in the memory 104 (new stream option set information 270 is generated if it is not prepared on the memory 104 yet). New options are sent to respective clients, and the flow returns to step S304.

Upon reception of the option message, the client displays the options even during video playback. The user of the client can select a desired property from the displayed options. When options of high-quality properties are added due to an increase in reserve capacity of the video delivery server 100, the client is preferably designed to automatically select such high-quality property.

When another property is selected on the client side, a property change request event is issued to the video delivery server 100.

If the property change request event is received in step S313, the requested property is loaded (step S314), and the corresponding data of the connection information 260 stored in the memory 104 is updated by that property (step S315). A video on-demand event and option set change event are issued (step S316). The option set change event is issued when the connection information 260 has changed.

Furthermore, the difference in the flowcharts of FIGS. 13A and 13B from those in FIGS. 3A and 3B is that step S352 is newly inserted after step S351. If the corresponding data is deleted from the connection information 260 in step S351, an option set change event indicating a change in option is issued in step S352.

Figure 11:
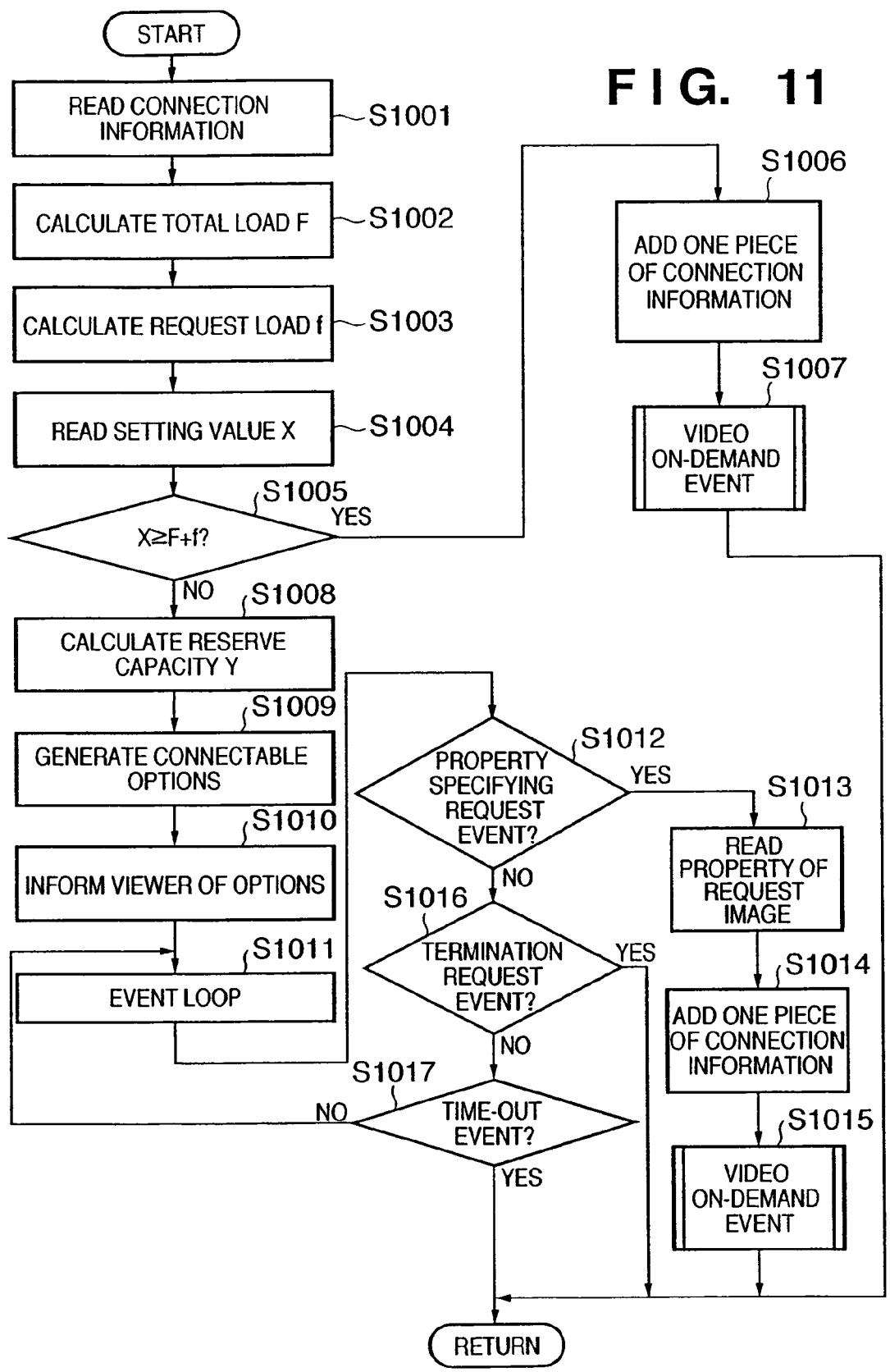
FIG. 11 is a flowchart showing a delivery control process in the third embodiment.

The delivery control process is executed in step S361 basically according to the flowchart shown in FIG. 11. However, in this embodiment, after information of the newly connected client is additionally registered in the connection information 260 in step S1014 and a video on-demand event is issued in step S1015, an option set change event is issued before this delivery control process ends.

According to the fourth embodiment mentioned above, when property candidates of video steams which can be provided within the reserve capacity range of the video delivery server 100 have changed, new options are displayed as needed. Hence, the user of the client can timely select an optimal property according to that reserve capacity. For example, the client which is connected to select a minimum stream can re-demand a stream with higher quality.

Fifth Embodiment

In the fourth embodiment, every time property candidates of video steams which can be provided within the reserve capacity range of the video delivery server 100 have changed, new options are provided.

However, when the reserve capacity decreases, options are merely downgraded to streams of lower qualities than those of the currently provided streams, and no higher-quality streams are added. In such case, the user of the client is undesirably disturbed to switch the currently browsing stream to a lower-quality stream.

Hence, in this embodiment, only when the reserve capacity increases, new options are presented.

In order to realize such process, an option set change event, which is issued in step S316 in the flowcharts of FIGS. 13A and 13B in the fourth embodiment, is not issued. Likewise, an option set change event, which is issued after step S1015 in the flowchart of FIG. 11 in the fourth embodiment, is not issued. In this way, an option set change event is issued only in step S352, which is executed when the number of connections decreases.

That is, when the number of connections increases, no option set change event is issued; only when the number of connections decreases, an option set change event is issued.

In this way, only when the number of options of property candidates of video streams which can be provided with the reserve capacity range of the video delivery server 100 increases, an option set change message is sent to the clients. Hence, the client users can receive only a useful message.

Sixth Embodiment

This embodiment relates to the control process in the client 109 for the video delivery server 100 which is described in one of the third to fifth embodiments and provides options of property candidates of video streams that can be provided. The following description will be given based on the video delivery system of the third embodiment.

FIG. 14 is a block diagram showing the arrangement of the client 109 in this embodiment.

As shown in FIG. 14, the client 109 includes a network interface (I/F) 2001 which receives data from the video delivery server 100 via the network 108, a central processing unit (CPU) 2002 for controlling arithmetic operations and processes, a memory 2003 for storing required programs and data, and a display device 2004 which comprises an LCD, CRT, or the like.

Compressed data received via the network interface 2001 is temporarily stored in the memory 2003. After that, the CPU 2002 expands the compressed data, and displays the expanded data on the display device 2004. Alternatively, a dedicated data expansion device (implemented by, e.g., a DSP or the like) that executes an expansion process in place of the CPU 2002 may be added.

Figure 15:
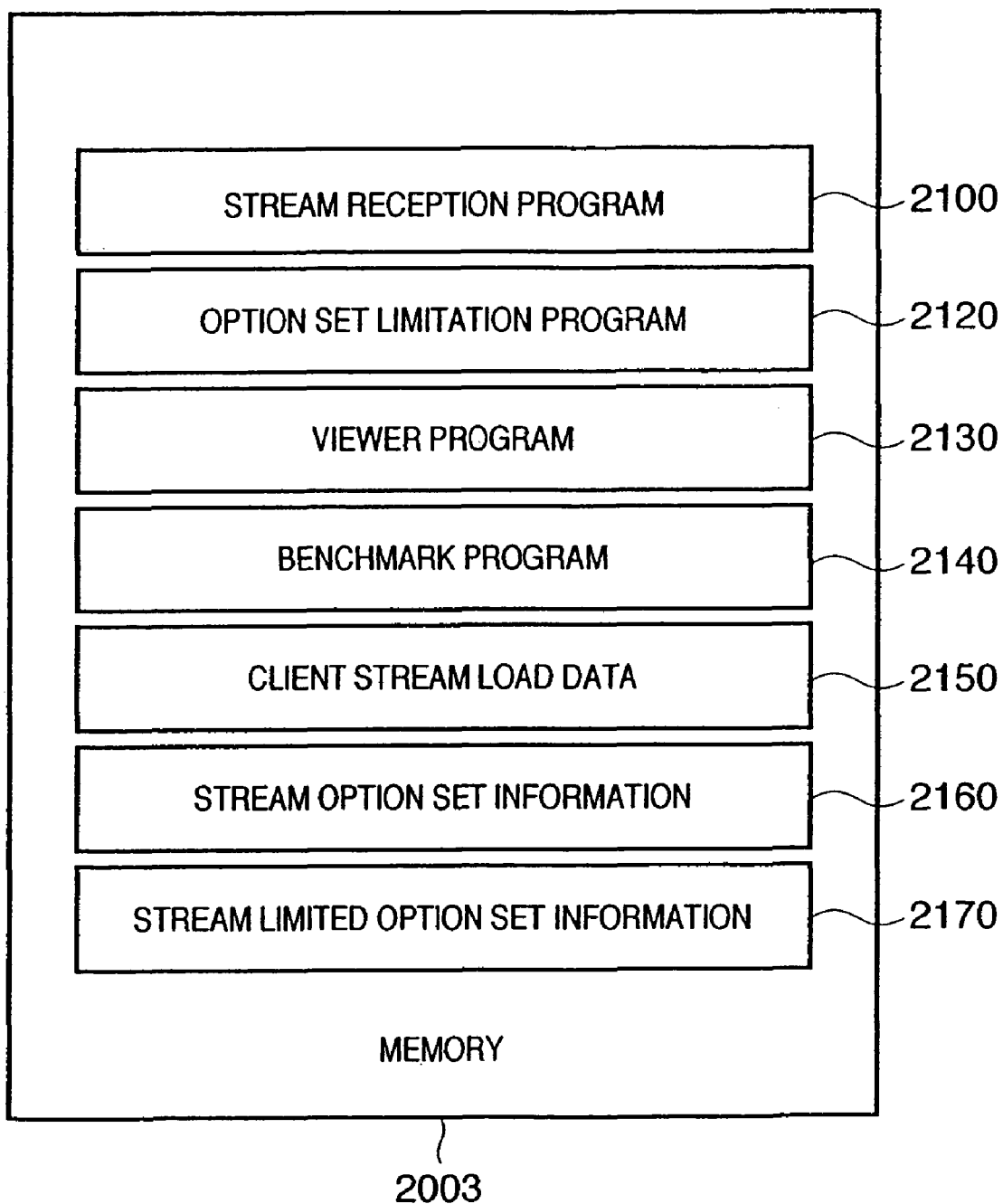
FIG. 15 shows programs and data stored in a memory of the client in the sixth embodiment.

As shown in FIG. 15, the memory 2003 stores programs such as a video stream reception program 2100 used to receive a video stream from the video delivery server 100, an option set limitation program 2120 used to implement an option set limitation process to be described later, a viewer program 2130 used to implement a viewer function, a benchmark program 2140 used to measure the current surplus processing performance of the client, and the like. In addition, the memory 2003 stores various data such as client stream load data 2150 indicating the processing loads on the client for respective video properties, stream option set information 2160 which is sent from the video delivery server 100 and is information of options of property candidates of video streams that can be provided, stream limited option set information 2170 that describes option data limited upon execution of the option set limitation program 2120, and the like.

Figure 16:
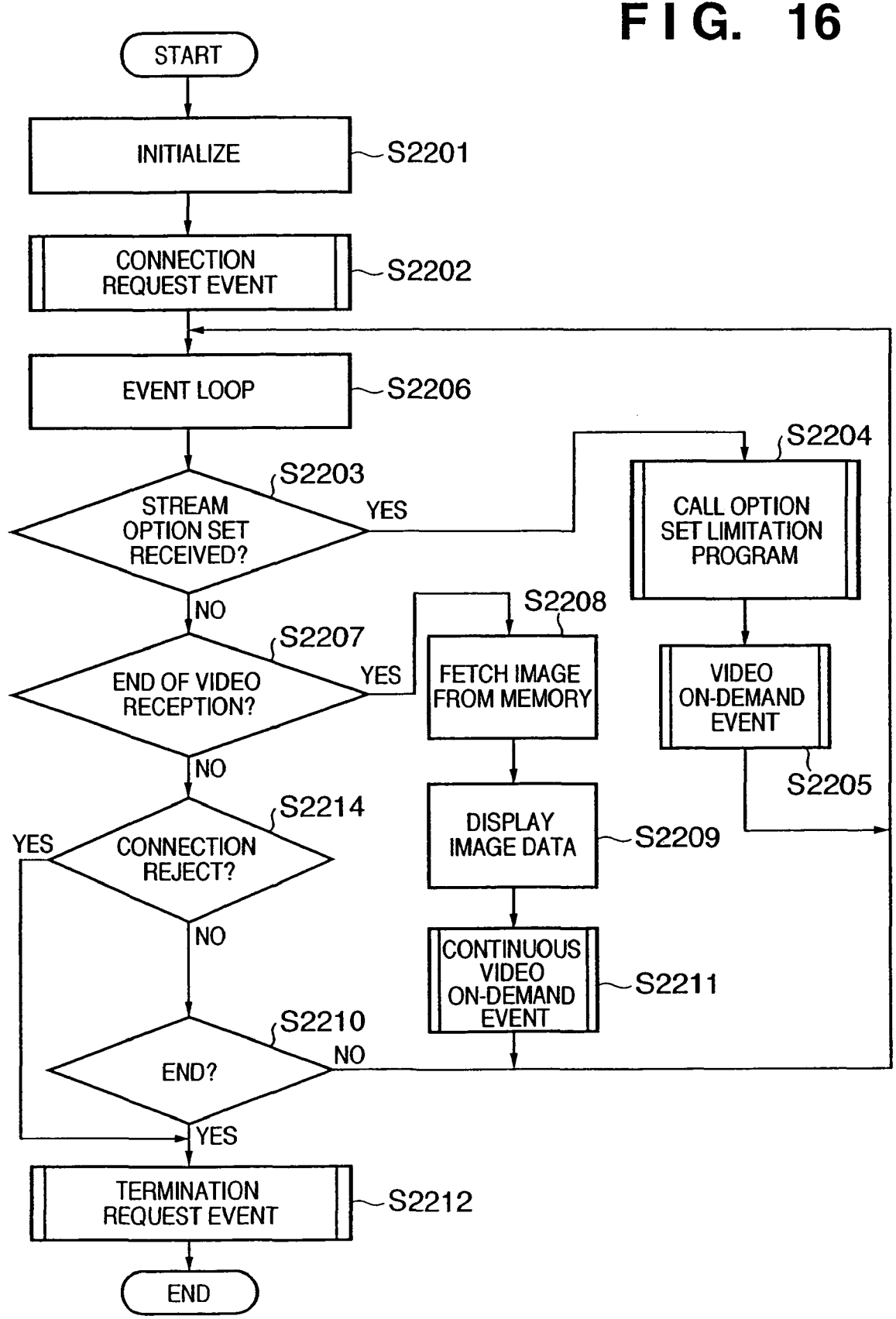
FIG. 16 is a flowchart showing a multi-stream reception process in the sixth embodiment.

FIG. 16 is a flowchart showing the multi-stream reception process by the client 109 of this embodiment. A program corresponding to this flowchart is included in the stream reception program 2100, and is executed by the CPU 2002. This stream reception program 2100 is called during execution of, e.g., the viewer program 2130. As will be described later, the benchmark program 2140 and option set limitation program 2120 are called during execution of the stream reception program 2130.

In step S2201, various setting parameters in the memory 2003 are initialized. In this case, the client stream load data 2150 with the configuration shown in FIG. 18 is loaded. The client stream load data 2150 has processing loads based on the performance of the CPU 2002 depending on camera control=ON/OFF for respective image sizes. In the example shown in FIG. 18, processing loads are described depending on camera control=ON/OFF for respective image sizes to have a processing load when an image size is 160×120 and camera control is ON as a reference (=1).

In step S2202, a connection request event is issued and is transmitted to the video delivery server 100. As described above, the video delivery server 100 executes the delivery control process (step S361 in FIG. 3) in response to reception of this connection request event, and transmits information of options of property candidates of video streams that can be provided according to the current situation to the client as the issuance source of the connection request event (step S1010 in FIG. 11).

Upon transmission of the connection request event in step S2202, a default stream type demand may be transmitted in some cases. However, the video delivery server 100 may reject connection or may send only options of streams of the demanded quality or lower.

In step S2206, the control waits for an event.

If information of options of property candidates of video streams which can be provided is received from the video delivery server 100 in step S2203, the information of options is saved in the memory 200 as the stream option set information 2160. After that, the option set limitation program 2120 is called to execute an option set limitation process for narrowing down the received options (step S2204). FIG. 19 shows an example of the configuration of the stream option set information 2160 at that time.

Figure 17:
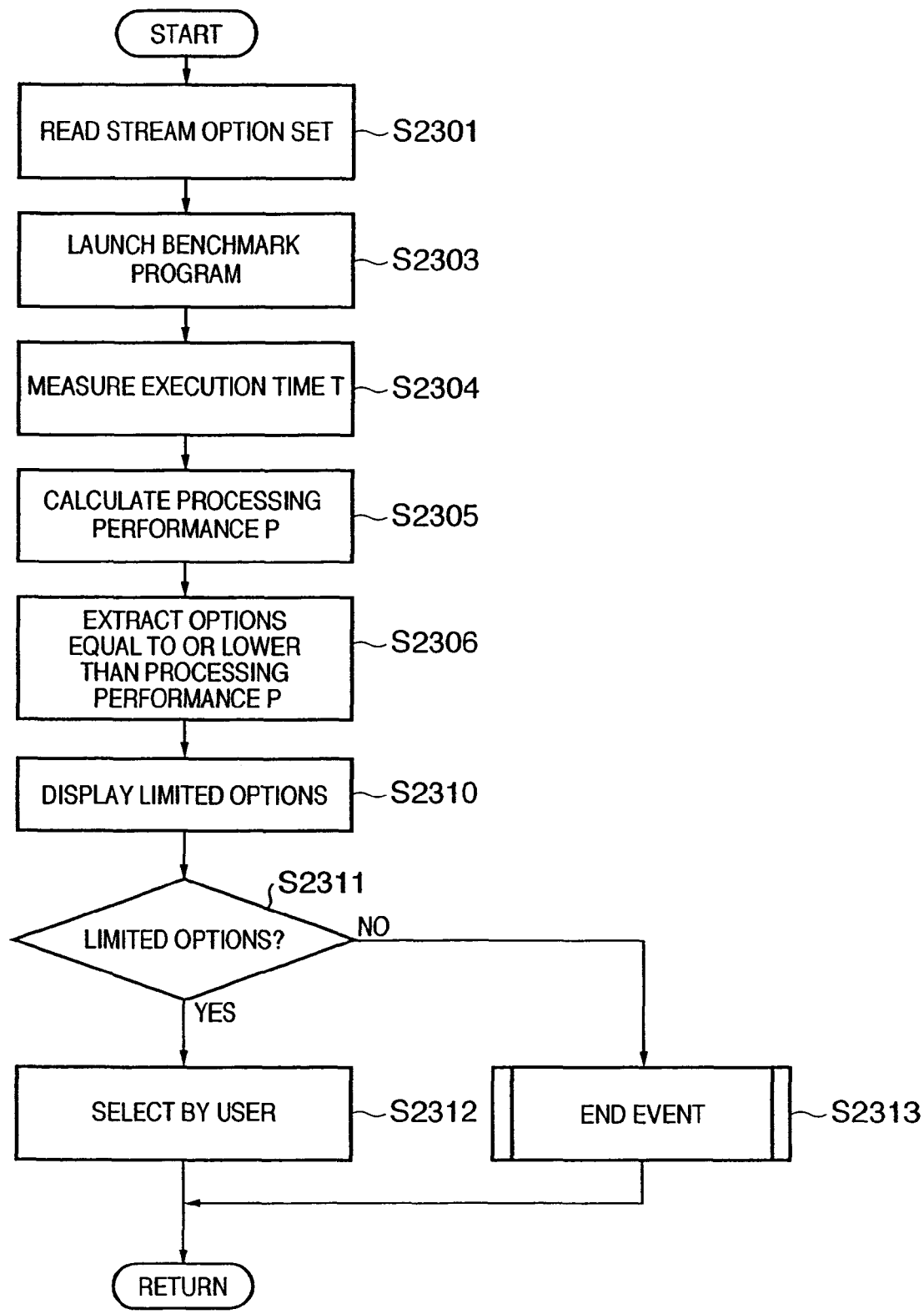
FIG. 17 is a flowchart showing an option set limitation process in the sixth embodiment.

The option set limitation process in step S2204 will be described below using the flowchart of FIG. 17.

After the stream option set information 2160 saved in the memory 2003 is loaded in step S2301, the benchmark program 2140 is launched to measure the current surplus processing performance which can be assigned to the viewer process (i.e., execution of the viewer program 2130) by the client 109 (step S2303).

This benchmark program 2140 is designed to easily estimate the processing performance which is consumed upon execution of the viewer program 2130, and a program which has a relatively light processing load is used. The benchmark program 2140 may be built in the viewer program 2130, and a surplus load may be measured upon launching the viewer program 2130. Assume that the viewer program 2130 includes an expansion process program of compressed video data, and the load on the expansion process is heaviest among those of the viewer program 2130. The benchmark program 2140 makes the viewer program 2130 execute an expansion process of compressed video data which is prepared in advance and has a known processing size.

In step S2304, a time T required for that expansion process is measured. Next, processing performance P as the surplus processing performance of the client is calculated from the execution time T (step S2305). In this case, the processing performance P is inversely proportional to the execution time T. For example, assuming that the processing performance P when the execution time T=100 msec is calculated as 2, the processing performance P when the execution time T=50 msec is calculated as 4.

In step S2306, options that require the processing performance P or less are extracted from the stream option set information 2160, and are stored as stream limited option set information 2170 in the memory 2003. If the processing performance is P or less, the current surplus processing performance of the client can assure a sufficient video display speed, frame rate, and the like. A case will be exemplified below wherein the stream option set information 2160 is as shown in FIG. 19, and the processing performance P calculated in step S2305 is 4. By referring to the stream option set information 2160 in FIG. 19, there are four different candidates for image sizes of 320×240 and 160×120 in correspondence with camera control=ON/OFF as options presented by the video delivery server 100. By referring to the client stream load data 2150 in FIG. 18, options which require the processing performance (=processing load) of 4 or less are narrowed down to three candidates, i.e., image size=320×240 and camera control=OFF, image size=160×120 and camera control=ON, and image size=160×120 and camera control=OFF. These three candidates are stored in the memory 2003 as the stream limited option set information 2170.

When the options are limited by the above process, the limited options are displayed in step S2310. It is checked in step S2311 if the options are limited. If the options are limited, the control prompts the user to select one of these options in step S2312. On the other hand, if the processing performance P calculated in step S2305 is too small to limit the options, the flow advances to step S2313 to issue an end event. In this way, the process in step S2204 is completed.

In the process in step S2312, a stream with a highest image quality that can be displayed may be automatically selected in place of making the user select a final candidate.

The description will revert to the flowchart of FIG. 16. Upon completion of the option set limitation process in step S2204, the flow advances to step S2205 to issue a video on-demand event. This event is transmitted to the video delivery server 100, and the flow returns to the event loop in step S2206.

If reception of a video stream from the video delivery server 100 (see step S332 in FIG. 3) is complete, and a reception complete event is issued (step S2207), the received video stream is sequentially fetched from the memory 2003 (step S2208), and is displayed on the display device 2004 (step S2209). After that, a continuous video on-demand event is issued in step S2211, and the flow returns to the event loop in step S2206.

If a connection reject response (see step S609 in FIG. 6) is received from the video delivery server 100 in step S2214, a termination request event is issued (step S2212), thus ending this multi-stream reception process.

According to the sixth embodiment described above, upon receiving options of property candidates of video streams that can be provided from the video delivery server 100, the client 109 estimates its processing performance at that time. The options of the candidates are further limited based on the estimated processing performance, and the limited options of the candidates are displayed. In this way, the user can easily designate a video stream with a property that matches the processing performance on the client side.

Seventh Embodiment

In this embodiment, property candidates of video streams that can be provided within the reserve capacity range of the video delivery server 100 are selected in consideration of information of priority set in each property.

Differences will be mainly described hereinafter on the basis of the third embodiment, but this embodiment can also be applied to the fourth and fifth embodiments.

Figure 20:
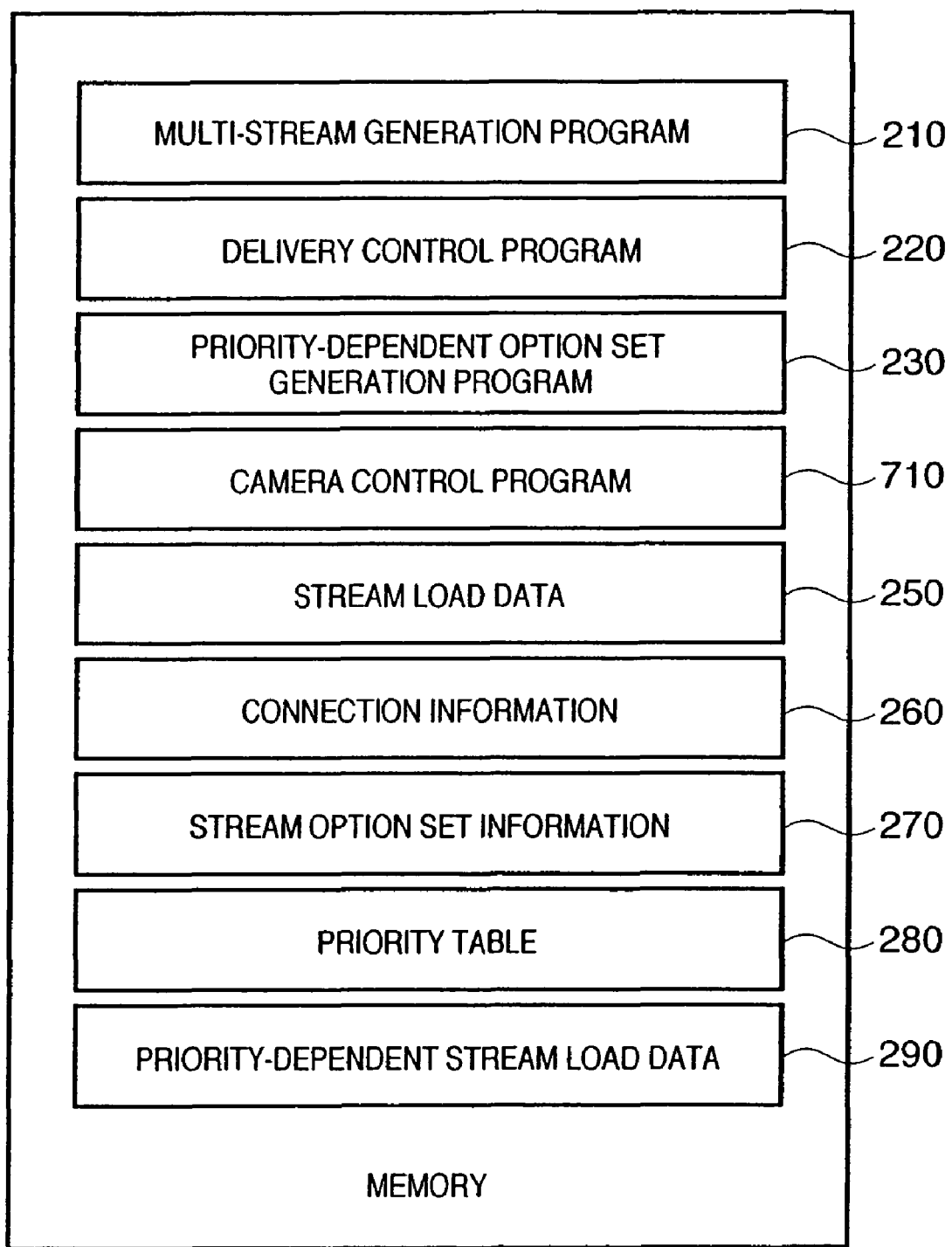
FIG. 20 shows programs and data stored in a memory of a video delivery server in the seventh embodiment.

The arrangement of the video delivery system according to this embodiment is the same as that shown in FIG. 1. However, the memory 104 stores a priority table 280 and priority-dependent stream load data 290, as shown in FIG. 20, in addition to the multi-stream generation program 210, delivery control program 220, camera control program 710, stream load data 250, connection information 260, and stream option set information 270, as in the second embodiment. Also, the stream load data 250 and connection information 260 of this embodiment respectively have the same configurations as in the third embodiment (see FIGS. 8 and 9). However, in this embodiment, the connection information 260 has the current contents shown in FIG. 22. That is, four viewers (clients) 109-1 to 109-4 are currently connected to the video delivery server 100.

The multi-stream generation process by the video delivery server 100 of this embodiment is basically executed in accordance with the flowcharts of FIGS. 3A and 3B described in the third embodiment or those of FIGS. 13A and 13B described in the fourth embodiment. However, in this embodiment, the delivery control process in step S361 is executed according to the flowchart in FIG. 21.

In step S5101, the connection information 260 is loaded. Also, the demanded video property included in the connection request event is loaded as in step S1001 in the third embodiment.

In step S5102, processing loads for respective connected clients are obtained with reference to the connection information 260 and stream load data 250 to calculate their sum total as a total load F (current processing load). A practical example will be explained below based on the connection information 260 in FIG. 22. As can be seen from the connection information 260 in FIG. 22, the viewers 109-1 to 109-4 are connected, and respectively demand video streams with properties "800×600 and camera control=OFF", "160×120 and camera control=ON", "640×480 and camera control=OFF", and "800×600 and camera control=OFF". By referring to the stream load data 250, the processing loads of these connections are respectively 25, 2, 16, and 25. Hence, the total load F is calculated as their sum total, i.e., 68 (an example of this value will be used later).

In step S5103, the upper limit value X of the server process is read out. As described above, the upper limit value X is typically a value which is set by the system administrator who recognizes the operation condition of the system as an upper limit value of the processing performance that he or she allows. In step S5104, a reserve capacity Y of the video delivery server 100 is calculated. The reserve capacity Y is calculated as the difference between the upper limit value X and total load F. After that, a priority-dependent option set generation program 230 is called in step S5105.

Figure 23:
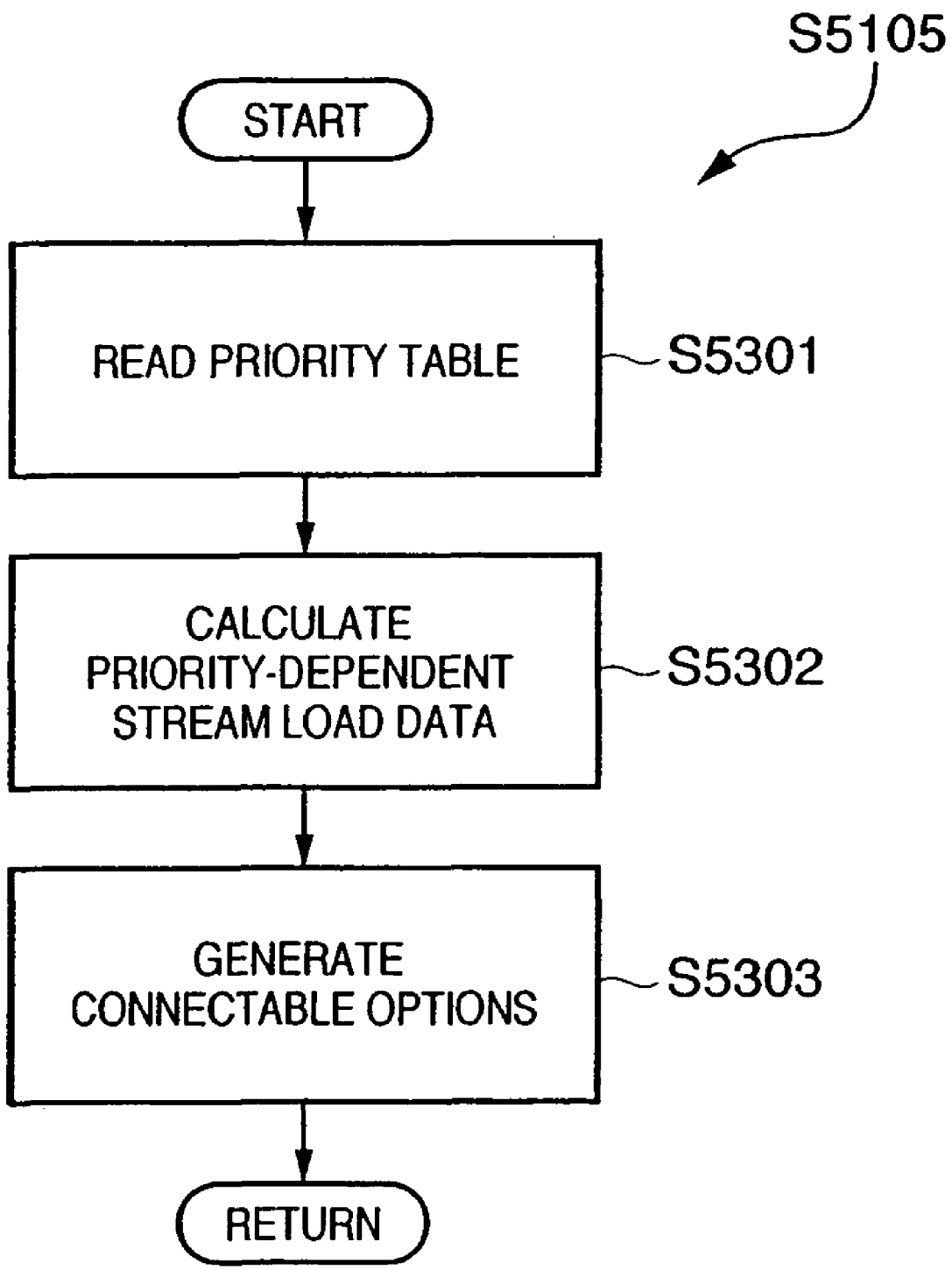
FIG. 23 is a flowchart showing a priority-dependent option set generation process in the seventh embodiment.

FIG. 23 shows an operation example of the priority-dependent option set generation program 230.

In step S5301, the priority table 280 with the configuration shown in FIG. 24 is loaded. The priority table in FIG. 24 describes information indicating priority values for respective cases classified in the same manner as in the stream load data 250 in FIG. 8. More specifically, in the example shown in FIG. 24, information indicating a priority value is set to be 0 when an image size=800×600 and both camera control=ON and OFF, and it is set to be 10 when an image size=640×480 and both camera control=ON and OFF. Information indicating a priority value is set to be 2 when an image size=320×240 and camera control=ON, it is set to be 0 when an image size=320×240 and camera control=OFF, and it is set to be 2 when an image size=160×120 and both camera control=ON and OFF. When the information indicating priority is zero, it indicates the highest priority.

In step S5302, the values of information indicating corresponding priority values described in the priority table 280 (FIG. 24) are added to the loads of respective cases described in the stream load data 250 (FIG. 8) to generate priority-dependent stream load assumed data 290. FIG. 25 shows an example of the obtained priority-dependent stream load assumed data 290. As can be easily understood, the result in FIG. 25 can be obtained by combining FIGS. 8 and 24.

In step S5303, property candidates of video streams that can be provided are read out from the priority-dependent stream load assumed data 290 on the basis of the reserve capacity Y calculated in step S5104, and stream option set information 270 shown in FIG. 26 is written in the memory 104. A practical example will be explained below under the assumption that the total load F is 68, as described above, and the upper limit value X is set to be 93. In this case, the reserve capacity Y is 93−68=25. After that, option sets whose load value is 25 (=reserve capacity) or less are extracted from the priority-dependent stream load assumed data 290 to form stream option set information 270 having respective sets as candidates. In the example of the priority-dependent stream load assumed data 290 in FIG. 25, "JPEG 800×600 and camera control=OFF", "JPEG 320×240 and camera control=ON", "JPEG 320×240 and camera control=OFF", "JPEG 160×120 and camera control=ON", and "JPEG 160×120 and camera control=OFF" are extracted, thereby forming the stream option set information 270 shown in FIG. 27.

In this case, the load values of cases "JPEG 640×480 and camera control=OFF" and "JPEG 640×480 and camera control=ON" are respectively 16 and 17 and fall within the reserve capacity range (=25) (see FIG. 8), but these cases are excluded from options since information=10 indicating priority is added. On the other hand, since no information indicating priority is added (information indicating priority=0) to the case "JPEG 800×600 and camera control=OFF", that case is extracted as an option set.

By setting the priority values in this way, a video stream with a property having a large processing load can be selected as an option candidate in preference to that with a property having a small processing load. That is, by setting the priority values, streams with specific properties having loads falling within the reserve capacity are manipulated not to be selected as options. On the other hand, streams with properties having loads higher than the streams with specific properties are manipulated to be selected as options. In this manner, the reserve capacity can be assigned to streams with properties having heavier loads.

By setting the priority values, the server administrator can create a tendency to increase the number of connections of the intended stream type. For example, when the server administrator wants to preferentially deliver video streams with larger sizes, he or she can lower priority values to streams with smaller sizes if they have smaller stream load values.

In the above example, as a value for specifying priority, a value indicates the highest priority when the information indicating priority is zero, and indicates lower priority levels with increasing value. Such value is specified under the condition that the value is added to the load of each property. On the other hand, priority can be defined as a weighting coefficient to be multiplied by the load of each priority. In this case, priority becomes higher with increasing numerical value.

Figure 21:
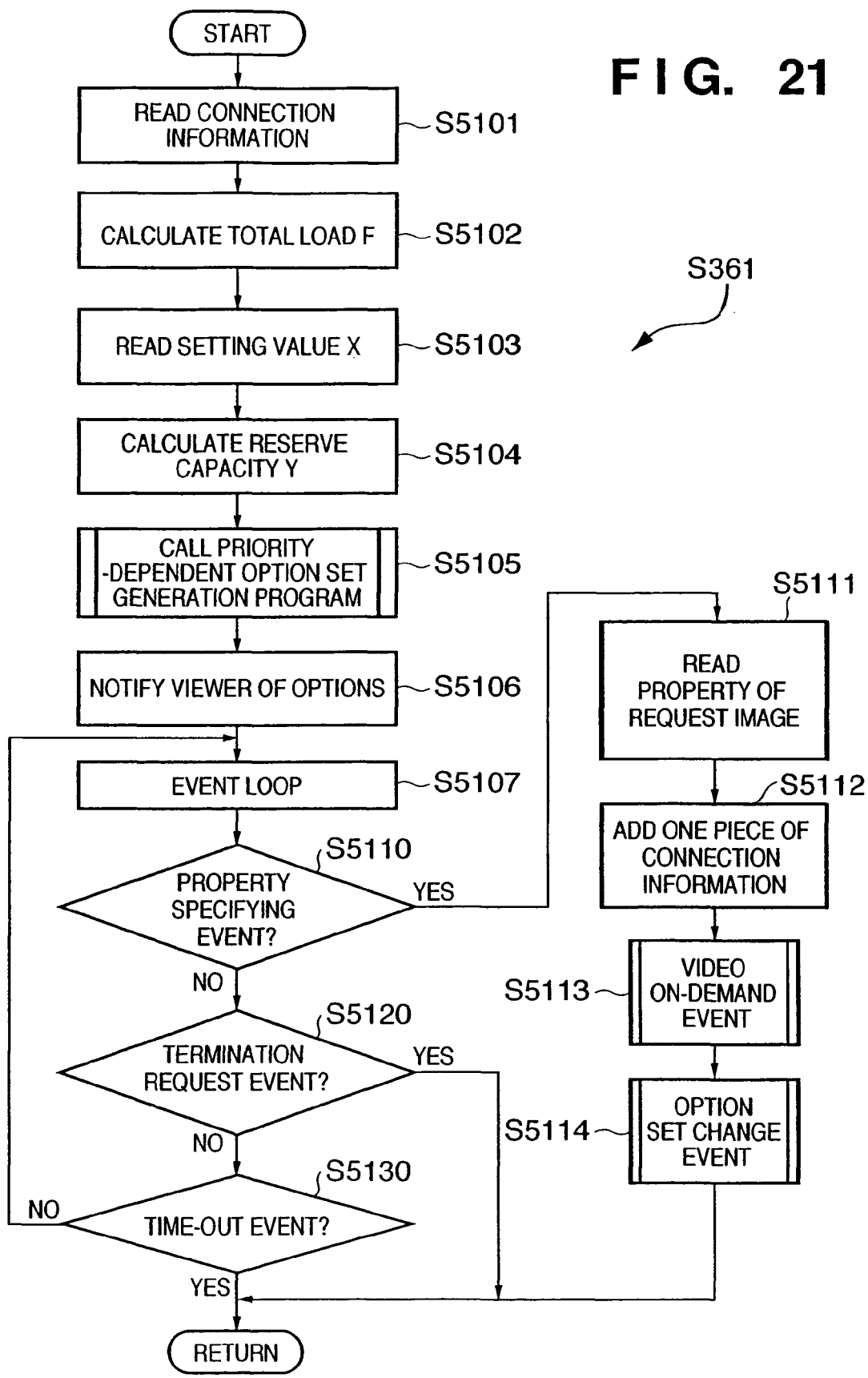
FIG. 21 is a flowchart showing a delivery control process in the seventh embodiment.

The description will revert to the flowchart of FIG. 21. The stream option set information 270 is sent to the client in step S5106, and the control waits for an event in step S5107.

If a property specifying request event based on the options is received from the client to which the stream option set information 270 is passed in step S5110, the flow advances to step S5111 to load the requested video property. At this time, the properties may be received as a selection number or the like of the stream option set information 270. Also, as in the first and second embodiments, OK/NG of connection may be controlled based on the upper limit value X, total load F, and requested priority-dependent stream load f.

In step S5112, information of the client as the issuance source of the property specifying request event is registered in the connection information 260. A video on-demand event is issued in step S5113, and an option set change event is issued in step S5114.

If a termination request event is received from the client to which the stream option set information 270 is passed in step S5120, or if a predetermined period of time has elapsed after the stream option set information 270 is passed to the client and a time-out event is issued in step S5130, this delivery control process ends.

Eighth Embodiment

In this embodiment, when the reserve capacity of processing performance is not large enough to deliver a video stream that matches a connection request, some reserve capacity is produced according to its priority, thus realizing delivery associated with the request.

The arrangement of the video delivery system according to this embodiment is the same as that in the seventh embodiment. That is, the arrangement of the video delivery system according to this embodiment is that shown in FIG. 1, and the contents stored in the memory 104 are as shown in FIG. 20.

As in the seventh embodiment, the multi-stream generation process by the video delivery server 100 of this embodiment is basically executed in accordance with the flowcharts of FIGS. 3A and 3B described in the third embodiment or those of FIGS. 13A and 13B described in the fourth embodiment. Also, the delivery control process in step S361 is executed according to the flowchart in FIG. 21. However, in this embodiment, the priority-dependent option set generation process in step S5105 is executed in accordance with the flowchart in FIG. 27 in place of that in FIG. 23.

In step S5701, the priority table 280 shown in FIG. 24 and the demanded video property loaded in step S5101 are read out. In step S5702, the values of information indicating corresponding priority values described in the priority table 280 (FIG. 24) are added to the loads of respective cases described in the stream load data 250 (FIG. 8) to generate priority-dependent stream load assumed data 290 as in step S5302 in the seventh embodiment. In step S5703, property candidates of video streams that can be provided are read out from the priority-dependent stream load assumed data 290 on the basis of the reserve capacity Y calculated in step S5104, thereby generating stream option set information 270 shown in FIG. 26.

It is then checked in step S5704 if the demanded video property loaded in step S5701 is included in the stream option set information 270 generated in step S5703. If the demanded video property is included in the stream option set information 270, the control exits this priority-dependent option set generation process. On the other hand, if the demanded video property is not included in the stream option set information 270, the flow advances to step S5705.

In step S5705, the priority of the demanded image property is confirmed with reference to the priority table 280, and it is checked with reference to the connection information 260 and priority table 280 if a connection for stream delivery with priority lower than that of the demanded image property has been established. If the connection for stream delivery with priority lower than that of the demanded image property has not been established yet, the control exits the priority-dependent option set generation process. On the other hand, if the connection for stream delivery with priority lower than that of the demanded image property has been established, the flow advances to step S5706 to issue a connection reject event to the client of that connection destination. After that, information associated with the client whose connection is rejected is deleted from the connection information 260 in step S5707.

A practical example of steps S5705 and S5706 will be explained below. Assume that the client that issued a connection request event to be processed is 109-5, four other clients (109-1 to 109-4) are currently connected, and the connection information 260 at that time is as shown in FIG. 22. Also, the demanded video property included in the connection request event loaded in step S5701 is "JPEG 800×600 and camera control=OFF".

The priority of the demanded video property is confirmed with reference to the priority table 280. By referring to the priority table 280 in FIG. 24, the value of the priority of the demanded video property "JPEG 800×600 and camera control=OFF" is set to be "0", i.e., the highest priority.

It is checked with reference to the connection information 260 and priority table 280 if a connection associated with a video stream of the priority having priority lower than that of the demanded video priority has been established. By checking the priority table 280 in FIG. 24, the property of a video stream to the clients 109-1 and 109-4 is "JPEG 800×600 and camera control=OFF", and the value of its priority is "0". On the other hand, the property of a video stream to the client 109-2 is "JPEG 160×120 and camera control=ON", and the value of its priority is set to be "2" with reference to the priority table 280 in FIG. 24. The property of a video stream to the client 109-3 is "JPEG 640×480 and camera control=OFF" and the value of its priority is set to be "10" with reference to the priority table 280 in FIG. 24. It is then determined that connections to these clients 109-2 and 109-3 are associated with the video streams with the properties having priority values lower than that of the demanded video property.

In step S5706, a connection reject event may be immediately issued to both these two clients 109-2 and 109-3. In this case, a connection reject event is issued to only the client having the highest priority-dependent load assumed value (see FIG. 25) (i.e., the client 109-3). In this way, since the connection to the client 109-3 is canceled, the reserve capacity increases. If the reserve capacity is still not large enough to generate a video stream of the demanded video property, a connection reject event may also be issued to the client 109-2.

The practical examples of steps S5705 and S5706 has been described.

In step S5708, the stream option set information 270 is generated again as in step S5703. In this case, since one data is deleted in step S5707, the stream option set information 270 includes the demanded video property of the client which issued the connection request event to be processed.

The priority-dependent option set generation process ends.

According to the priority-dependent option set generation process, when a connection request to a stream with a priority having higher priority is received, and the reserve capacity is insufficient, the reserve capacity is produced by stopping delivery of a video stream with a property with lower priority, thus implementing delivery of the stream with a priority having higher priority.

In place of canceling the connection to the client as the delivery destination of the stream with lower priority (without executing steps S5706 and S5707), the reserve capacity Y under the assumption that the connection to the client with low priority is canceled is calculated, the load on the stream of the demanded video property with high priority is subtracted from the reserve capacity Y to re-generate options, and the options may be presented to the client associated with the stream having low priority in step S5708. In this case, the connection to the client associated with delivery of the stream with low priority can be switched to a stream of another property without being disconnected, thus continuing delivery to that client.

Ninth Embodiment

In the seventh and eighth embodiments, priority information is set in each priority of a video stream. In this embodiment, priority is set for each client, and options of video streams of properties that can be provided are generated in consideration of that priority.

The arrangement of the video delivery system according to this embodiment is the same as that in the eighth embodiment. That is, the arrangement of the video delivery system according to this embodiment is that shown in FIG. 1, and the contents stored in the memory 104 are as shown in FIG. 20.

The multi-stream generation process by the video delivery server 100 of this embodiment is basically executed in accordance with the flowcharts of FIGS. 3A and 3B described in the third embodiment or those of FIGS. 13A and 13B described in the fourth embodiment. Also, the delivery control process in step S361 is executed according to the flowchart in FIG. 21. As in the eighth embodiment, the priority-dependent option set generation process in step S5105 is executed in accordance with the flowchart in FIG. 27 in place of that in FIG. 23.

However, the data configuration of the priority table 280 is different from that (FIG. 24) in the eighth embodiment. FIG. 28 shows an example of the configuration of the priority table 280 of this embodiment. The priority values of the eighth embodiment are set for properties of video streams, as shown in FIG. 24, but the priority values of this embodiment are set for clients (viewers), as shown in FIG. 28.

The setting value indicating this priority can be changed according to the operation of the system administrator in the video delivery server 100. Also, the setting value indicating the priority of a given client can be changed in accordance with an instruction from that client.

For example, each client can include information indicating priority of that client in a connection request event to be issued to the video delivery server 100 in addition to the demanded video property. Upon reception of the connection request event, the video delivery server 100 updates the corresponding field of the priority table 280 by information indicating priority included in that event.

In this embodiment, operations different from the eighth embodiment in association with this will be explained below.

In the delivery control process in FIG. 21, the connection information 260 and the demanded video property included in the connection request event are loaded in step S5101. Furthermore, if the connection request event includes information of priority of that client, that information is loaded.

Figure 27:
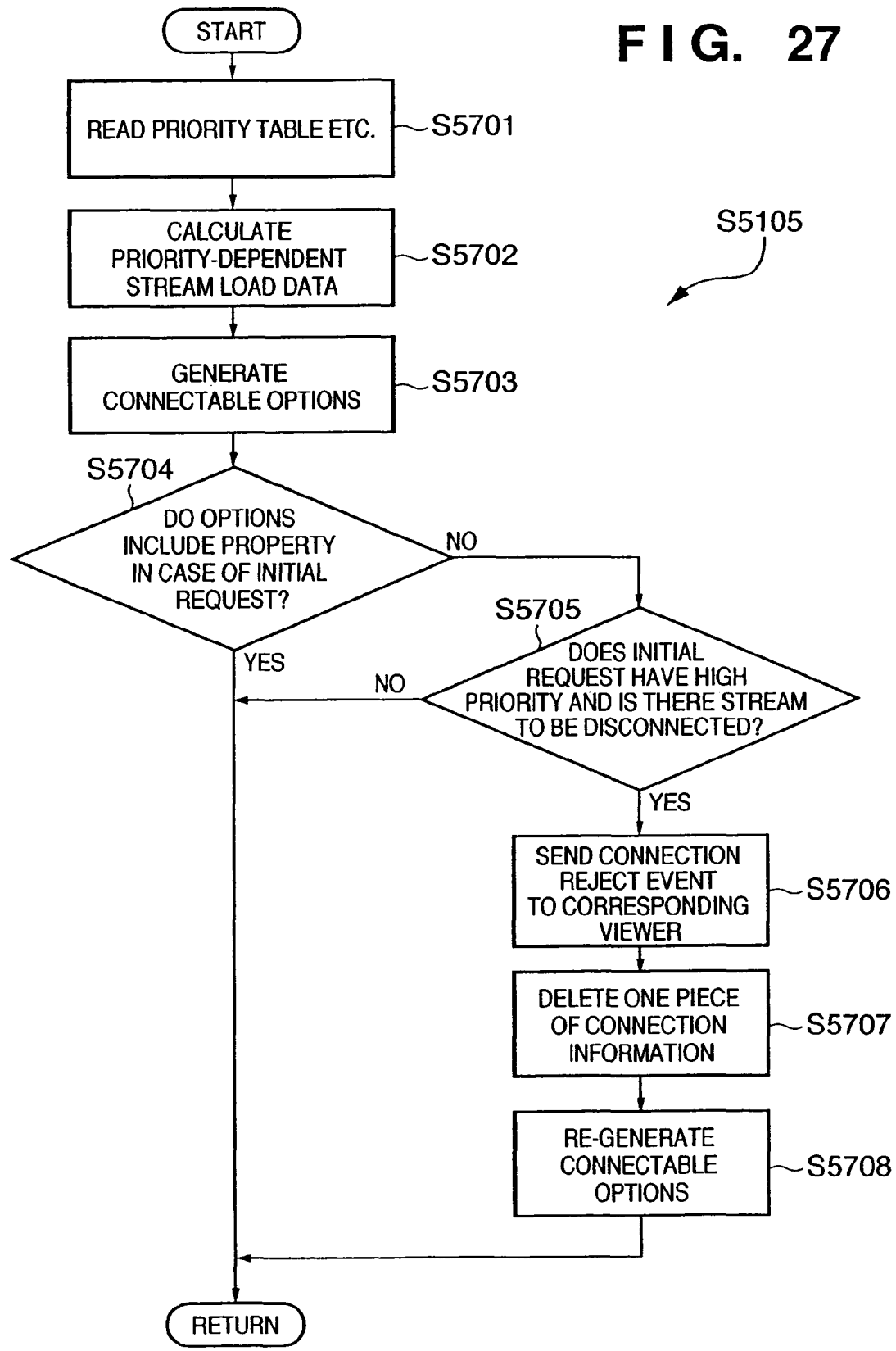
FIG. 27 is a flowchart showing a priority-dependent option set generation process in the eighth embodiment.

In the priority-dependent option set generation process in FIG. 27, the priority table 280 shown in FIG. 28, and the demanded video property and information of priority of that client loaded in step S5101 are read out in step S5701. If the information of priority of the client is read out, the corresponding field of the priority table 280 is updated by that information.

In step S5702, the value indicating priority of the client described in the priority table 280 (FIG. 28) is added to the loads of respective cases described in the stream load data 250 (FIG. 8), thus generating priority-dependent stream load assumed data 290. FIG. 29 shows an example of the priority-dependent stream load assumed data 290 in this case.

When the connection request event does not include any information of priority of that client since no priority is designated on the client side, and that client is not registered in the priority table 280, a default value (e.g., 20) set in advance in the video delivery server 100 is used.

The differences from the eighth embodiment have been explained. Except for these differences, the same processes as in the eighth embodiment are executed.

According to the ninth embodiment described above, priority values are set for clients which can be connected to the video deliver server 100 (i.e., clients which can receive delivery of a video stream from the video deliver server 100), and options of video streams of properties that can be provided with the reserve capacity range of the video deliver server 100 are generated on the basis of the priority and the demanded video property. In this way, different contents of options are presented depending on a client that issued a connection request. For this reason, video streams with properties having heavier processing loads are included in options for a client set with higher priority, and higher performance is distributed to such client within the performance range of the server.

In the above example, priority values are set for clients. As another variation based on the same concept, priority values may be set for users, and options of video streams of properties that can be provided may be generated. For example, in response to reception of a connection request event from a client, the video delivery server 100 may execute a user authentication process for that client, and may set user priority via this user authentication.

10th Embodiment

In the third embodiment, options of video streams that can be provided with the reserve capacity range of the video delivery server 100 are presented to the client especially by the processes in steps S1001 to S1010 in the delivery control process shown in FIG. 11.

In the seventh embodiment, options of video streams that can be provided with the reserve capacity range of the video delivery server 100 are presented to the client especially by the processes in steps S5101 to S5106 in the delivery control process shown in FIG. 21.

These processes can be considered as an evaluating step required to generate options in the video delivery server 100.

In the sixth embodiment that has explained the processing example on the client side, the multi-stream reception process shown in FIG. 16 executes the option set limitation process in step S2204. In this option set limitation process, limited options are obtained especially by the processes in steps S2301 to S2306. Then, a video on-demand event is issued in step S2205 in FIG. 16. These processes can be considered as a selection request step of selectively demanding a reception stream.

In this embodiment, by configuring means for implementing the aforementioned evaluating step and selection request step as independent processing modules, a degree of freedom can be easily provided to an evaluation reference of options and a selection reference of a reception stream.

Figure 30:
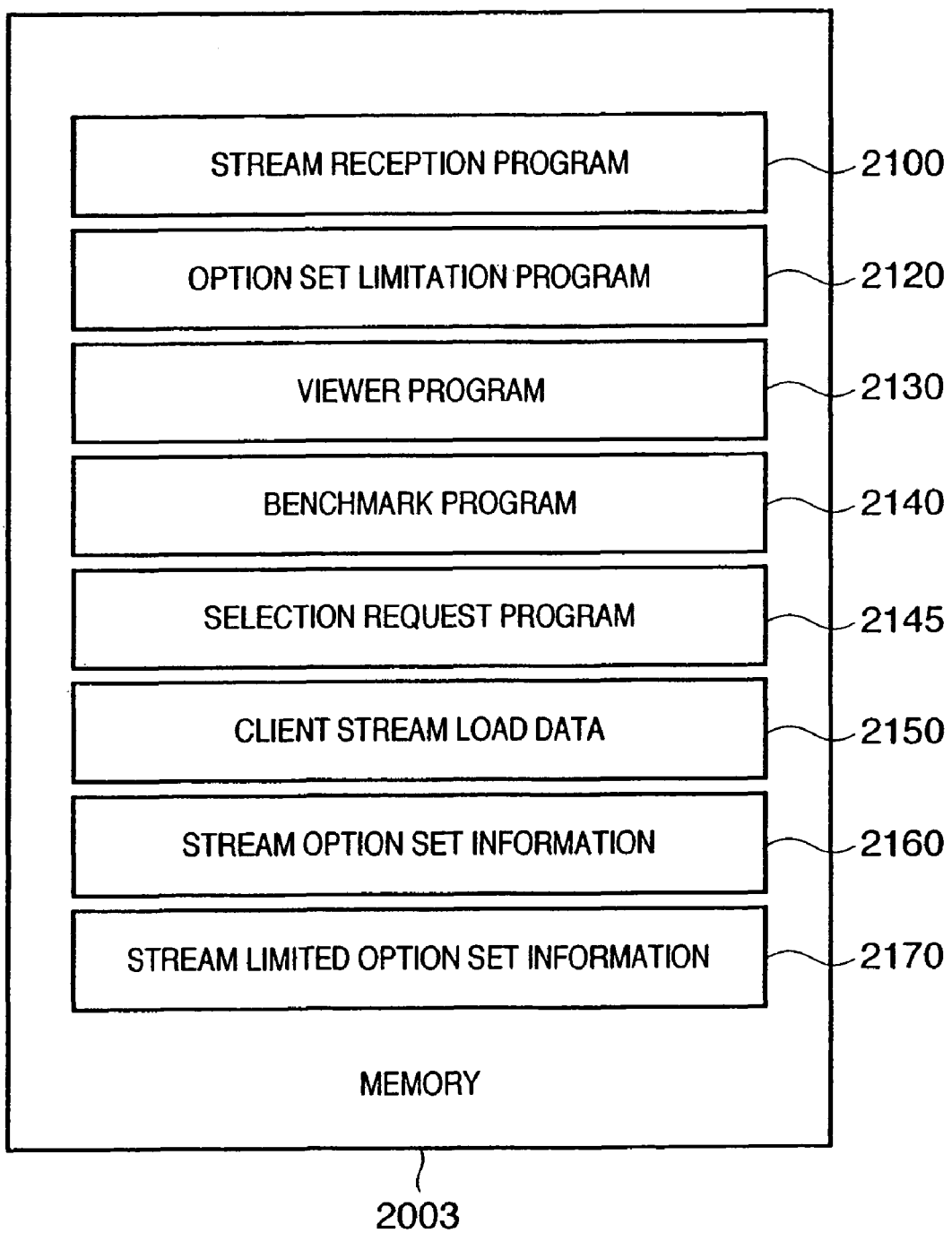
FIG. 30 shows programs and data stored in a memory of a client in the 10th embodiment.

The arrangement of the video delivery system according to this embodiment is the same as that shown in FIG. 1. The arrangement of the client 109 is the same as that shown in FIG. 14 described in the sixth embodiment. However, the contents stored in the memory 2003 of the client 109 are as shown in FIG. 30. The contents in FIG. 30 are substantially the same as those in FIG. 15 according to the sixth embodiment. However, as can be seen from comparison between FIGS. 30 and 15, a selection request program 2145 is included in FIG. 30 of this embodiment in place of the benchmark program 2140.

Figure 31:
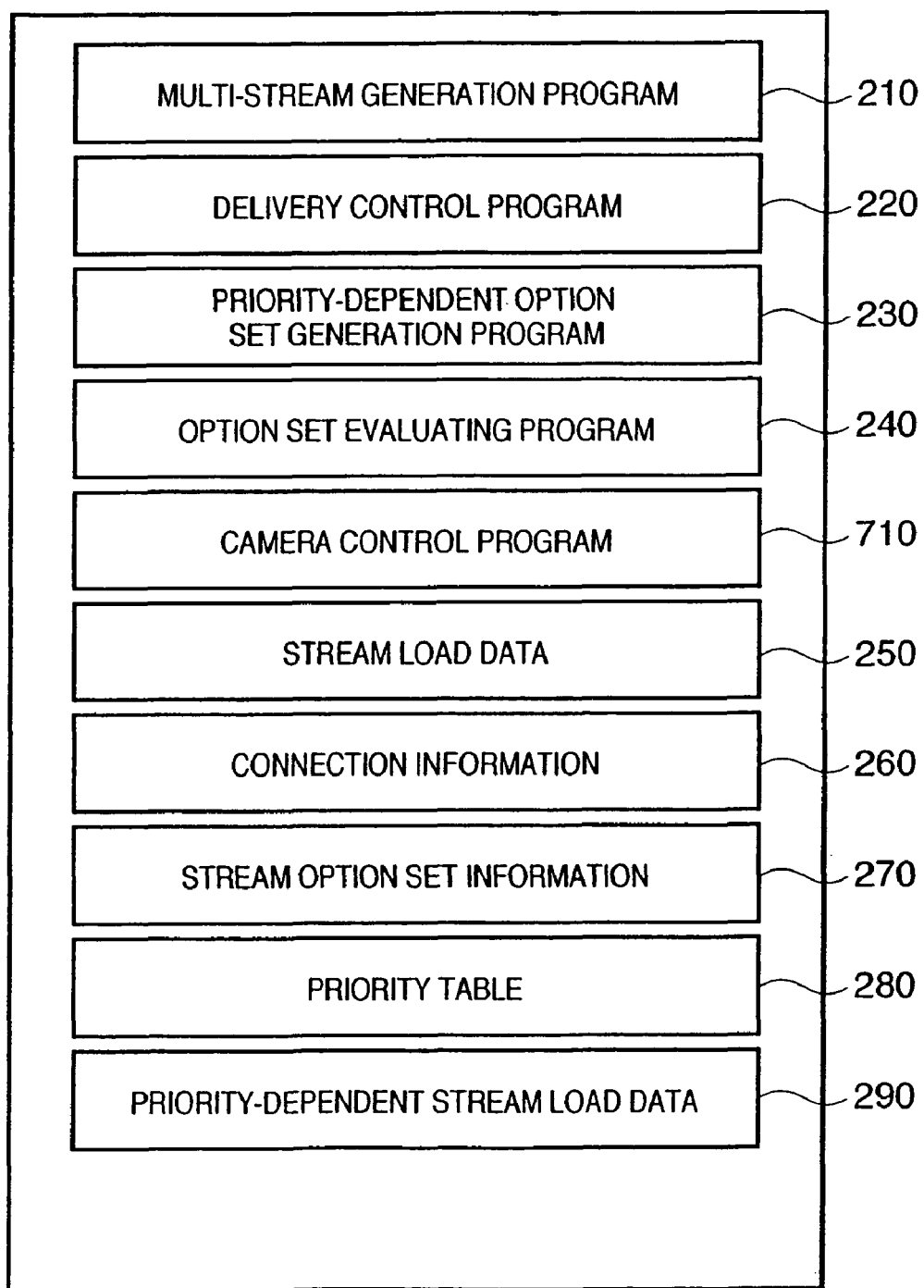
FIG. 31 shows programs and data stored in a memory of a video delivery server in the 10th embodiment.

On the other hand, the contents stored in the memory 104 of the video delivery server 100 are as shown in FIG. 31. The contents in FIG. 31 are substantially the same as those in FIG. 20 according to the seventh embodiment. However, as can be seen from comparison between FIGS. 31 and 20, an option set evaluating program 240 is additionally included in FIG. 31 according to this embodiment.

Figure 32:
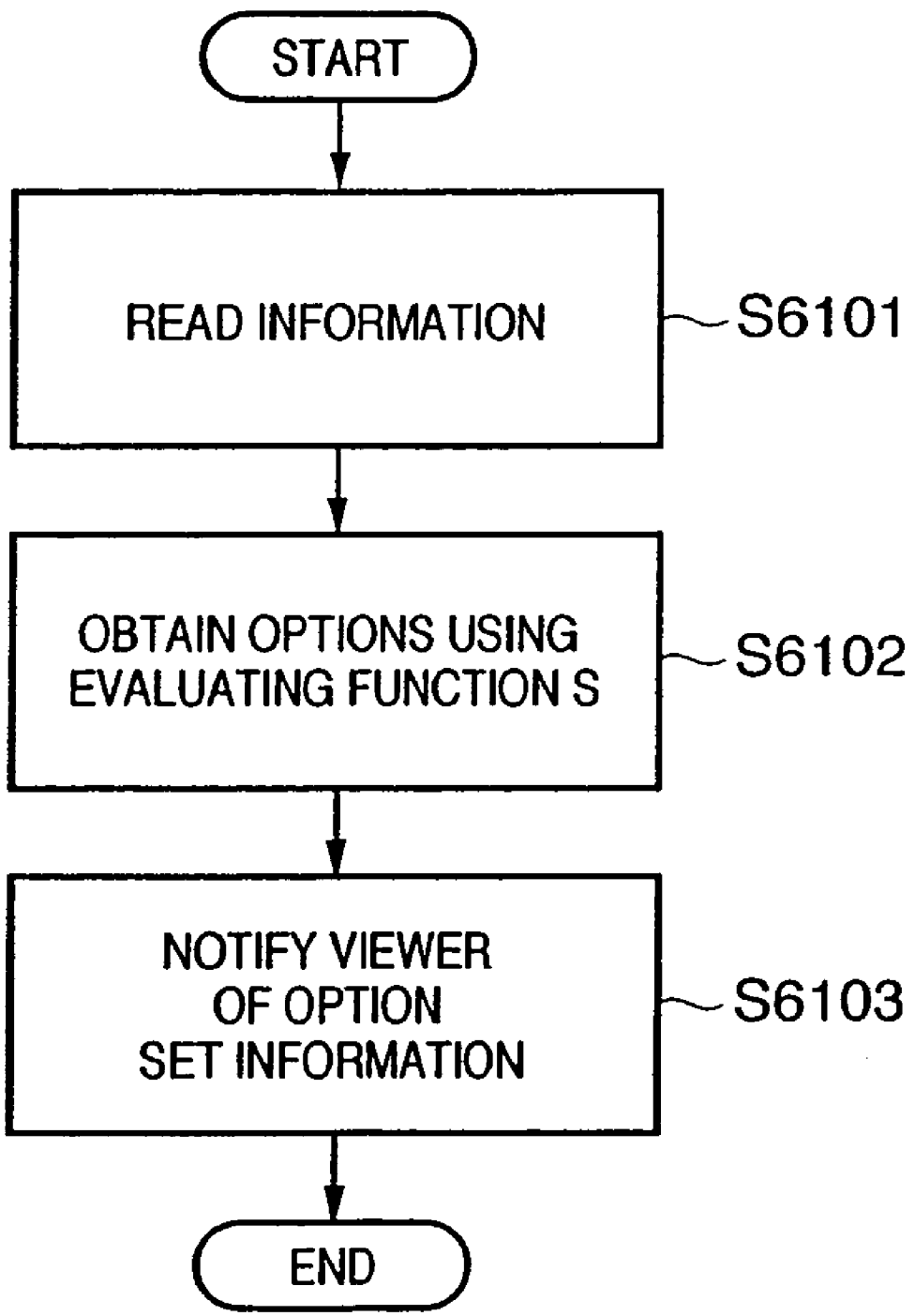
FIG. 32 is a flowchart showing an option set evaluating process by a video delivery server in the 10th Embodiment.

FIG. 32 is a flowchart showing the option set evaluating process by the video delivery server 100 in this embodiment. A program corresponding to this flowchart is the option set evaluating program 240.

In step S6101, information required for evaluation (including the connection information 260, the demanded video property extracted from the connection request event, the upper limit value X, and the like) is loaded. In step S6102, options are calculated using an evaluating function S on the basis of the loaded information.

For example, as for the third embodiment that informs the client of candidates of video streams that can be provided within the reserve capacity range of the video delivery server 100 as options, the evaluating function S is a function that implements the processes of step S1002 (calculation of the total load F), step S1008 (calculation of the reserve capacity Y), and step S1009 (generation of options) shown in FIG. 11.

As for the seventh embodiment which obtains candidates of video streams that can be provided within the reserve capacity range of the video delivery server 100 in consideration of the priority information set for each property, and informs the client of these candidates as options, the evaluating function S is a function that implements the processes in step S5102 (calculation of the total load F), step S5104 (calculation of the reserve capacity Y), and step S5105 (priority-dependent option set generation process) shown in FIG. 21.

Since the option set evaluating program 240 is a module independent from the delivery control program 220, it becomes very easy to arbitrarily modify the evaluating function S, as described above, compared to a case wherein the program 240 is built in the delivery control program 220. Since the option set evaluating program 240 has such evaluating function S, the delivery control program 220 need not have the processing parts implemented by the evaluating function S.

In step S6103, information of the obtained options and the like is sent to the client as the issuance source of the connection request event.

Figure 33:
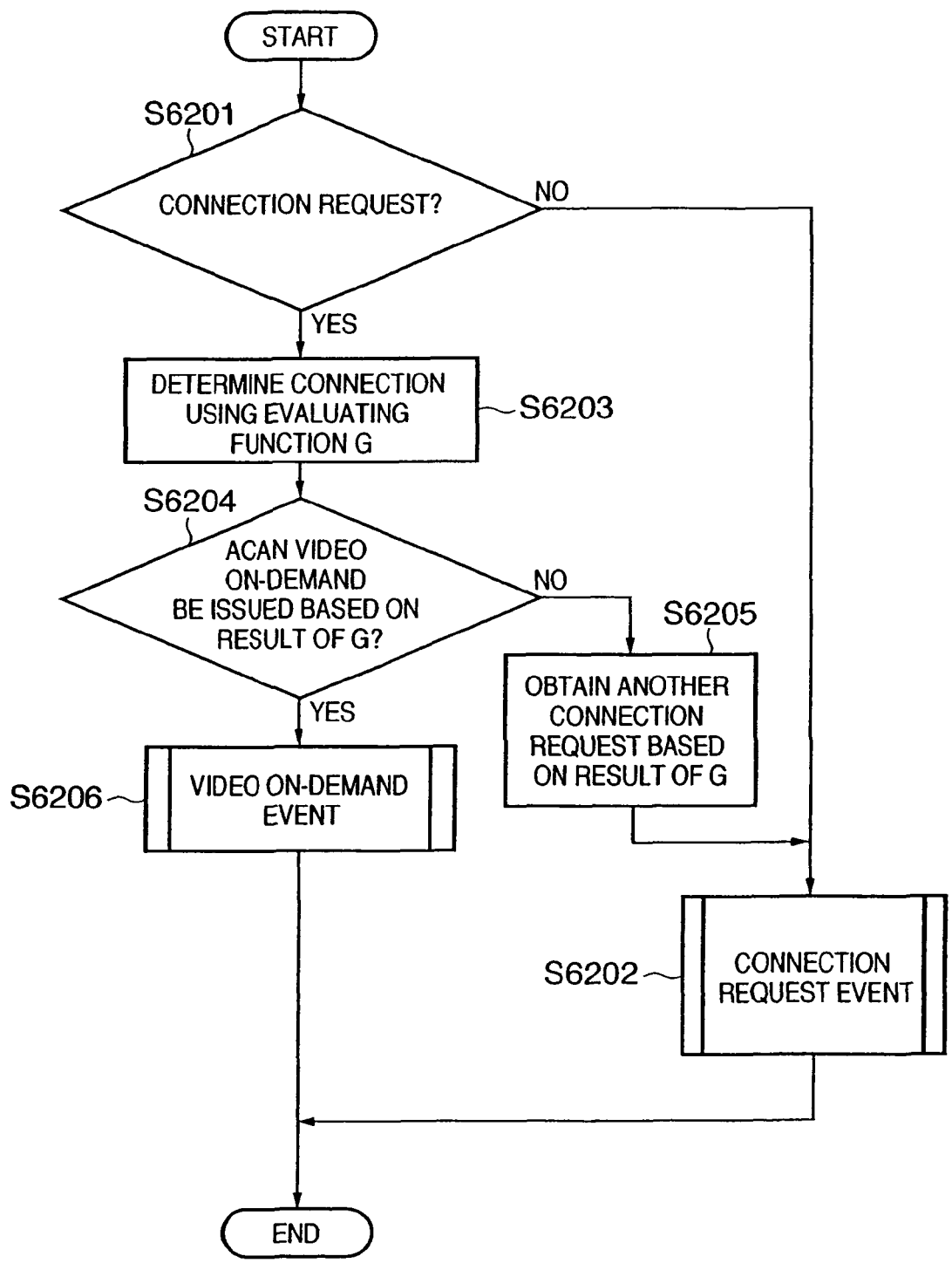
FIG. 33 is a flowchart showing a selection demand process by a client in the 10th embodiment.

FIG. 33 is a flowchart showing the selection request process by the client 109 of this embodiment. A program corresponding to this flowchart is the selection request program 2145, which is executed by the CPU 2002.

It is checked in step S6201 if a connection request event is issued. If no connection request event is issued, the flow advances to step S6202. In step S6202, a connection request event is issued and is transmitted to the video delivery server 100 by the same process as in step S2202 by the multi-stream reception program 2100 of the sixth embodiment. After that, this selection request process ends.

If the connection request event is issued in step S6201, the flow advances to step S6203, and a video stream to be demanded is selected using an evaluating function G. For example, as for the sixth embodiment, the evaluating function G corresponds to the process for calling the option set limitation program 2120.

It is checked in step S6204 based on the result of the evaluating function G if a video on-demand event can be issued. If it is determined that the video on-demand event cannot be issued, the flow advances to step S6205 to determine a connection request according to the result of the evaluating function G. A connection request event is issued and transmitted to the video delivery server 100 in step S6202, thus ending this selection request process. In this case, the connection request itself may be aborted depending on the result of the evaluating function G. On the other hand, if it is determined in step S6204 based on the result of the evaluating function G that the video on-demand request can be issued, the flow advances to step S6206. In step S6206, a video on-demand event is issued and is transmitted to the video delivery server 100 in the same manner as in step S2205 by the multi-stream reception program 2100 of the sixth embodiment. After that, this selection request process ends.

This embodiment is characterized in that processing parts associated with generation of options are configured by a module independent from the delivery control program 220 in the video delivery server 100. In this manner, an arbitrary evaluating function S can be easily described.

In the client 109 as well, selection request processing parts associated with issuance of a connection request event and video on-demand event are configured by a module independent from the multi-stream reception program 2100. In this way, an arbitrary evaluating function G can be easily described.

11th Embodiment

Variations of the evaluating function S or G described in the 10th embodiment will be described below.

For example, a priority update process can be implemented according to payment of a usage charge of multi-stream delivery.

The client 109 issues a connection request event which includes user information by user authentication and usage charge (amount) information for the current connection upon issuing the first connection request in step S6202 by the same process as in step S6201 by the selection request program 2145 of the 10th embodiment.

In response to this request, the video delivery server 100 loads the usage charge information to be paid for the connection request by the same process as in step S6101 of the option set evaluating program 240 of the 10th embodiment.

The evaluating function S of step S6102 is substantially the same as that in the 10th embodiment. However, this embodiment includes a process for updating priority associated with the connection request of interest in correspondence with the loaded usage charge (to update the priority table 280). For example, a priority value can be updated by 1 per usage charge of ¥100. A practical example will be explained below. For example, when the user of the viewer with a priority value=10 pays ¥100, his or her priority value can be updated to 9. In this way, the user can connect by updating his or her priority by paying a usage charge.

For example, a priority update process can also be implemented by so-called point addition corresponding to the number of times of connections.

The client 109 issues a connection request event which includes user information by user authentication upon issuing the first connection request in step S6202 by the same process as in step S6201 by the selection request program 2145 of the 10th embodiment.

In response to this request, the video delivery server 100 loads the user authentication information for the connection request by the same process as in step S6101 of the option set evaluating program 240 of the 10th embodiment.

The evaluating function S of step S6102 is substantially the same as that in the 10th embodiment. However, this embodiment manages points according to the number of times of connections for respective users, and a priority value is updated in accordance with the points (to update the priority table 280). For example, when the accumulated points of user A reach 100 points, the priority value of user A is updated by 1. A practical example will be explained below. For example, when the user of the viewer with a priority value=10 makes 100 connections, his or her priority value can be updated to 9. In this way, the user can connect by updating his or her priority by making connections again and again.

A priority update process can be implemented by bidding multi-stream delivery.

The client 109 issues a connection request event which includes user information by user authentication and bidding amount (auction) information for the current connection upon issuing the first connection request in step S6202 by the same process as in step S6201 by the selection request program 2145 of the 10th embodiment.

In response to this request, the video delivery server 100 loads the bidding amount information for the connection request by the same process as in step S6101 of the option set evaluating program 240 of the 10th embodiment.

The evaluating function S of step S6102 is substantially the same as that in the 10th embodiment. However, this embodiment includes a process for updating priority associated with the connection request of interest in accordance with the loaded bidding amount information (to update the priority table 280). For example, when a plurality of users A, B, and C issue connection requests including bidding amounts of ¥100, ¥200, and ¥300, only user C is preferentially connected in practice by setting the priority value of C to be 0 and setting the priority values of A and B to be 100.

For example, a priority update process can be implemented by issuing points, a coupon, or the like, which can be used later, when the user gives up a connection due to insufficient reserve capacity of the video delivery server 100.

The client 109 issues a connection request event which includes user information by user authentication and a specific stream connection request upon issuing the first connection request in step S6202 by the same process as in step S6201 by the selection request program 2145 of the 10th embodiment.

In response to this request, the video delivery server 100 loads the user information and stream property by the same process as in step S6101 of the option set evaluating program 240 of the 10th embodiment.

The evaluating function S of step S6102 is substantially the same as that in the 10th embodiment. However, this embodiment includes a process for issuing predetermined points to the user when a connection request to the received specific stream cannot be implemented (when that specific stream cannot be included in options), and updating priority according to the point information when the identical user attempts to connect within a predetermined period of time (to update the priority table 280). For example, a priority value can be updated by 1 per point. Thus, a connection can be implemented while rewarding the user whose initial connection is rejected.

The specific priority value is updated in accordance with the usage charge, the number of connections, points, and the like. Of course, the same effect can be obtained by lowering the priority values of clients (or users) other than the client (or user) of interest. In this case, as described in step S5705 by the priority-dependent option set generation program 230 in FIG. 27, the user whose priority value is decreased may undergo connection rejection, and the priority values of other users can substantially be increased. When a connection reject event is issued in step S5706, the priority value that undergoes connection rejection may be returned to an initial value. If the priority value is not returned to an initial value, it may be recovered when the user pays some usage charge, points or the like; if the priority value is returned to an initial value, every users are equal at an initial connection.

12th Embodiment

Still other variations of the evaluating functions S and G will be explained below.

FIG. 34 shows an example of stream load data of this embodiment. This data configuration is substantially the same as that of the stream load data shown in FIG. 8, except that a video stream which has an image size of 640×480 obtained by enlarging a 320×240 video stream is added as a variation of an image size of 640×480. As for a normal 640×480 video stream, the load when camera control=ON is 17, and that when camera control=OFF is 16. However, as for a video stream which has an image size of 640×480 obtained by enlarging a 320×240 video stream, the load when camera control=ON is 9, and that when camera control=OFF is 8. Hence, as can be seen from FIG. 34, the load is largely reduced. This is an example for a video stream having an image size of 640×480, and the same settings can apply to video streams of other sizes. However, in this embodiment, a description thereof will be omitted.

Assume that the client that issued a connection request event to be processed is 109-5, four other clients (109-1 to 109-4) are currently connected, and the connection information 260 at that time is as shown in FIG. 22. The upper limit value X is set to be 70. By referring to the connection information 260 in FIG. 22, the clients 109-1 to 109-4 respectively demand video streams having video properties:

800×600 and control=OFF (1)

160×120 and control=ON (2)

640×480 and control=OFF (3)

800×600 and control=OFF (4)

By referring to the stream load data 250 in FIG. 34, the loads on these requests are respectively 25, 2, 16, and 25. Hence, the total load F=25+2+16+25=68. In this state, assume that the client 109-5 issues a connection request "640×480 and control=ON". The load f on the request is f=17 with reference to the stream load data 250 in FIG. 34. Then, in this case, F+f=68+17=85, which exceeds the upper limit value X=70. In this state, a connection according to the request of the client 109-5 must be rejected.

Hence, in this embodiment, based on the stream load data 250 in FIG. 34, a normal video property "640×480 and control=OFF" is excluded from options temporarily generated by the process in step S1009 in FIG. 11, and a property "640×480 and control=OFF" as an enlarged version of 320×240 is added instead. Furthermore, the property "640×480 and control=ON" demanded by the client 109-5 is substituted by "640×480 and control=OFF" as the enlarged version of 320×240 in place of normal "640×480 and control=OFF". If such adjustment is implemented, the total load F+f upon establishing a connection of the client 109-5 is F+f=25+2+8+25+9=69, which does not exceed the upper limit value=70, thus connecting all clients. After such adjustment, a connection request option set change event can be issued.

Hence, this embodiment executes the following processes. The current total load F (the loads on the clients 109-1 to 109-4) and the load (the load on the client 109-5) on the connection request to be processed are estimated, and it is checked if the total of these loads (i.e., the total load upon establishing the connection of the client 109-5) exceeds the upper limit value X. If the total load exceeds the upper limit value, the control requests another corresponding client and/or the client 109-5 to substitute at least one of temporarily extracted candidates by another candidate which has a similar property (by enlarging an image with a size smaller than the request) and a lighter load. When the other client and/or the client 109-5 respond/responds to such request and the total load upon establishing the connection of the client 109-5 becomes smaller than the upper limit value X, a connection similar to the original request from the client can be implemented.

On the client side, for example, when the property "640×480 and control=OFF" is requested but it cannot be selected, the evaluating function G in step S6203 in FIG. 33 substitutes it by "640×480 and control=OFF" as an enlarged version of 320×240, and makes the client re-select in step S6205. Hence, such embodiment is also available.

13th Embodiment

In each of the above embodiments, the load on the video delivery server 100 is estimated on the basis of the table (stream load data) that describes loads for respective cases in advance. In this case, the estimated and actual loads have a difference depending on the connection states of clients, and even when the processing performance of the server has a margin in practice, a connection of a client may be rejected, or only options of streams with smaller data sizes may be generated.

Hence, in this embodiment, the load state of the CPU of the video delivery server 100 is actually measured, and the performance of the server is efficiently used using this actually measured value.

Figure 35:
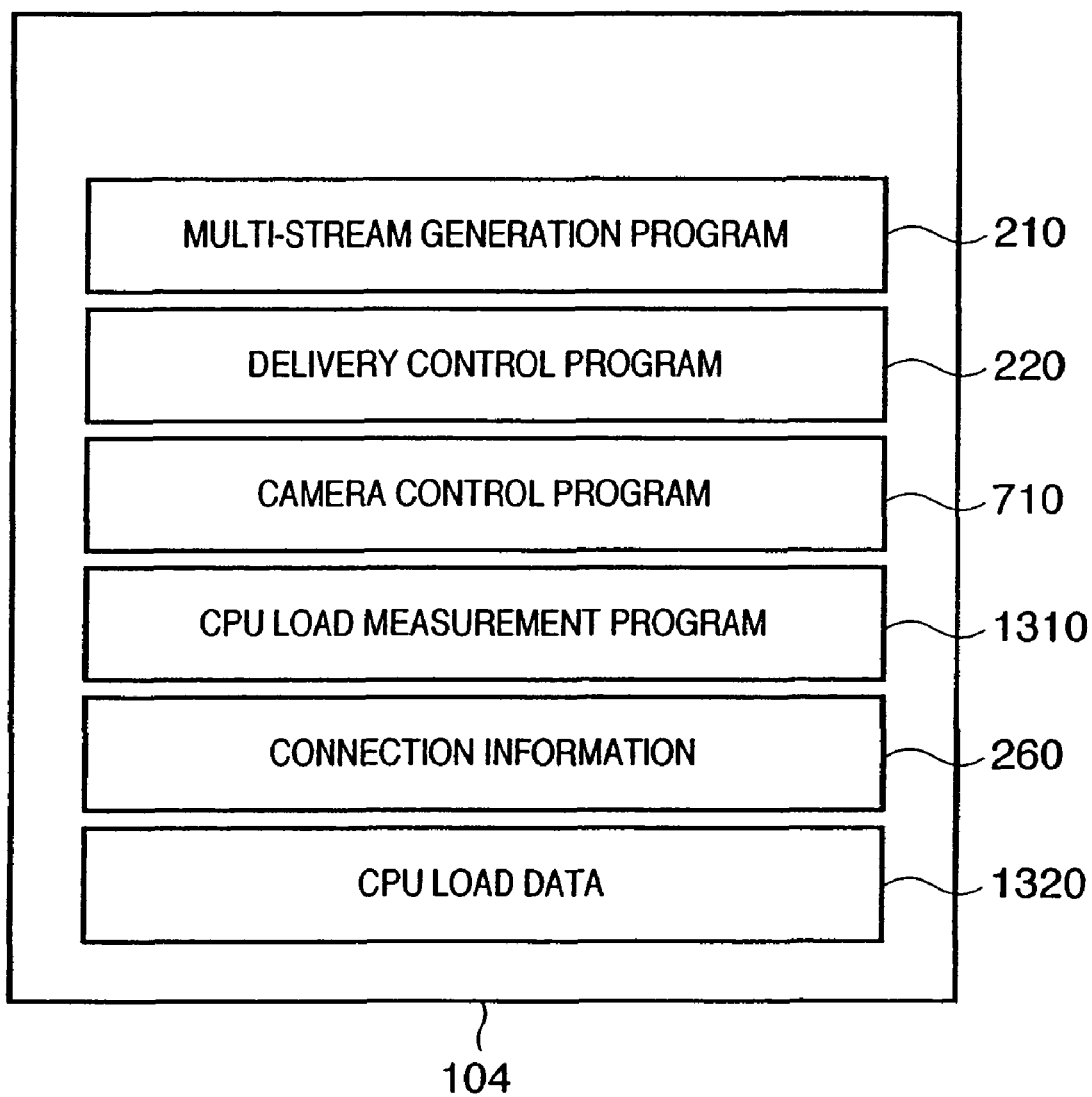
FIG. 35 shows programs and data stored in a memory of a video delivery server in the 13th embodiment.

The arrangement of the video delivery system according to this embodiment is the same as that shown in FIG. 1. However, the memory 104 stores a CPU load measurement program 1310 and CPU load data 1320 generated upon execution of the CPU load measurement program 1310, as shown in FIG. 35, in addition to the multi-stream generation program 210, delivery control program 220, camera control program 710, and connection information 260. The CPU load data 1320 indicates an index of a CPU load on data delivery per unit data transmission rate (e.g., 1 kbps).

FIG. 36 shows an example of the configuration of the CPU load data 1320. Reference numeral 3401 denotes a value (non-load data) that represents the processing performance of the CPU in a system initial state; 3405, a value indicating the required processing performance of the CPU upon compressing an image with a size of 800×600; 3402, a value indicating the required processing performance of the CPU upon compressing an image with a size of 640×480; 3403, a value indicating the required processing performance of the CPU upon compressing an image with a size of 320×240; and 3404, a value indicating the required processing performance of the CPU upon compressing an image with a size of 160×120. Reference numeral 3406 denotes a value indicating the required processing performance of the CPU upon delivery.

The connection information 260 in this embodiment has a data configuration shown in FIG. 39. The connection information 260 in this embodiment describes the currently connected clients, image sizes demanded from these clients, and video transmission rates associated with connections of these clients, as shown in FIG. 39.

Figure 37A:
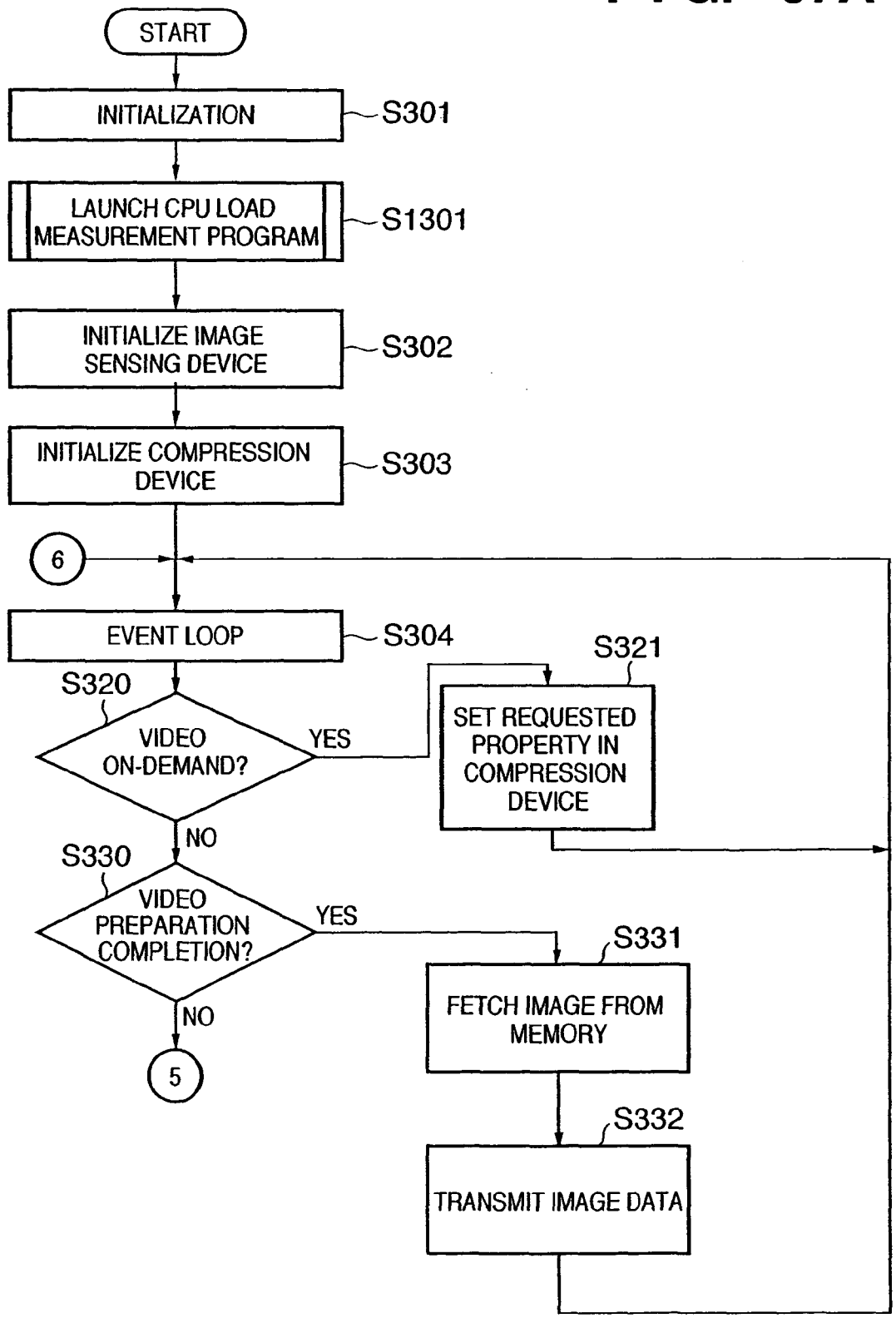
FIGS. 37A and 37B are flowcharts showing a multi-stream generation process in the 13th embodiment.
Figure 37B:
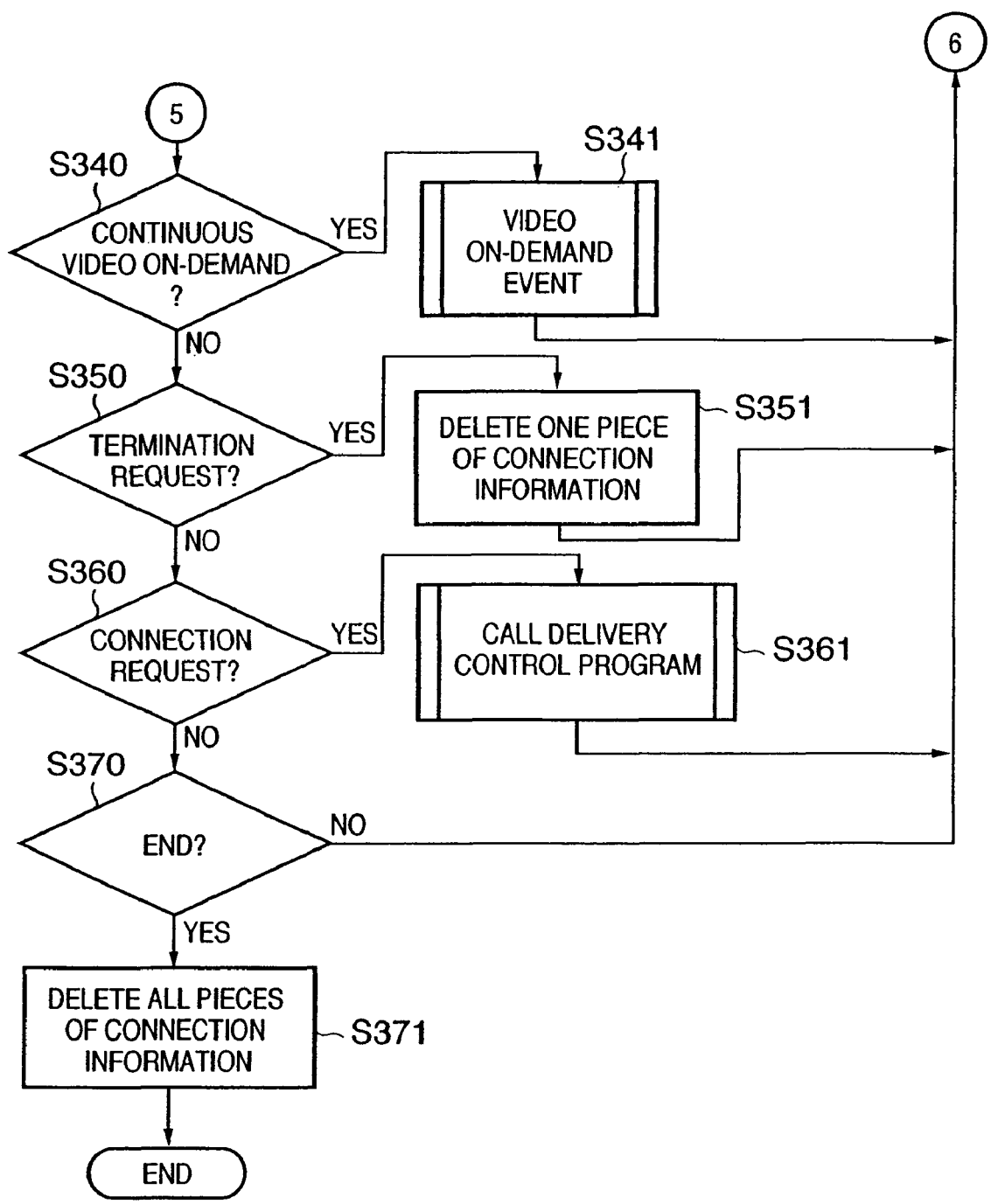

FIGS. 37A and 37B are flowcharts showing the multi-stream generation process of this embodiment. These flowcharts are substantially the same as those in FIGS. 3A and 3B, except that the CPU load measurement program 1310 is launched as step S1301 between steps S301 and S302, and the delivery control process in step S361 is executed according to the flowchart of FIG. 38 in this embodiment.

In step S1301, if the CPU load measurement program 1310 is launched, it measures a CPU load in an initial state in which no compression process runs and no clients are connected. In this case, the processing performance of the CPU is measured on the basis of the number of times of a specific process executed within a predetermined period of time, and the obtained value is saved on the memory 104 as the upper limit value data (non-load data) 3401 of the processing performance of the CPU.

The compression process starts to measure the CPU load on the compression process. In this case, the CPU loads for respective image sizes are measured by the same method as in the non-load state. Thus, the CPU loads required for the compression processes of four different sizes, i.e., 160×120, 320×240, 640×480, and 800×600, are measured, and are saved on the memory 104 as the compression load reference value data 3404, 3403, 3402, and 3405, respectively.

The delivery control process in step S361 will be explained below using the flowchart of FIG. 38.

The demanded video property included in the connection request event is loaded in step S3301, and the connection information 260 shown in FIG. 39 is loaded in step S3302.

In step S3303, load data as the products of the CPU load data 250 and the image data sizes to be transmitted for respective connections of the connection information 260, and the CPU load data associated with compression for each demanded video property are summed up to calculate the sum total as a total load F30.

For example, in case of the connection information 260 shown in FIG. 39, the clients (viewers) 109-1 and 109-2 are connected, and respectively demanded video streams having properties that include image sizes of 640×480 and 160×120, and a video transmission rate=30. If the 640×480 image data size is D3001 kbytes, the 160×120 image data size is D3003 kbytes, the delivery load data (3406) of the CPU per unit transmission rate is F3006, the load data (3402) required for 640×480 data compression is F3402, and the load data (3404) required for 160×120 data compression is F3404, the total load F30 is given by:

$$F30 = D3001 \times 8 \times F3006 \times 30 + D3003 \times 8 \times F3006 \times 30 + F3402 + F3404$$

In step S3304, a load f30 for the currently demanded property is calculated by the same method. If a video stream having a video property of 320×240 is demanded, and if the image size is D3002 bytes, and the load data (3403) associated with 320×240 data compression is F3403, the load f30 is given by:

$$f30 = D3002 \times 8 \times F3006 \times 30 + F3403$$

In step S3305, the initially measured non-load data, i.e., the upper limit value (3401) is loaded as X30. In step S3306, X30 is compared with F30+f30.

As a result, if X30>F30+f30, the upper limit of the server process is not exceeded if the currently demanded connection is permitted. In this case, the flow advances to step S3307, and the demanded connection is additionally registered in the connection information 260, which is saved in the memory 104. After that, a video on-demand event is issued in step S3308, thus ending this delivery control process.

On the other hand, if it is determined in step S3306 as a result comparison that X30≦F30+f30, the upper limit of the server processing performance is exceeded if the currently demanded connection is permitted. In this case, a reject response to the connection request is returned in step S3309, thus ending the delivery control process.

If the image size of the demanded connection is the same as that of the connection which has already undergone delivery, the CPU load required for image compression need not be further added. For example, if a video stream having an image size of 160×120 which has already been delivered is demanded, and if the image size is D3003 bytes and image transmission rate is 30, the load f30 is given by:

$$f30 = D3002 \times 8 \times F3006 \times 30$$

In case of a system having a plurality of network interfaces, for example, wired LAN connection, wireless LAN connection, and modem connection have largely different CPU load associated with data delivery. In such case, by storing delivery load information for each interface, an accurate CPU load condition can be detected.

In this embodiment, the CPU load data associated with a specific data transmission rate is handled as constant data. However, the load condition on the CPU is accurately calculated by making transmission in practice and measuring the CPU load data, thus allowing suitable multi-stream delivery.

In this way, multi-stream delivery can be made within the upper limit value of the processing performance of the video delivery system.

14th Embodiment

In the 10th to 12th embodiments, the processing parts associated with extraction of property candidates of video streams that can be provided with the reserve capacity range in the video delivery server 100, and the selection request processing parts associated with issuance of a connection request event and video on-demand event in the client 109 are configured as independent modules, and algorithms of various variations can be applied to these processing parts.

However, if the criterion upon extracting property candidates of video streams that can be provided within the range of the reserve capacity of the processing performance of the video delivery apparatus (strategy of extraction) is fixed, a change in network environment, a change in design strategy of the system administrator, and the like cannot be coped with, and the reserve capacity of the video delivery apparatus cannot be effectively distributed in some cases. Therefore, it is desired to change the criterion upon extracting candidates in correspondence with such change in situation. Also, when it is designed to preferentially process a request from a specific client or user, it is desired to change the criterion upon extracting candidates accordingly.

In the following description, the extraction criterion or extraction strategy in the extraction process of candidates of video streams, and the selection criterion or selection strategy in the selection request process will be referred to as "policy". In this embodiment, a change request of this policy (policy change request) is received, and the currently used evaluating function is switched to an evaluating function according to the requested policy.

FIG. 40 is a schematic diagram showing the arrangement of the video delivery system according to this embodiment. As in each of the above embodiments, the video delivery server 100 is connected to the client (viewer) 109 via the network 108. A plurality of viewers 109 are basically connected, and receive and display data delivered from the video delivery server 100 via the network 108. More specifically, the arrangement of the video delivery system according to this embodiment is the same as that shown in FIG. 1. Also, the arrangement of the client 109 is the same as that in FIG. 14 described in the sixth embodiment.

Figure 41:
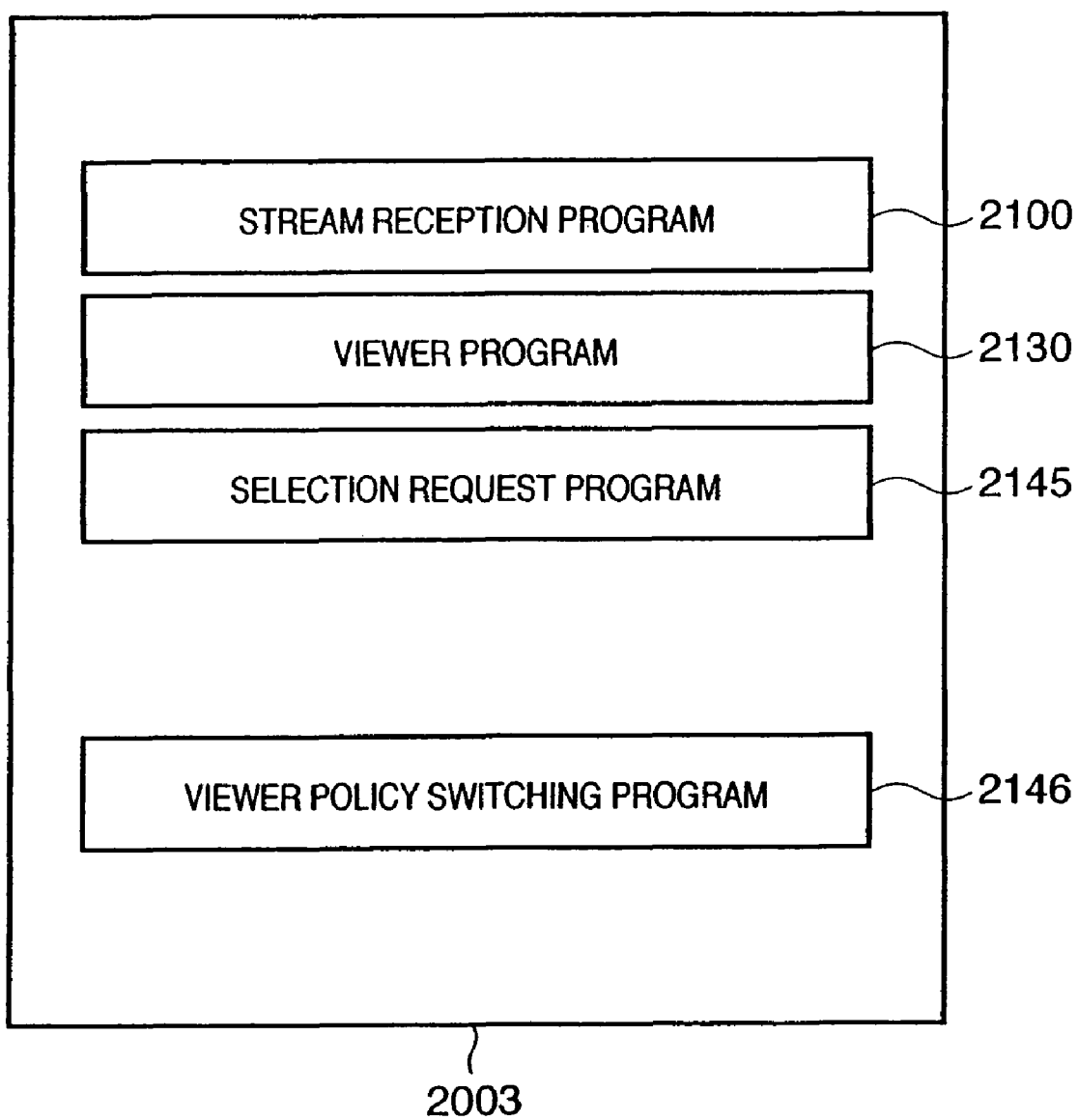
FIG. 41 shows programs and data stored in a memory of a client in the 14th embodiment.

However, the memory 2003 of the client 109 stores contents shown in FIG. 41. That is, the memory 2003 includes the stream reception program 2100, the viewer program 2130, the selection request program 2145 (including the option set limitation program 2120 and the like), and a viewer policy switching program 2146.

Unlike in the 10th embodiment, the evaluating function G of the selection request program 2145 of this embodiment is switched by the viewer policy switching program 2146.

Figure 42:
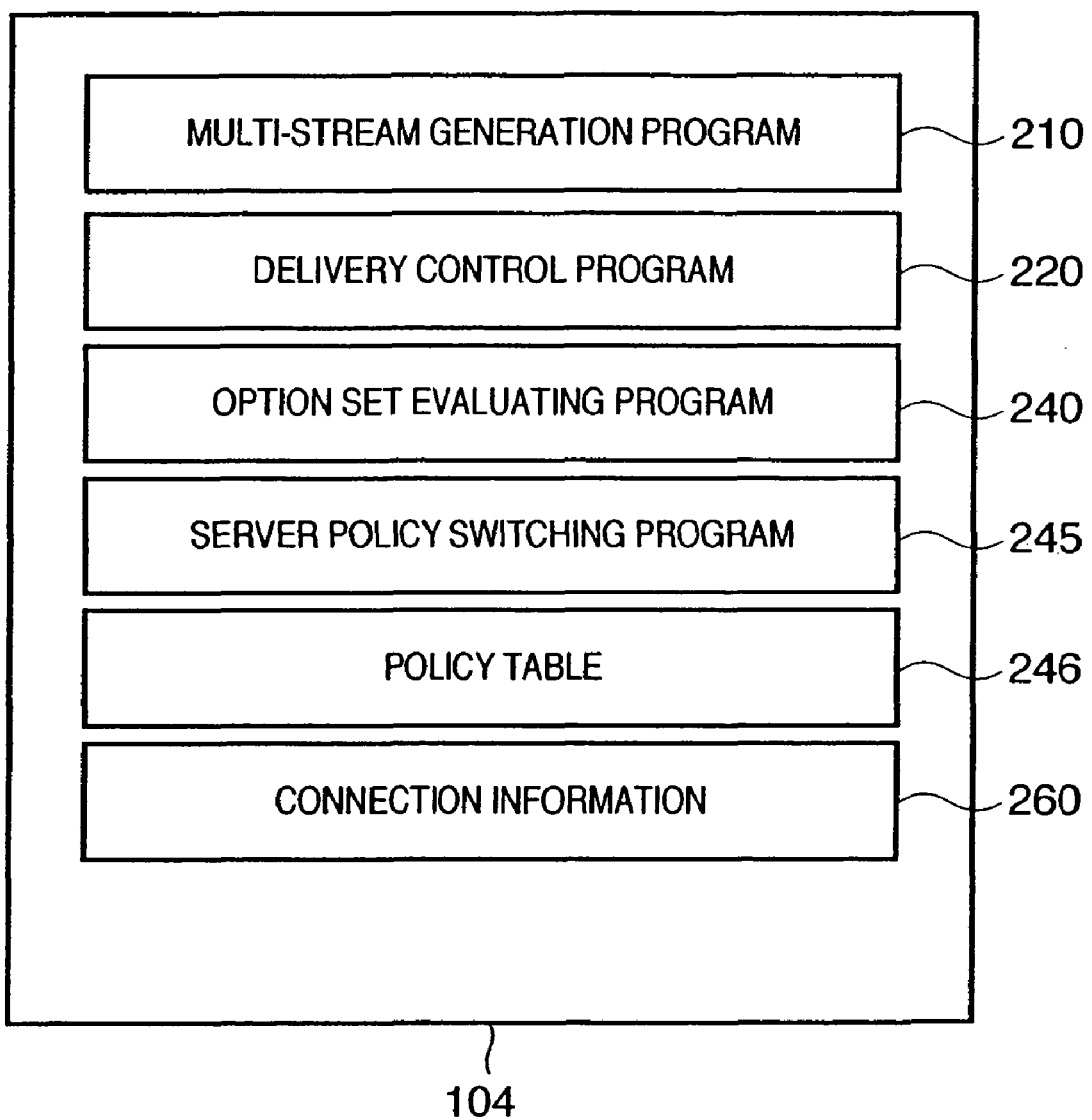
FIG. 42 shows programs and data stored in a memory of a video delivery server in the 14th embodiment.

On the other hand, the memory 104 of the video delivery server 100 has storage contents shown in FIG. 42. That is, the memory 104 stores the multi-stream generation program 210, the delivery control program 220, the option set evaluating program 240 (including the priority-dependent option set generation program 230 and the like), a server policy switching program 245, a policy table 246, the connection information 260, and the like.

Unlike in the 10th embodiment, the evaluating function S of the option set evaluating program 240 is switched by the server policy switching program 245.

Figure 43:
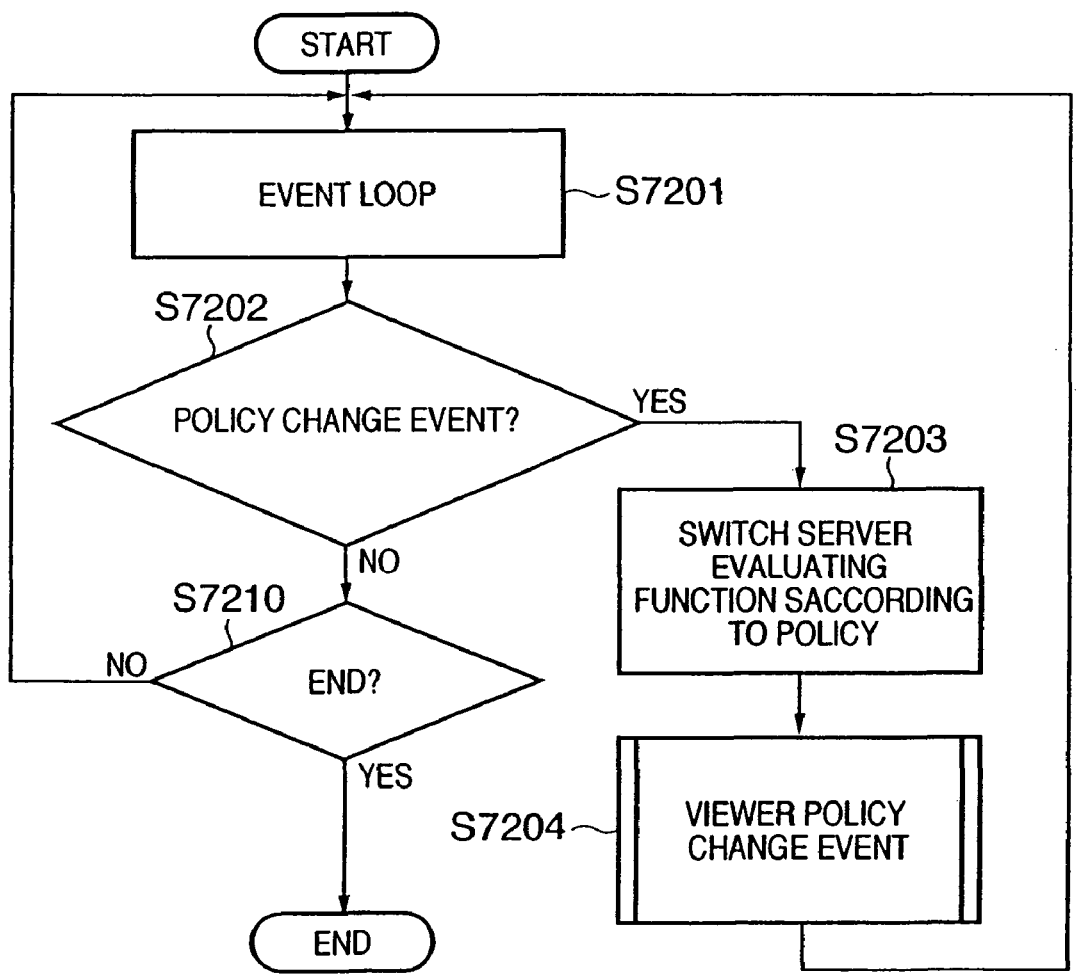
FIG. 43 is a flowchart showing the operation of the video delivery server based on a viewer policy switching program in the 14th embodiment.

FIG. 43 shows the operation of the video delivery server 100 by the server policy switching program 245.

In step S7201, the control waits for an event. It is checked in step S7202 if the detected event is a policy change event. The policy change event includes information of the type of policy to be changed. If the detected event is the policy change event, the server evaluating function S is substituted in accordance with the information of the type of policy included in that policy change event in step S7203. Note that this policy change event is implemented by, e.g., a Web page for server management, menu selection generated by a setting tool, and the like. The policy change event may be received from a remote place via the network by HTTP or RPC connection. In step S7204, a viewer policy change event is issued to clients (viewers) as the connection destinations on the basis of the same information as the connection information 260 (FIG. 39) of the 13th embodiment, and the flow then returns to the event loop in step S7201.

In response to an end event in step S7210, this server policy switching program 245 ends.

Figure 44:
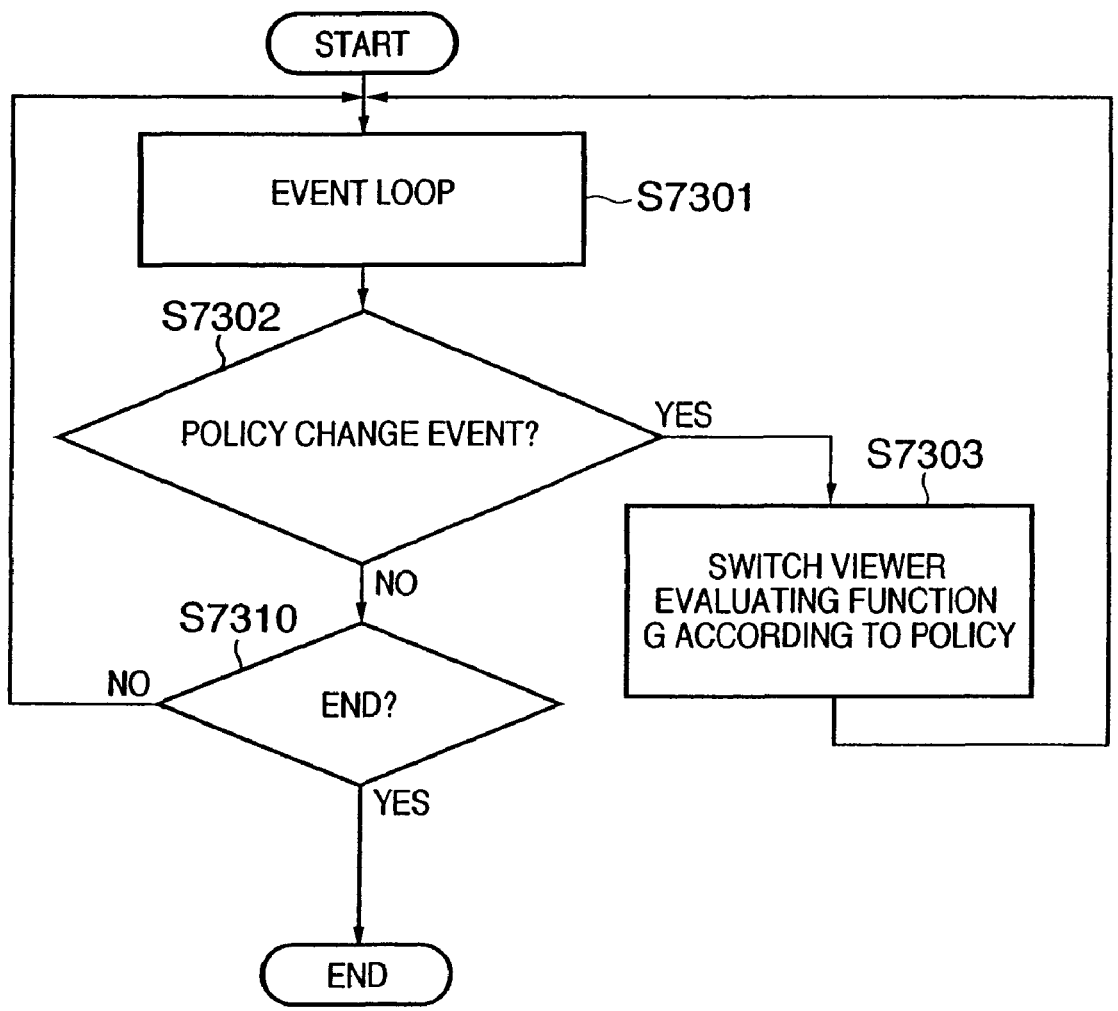
FIG. 44 is a flowchart showing the operation of the client based on the viewer policy switching program in the 14th embodiment.

FIG. 44 shows the operation of the client 109 by the viewer policy switching program 2145.

In step S7301, the control waits for an event. If a policy change event is detected in step S7302, the viewer evaluating function G is substituted in accordance with information of the type of policy included in that event in step S7303, and the flow then returns to the event loop in step S7301. The policy change event may be received from a remote place via the network by HTTP or RPC connection. In response to an end event in step S7310, this viewer policy switching program 2145 ends.

The evaluating functions to be substituted in steps S7203 and S7303 are implemented using the policy table shown in FIG. 45. For example, a "resolution priority" policy may use an evaluating function S1 when the priority value of "800×600" is 0, that of "640×480" is 10, that of "320×240" is 20, that of "160×120" is 40, and the priority value when camera control=ON is +5 in the priority values in the priority table of the server shown in FIG. 24.

Also, a "frame-rate priority" policy may use an evaluating function S2 when streams with lighter loads are preferentially connected, i.e., the priority value of "800×600" is 30, that of "640×480" is 20, that of "320×240" is 10, that of "160×120" is 0, and the priority value when camera control=ON is +5.

A "server-optimum" policy may use an evaluating function S3 which presents options optimal to the server, which do not exceed the upper limit of the server load even when substitute streams are used.

A "client-optimum" policy may use an evaluating function S4 which inhibits use of substitute streams, and maximally complies with client requests.

The same applies to the evaluating function G on the viewer side.

In this way, the delivery policy upon making selective multi-stream delivery can be freely changed.

In this case, it is indispensable to recognize the actual load on the video delivery server 100 or client 109, to recognize the loads of streams, and to build a stream substitution rule or the like into the evaluating function, and correspondence between the policies in the policy table and the evaluating functions implements them.

15th Embodiment

In the 14th embodiment, predetermined policies are switched. However, in this embodiment, a variety of environments can be flexibly coped with by substituting delivery policies using a policy server.

Figure 46:
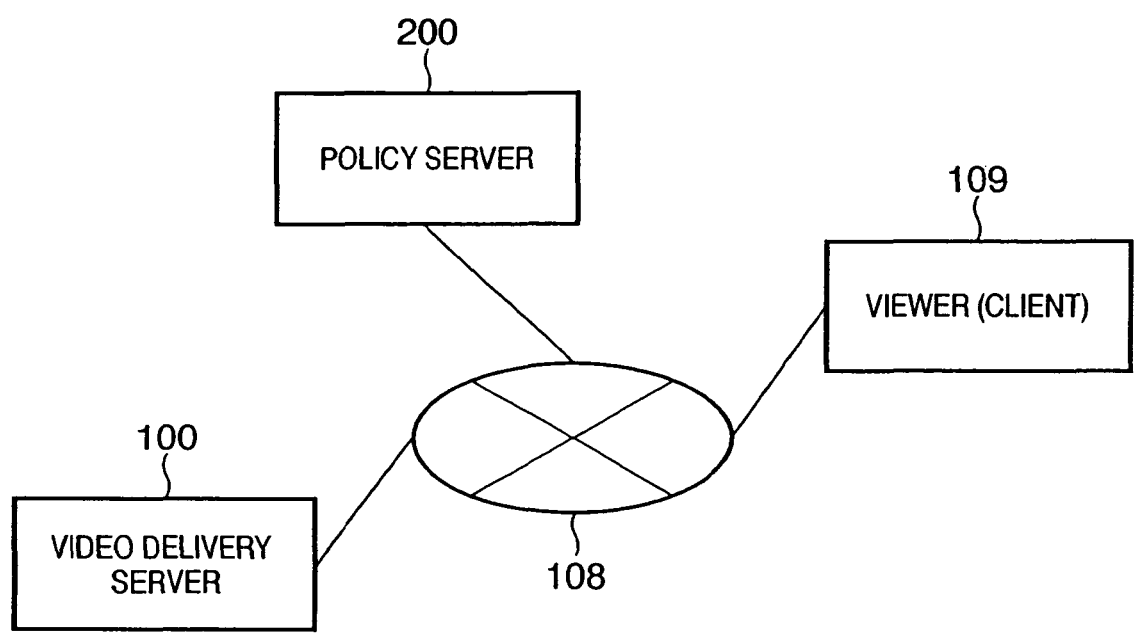
FIG. 46 is a schematic diagram showing the arrangement of a video delivery system according to the 15th Embodiment.

FIG. 46 is a schematic diagram showing the arrangement of the video delivery system according to this embodiment. As in 14th embodiment, the video delivery server 100 is connected to the client (viewer) 109 via the network 108. In this embodiment, a policy server 200 is also connected to the network 108. The memory contents in the video delivery server 100 and client 109 are the same as those in the 14th embodiment. The policy server 200 can be implemented by a general computer as in the video delivery server 100, and a description of its arrangement will be omitted. A memory of the policy server 200 stores a policy change program.

The operation of the video delivery server 100 by the server policy switching program 245 of this embodiment is the same as that shown in the flowchart of FIG. 43 as in the 14th embodiment. However, in step S7202 a policy change event is sent from the policy server 200, as will be described later. Also, the operation of the client 109 by the viewer policy switching program 245 of this embodiment is the same as that shown in the flowchart of FIG. 44 as in the 14th embodiment. However, in step S7302 a policy change event is sent from the policy server 200.

The evaluating functions S and G may be written in, e.g., a script language or the like. More specifically, when the script is sent from the policy server 200 via the network 108, it is received to substitute the evaluating function. Of course, the evaluating function may have an object format such as a binary program or the like.

Figure 47:
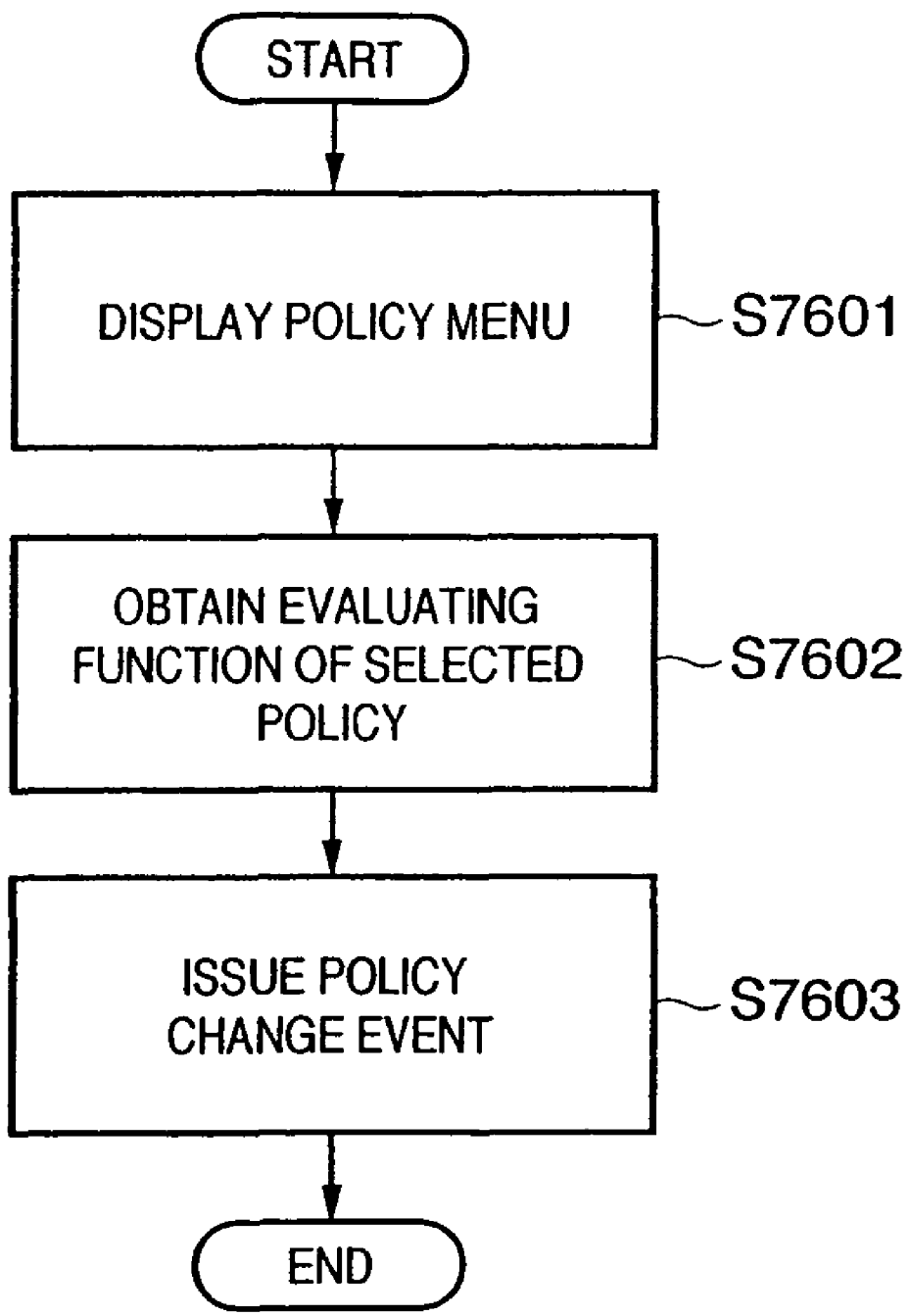
FIG. 47 is a flowchart showing a policy change process by a policy server in the 15th embodiment.

The policy change process by the policy server 200 will be described below. FIG. 47 is a flowchart showing the policy change process by the policy server 200 of this embodiment. A program corresponding to this flowchart is included in the aforementioned policy change program.

Figure 48:
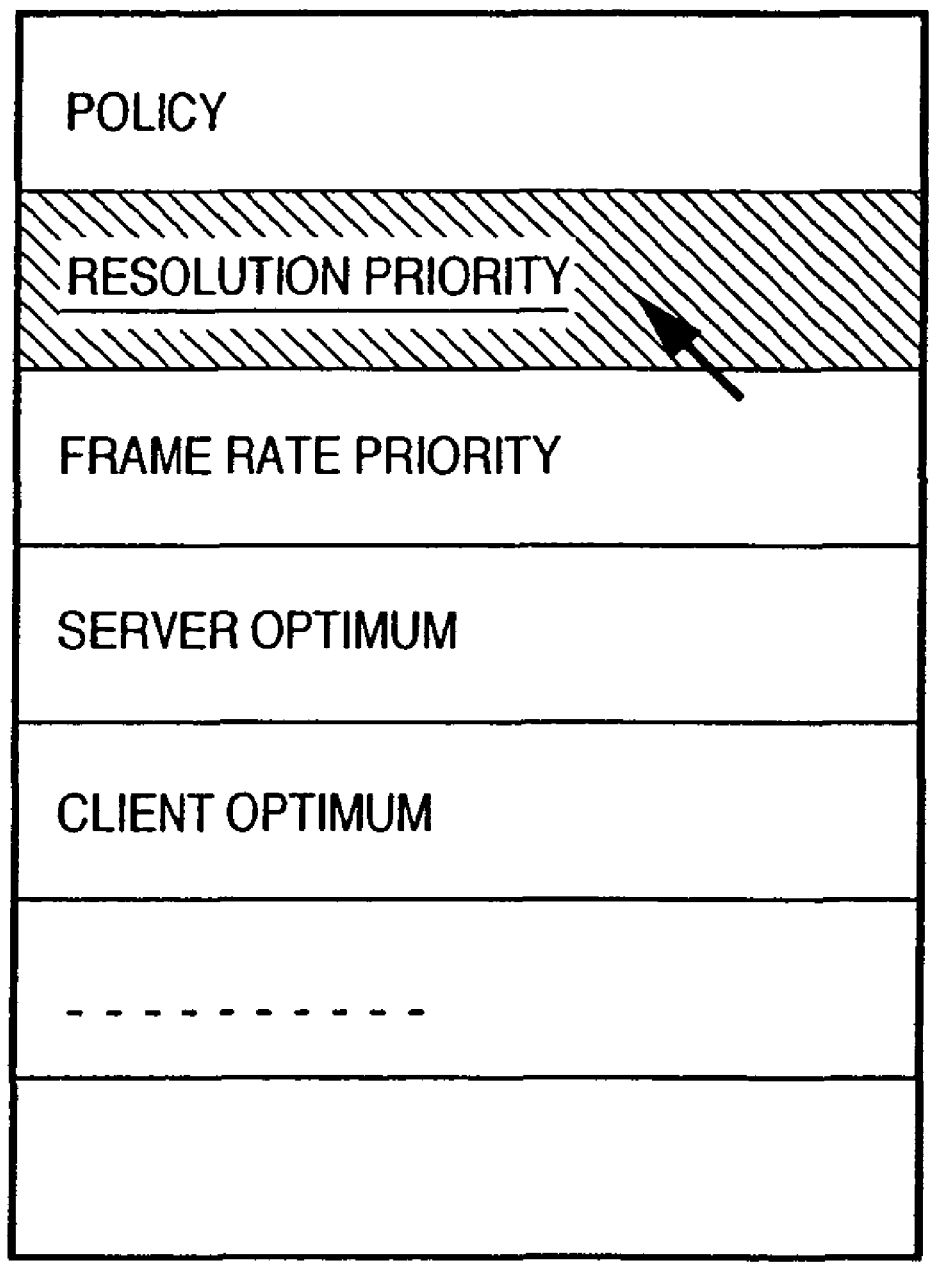
FIG. 48 shows an example of a policy menu to be displayed by the policy change process by the policy server in the 15th embodiment.

In step S7601, a policy menu shown in FIG. 48 is displayed. Such menu is implemented as a graphical user interface (GUI).

If a policy is selected from the policy menu in step S7602, an evaluating function corresponding to the selected policy is read out from the policy table shown in FIG. 45 of the 14th embodiment, and a policy change event and information of the corresponding evaluating function are sent to the video delivery server 100 and viewer 109 in step S7603.

Furthermore, the properties of the evaluating function to be sent may be changed depending on a system property such as a network bandwidth or the like.

More specifically, when the network bandwidth is narrow, an evaluating function in which loads such as 0 for 1000 MHz (network bandwidth), 1 for 100 MHz, 5 for 10 MHz, and so forth are added using the same load table as the stream load data 250 shown in, e.g., FIG. 34, are sent.

In this way, an evaluating function that can evaluate the whole system in place of load evaluation of the multi-stream video delivery system or viewer alone can be implemented.

As described above, when the policy server 200 issues a policy change event to the video delivery server 100 and viewer 109 to replace the evaluating function, diversity and convenience of multi-stream delivery of the whole system can be realized.

Since the evaluating function is not built in the video delivery server 100 and viewer 109, it can be easily generally upgraded. In addition, when the loads of the whole system have been changed, the evaluating function can be normally corrected as needed.

16th Embodiment

Along with the popularization of the Internet in recent years, information transmission is generally done by WWW (World Wide Web) servers and the like. Under such circumstances, a system having a function of sensing a video picture and transmitting the video picture onto the network in real time appears.

Upon delivering images using the network, various compression methods are used. For example, JPEG (Joint Photograph coding Experts Group) is known as a popularly used still picture compression method. Also, M-JPEG (Motion-JPEG) that applies JPEG to moving picture delivery, and MPEG2 and MPEG4 (Moving Picture Experts Group phase 2/4), and the like are available as moving picture compression methods. Which of these methods is to be used to deliver images varies depending on the system arrangements on the video delivery side, user's choices, and the like.

Furthermore, recently, a plurality of different communication lines having various data transfer rates are provided. Also, various terminals used to browse delivered images are available: a terminal having a relatively small screen such as a portable phone, a terminal which uses a PC (Personal Computer) and partially utilizes its display screen, a dedicated terminal, and so forth. The side that builds a system for delivering image data is required to provide services in accordance with various requests from these users. In addition, a network camera server that implements remote control of a camera is required to have real-time and short-delay features.

Figure 65:
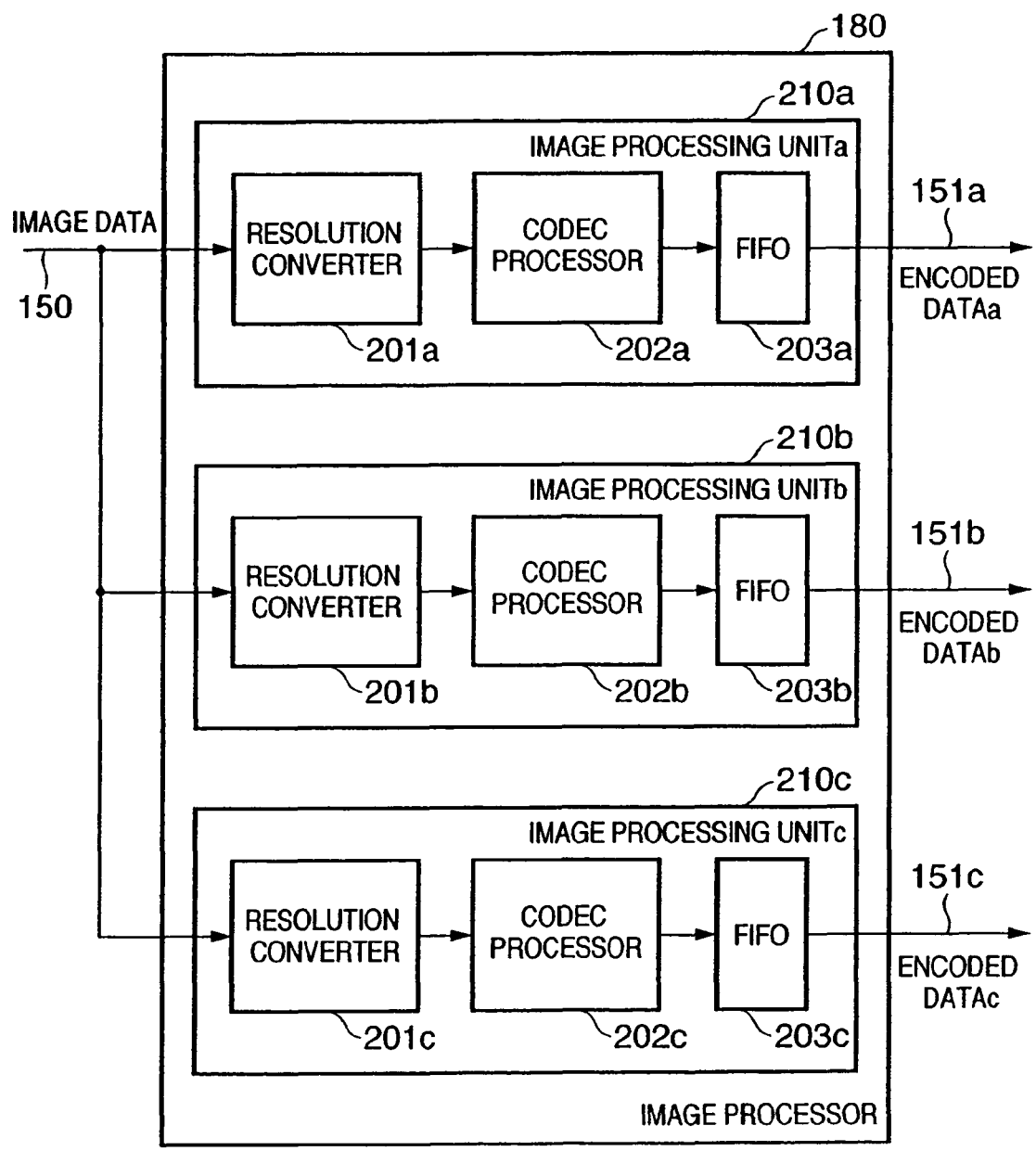
FIG. 65 is a block diagram showing the arrangement of an image processing apparatus in a conventional video delivery system.

As the first example of a conventional video delivery system having a mechanism for providing services in accordance with various requests from these users, a system configured to have an image processing apparatus 180 shown in FIG. 65 is available.

In the image processing apparatus 180 shown in FIG. 65, image data supplied from a video camera or the like is supplied to image processing units 210a, 210b, and 210c for respective frames. The image processing units 210a, 210b, and 210c respectively include resolution converters 201a, 201b, and 201c, codec processors 202a, 202b, and 202c, and FIFOs 203a, 203b, and 203c. The image processing units 210a, 210b, and 210c receive different processing parameters for respective units according to user requests, and independently execute processes according to these parameters. However, each individual codec supports only a specific encoding method.

In the first example of the conventional video delivery system, the number of image processing units included in the image processing apparatus 180 is 3, and when the number of types of image processes required by the users exceeds 3, such requests cannot be met. In general, when requests of a plurality of image processes are complied with by providing a plurality of image processing units like in the conventional video delivery system, the service contents are limited by the number of processing units. The limitations can be relaxed by increasing the number of processing units. However, the network camera server having the image sensing function of the video delivery system is required to be compact, and the number of processing units that can be mounted in such server is limited by the board area, amount of heat generation, and the like. Hence, the number of processing units is limited in practice.

In order to remove the limitations on the number of processing units, a system having image processing units whose image processes can be programmably changed is required.

As such conventional video delivery system, the following system is available. That is, an image processing apparatus reads out various conversion algorithms stored in advance in a ROM and makes a DSP execute processes of these algorithms to meet various user requirements (for example, see Japanese Patent Laid-Open No. 6-125411 (p. 8, FIGS. 1, 10, and 4)).

On the other hand, when a video picture is sensed in real time and is stored and delivered for the purpose of monitoring or the like, no video capture failure from an image sensing device is allowed. For example, when a video input is captured from an NTSC compatible video camera input that senses 30 frames per sec of a video picture, a time allowed to process one frame is as short as 1/30 sec in principle, and the system is required to meet various user requirements mentioned above within that time.

Especially, the network camera server which can remotely control a video capturing unit is required to have real-time and short-delay features.

However, in the technique described in Japanese Patent Laid-Open No. 6-125411, a plurality of image processes are time-divisionally and parallelly processed according to the algorithms plainly, and it is not guaranteed to complete processes in real time. For example, when a plurality of processes are simultaneously done, a variation of the processing time required for the process of each image processing unit upon variation of an input image signal or the like cannot be detected, and it is not guaranteed to implement a service while maintaining realtimeness. When new service requests are generated by the users, it cannot be determined in terms of guarantee of realtimeness if all requests are to be complied with.

Various embodiments to be described hereinafter are achieved to solve at least the aforementioned problems. The present invention has as its object to provide a video delivery service while maintaining realtimeness.

Figure 49:
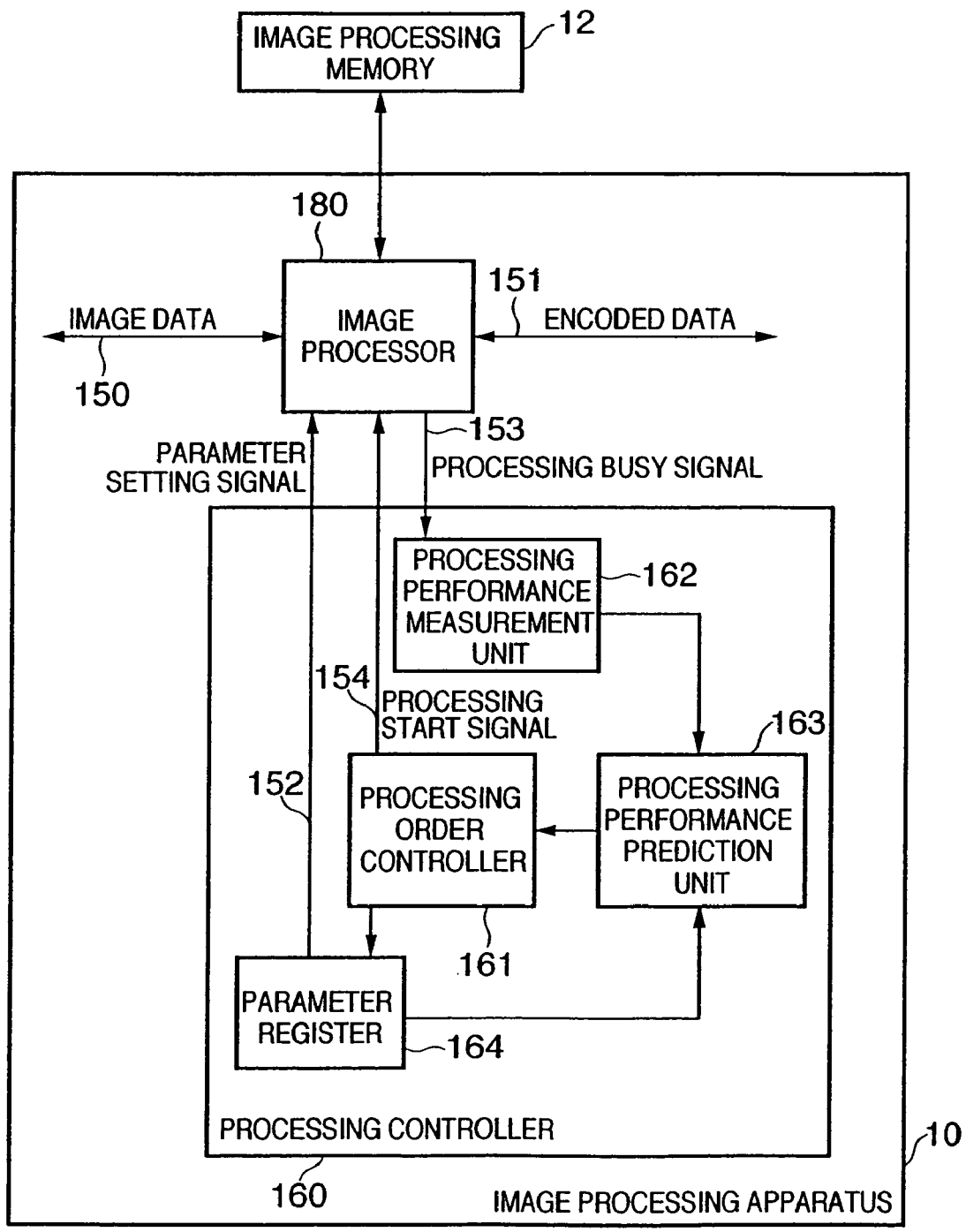
FIG. 49 is a block diagram showing the arrangement of an image processing apparatus according to the 16th embodiment of the present invention.

FIG. 49 is a block diagram showing an image processing apparatus according to this embodiment. In FIG. 49, an image processing apparatus 10 roughly includes two major building components, i.e., a processing controller 160 and image processor 180.

A processing order controller 161 supplies, to the image processor 180, parameter values saved in a parameter register 164 in the processing controller 160 as a parameter setting signal 152. The processing order controller 161 then supplies a processing start signal 154 to the image processor 180. If the instructed process is an image compression process, the image processor 180 processes input image data 150 on the basis of the set parameter values, and outputs encoded data 151. On the other hand, if the instructed process is an image expansion process, the image processor 180 expands input encoded data 151 on the basis of the set parameters, and outputs the expanded data as image data 150. During execution of these processes, the image processor 180 asserts a processing busy signal 153. A processing performance measuring unit 162 measures the asserted time of the processing busy signal 153.

The processing performance measuring unit 162 provides its measurement result to a processing performance prediction unit 163. The processing performance prediction unit 163 predicts a processing time of each subsequent image process required to be processed on the basis of the parameters upon executing that process, and the processing performance measurement result, and provides the prediction result to the processing order controller 161. Upon reception of the prediction result, the processing order controller 161 determines the next process to be executed on the basis of the priority order of required processes and the processing performance of the image processor 180 required for that process, and instructs the image processor 180 of the next process.

Figure 50:
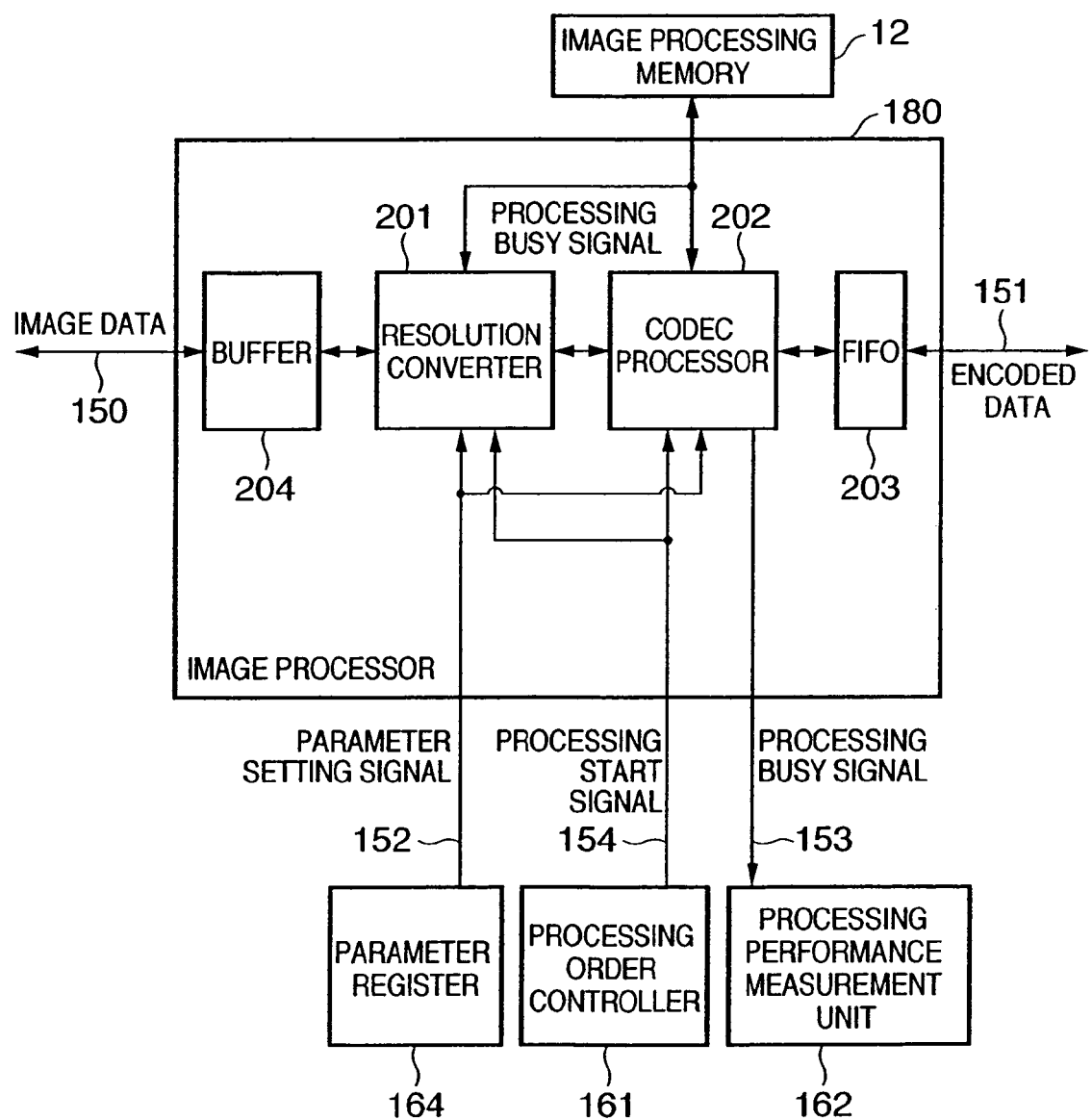
FIG. 50 is a block diagram showing the detailed arrangement of an image processor in the image processing apparatus according to the 16th embodiment of the present invention.

FIG. 50 shows the detailed arrangement of the image processor 180.

Referring to FIG. 50, the image processor 180 has a resolution converter 201, codec processor 202, FIFO 203, and buffer 204. Input image data 150 is temporarily stored in the buffer 204 for, e.g., respective frames. Units after the resolution converter 201 handle an image process based on input parameters as one video input data unit (e.g., one frame unit). When the instructed process is an image compression process, the resolution converter 201 reads out input image data 150 from the buffer 204, and executes a resolution conversion process as needed on the basis of the parameter setting signal 152 supplied from the parameter register 164. Input of the image data 150 to this buffer 204 is dominated by the input rate outside the image processor 180, while the bit width and transfer rate in transfer of image data from the buffer to the resolution converter 201 and subsequent units can be larger than the input rate of the image data 150. Hence, the image processor 180 can execute a plurality of image compression processes based on different parameters using an identical frame image of input data by fully utilizing the processing performance of the resolution converter 201, codec processor 202, and FIFO 203 within a time required to input one frame of the image data 150.

The resolution converter 201 passes the resolution-converted data to the codec processor 202 in a unit according to the encoding format designated by the parameter. The codec processor 202 compresses the input data using an image processing memory 12 as needed, and outputs generated compressed data to the FIFO 203. The FIFO 203 outputs the compressed data as encoded data 151 outside the image processor 180 in response to a given event (e.g., storage of compressed data of a given size or more).

Note that the resolution-converted image data is sent to the codec processor 202 and is also temporarily stored in the image processing memory 12. This is to prepare for a request for the same resolution conversion process for identical input image data in subsequent processes. If the same resolution conversion process as that previously executed is requested in the subsequent process, the resolution converter 201 reads out the result of the previously executed resolution conversion process from the image processing memory 12, and supplies it to the codec processor 202.

On the other hand, if the instructed process is an image expansion process, the data flow direction is reversed. The input encoded data 151 is stored in the FIFO 203. The codec processor 202 determines the encoding format of the input encoded data on the basis of the parameter setting signal 152 supplied from the parameter register 164, and executes an expansion process by sequentially reading out that data from the FIFO 203. The expanded image data is converted into a resolution required for display by the resolution converter 201 as needed, and is stored in the buffer 204. Image data 150 stored in the buffer 204 is output outside the image processor 180 as an image of a data rate suited to output an image.

In the above description, the buffer 204 is present inside the image processor. However, the same memory as the image processing memory 12 can be used in some cases. Although not shown, in this case, the input image data 150 is temporarily stored in the image processing memory 12 directly without the intervention of the resolution converter 201, and the resolution converter 201 processes the stored data while reading it out from the image processing memory 12.

Note that the codec processor 202 of the image processor 180 asserts the processing busy signal 153 during an execution period of the compression or expansion process.

Figure 51:
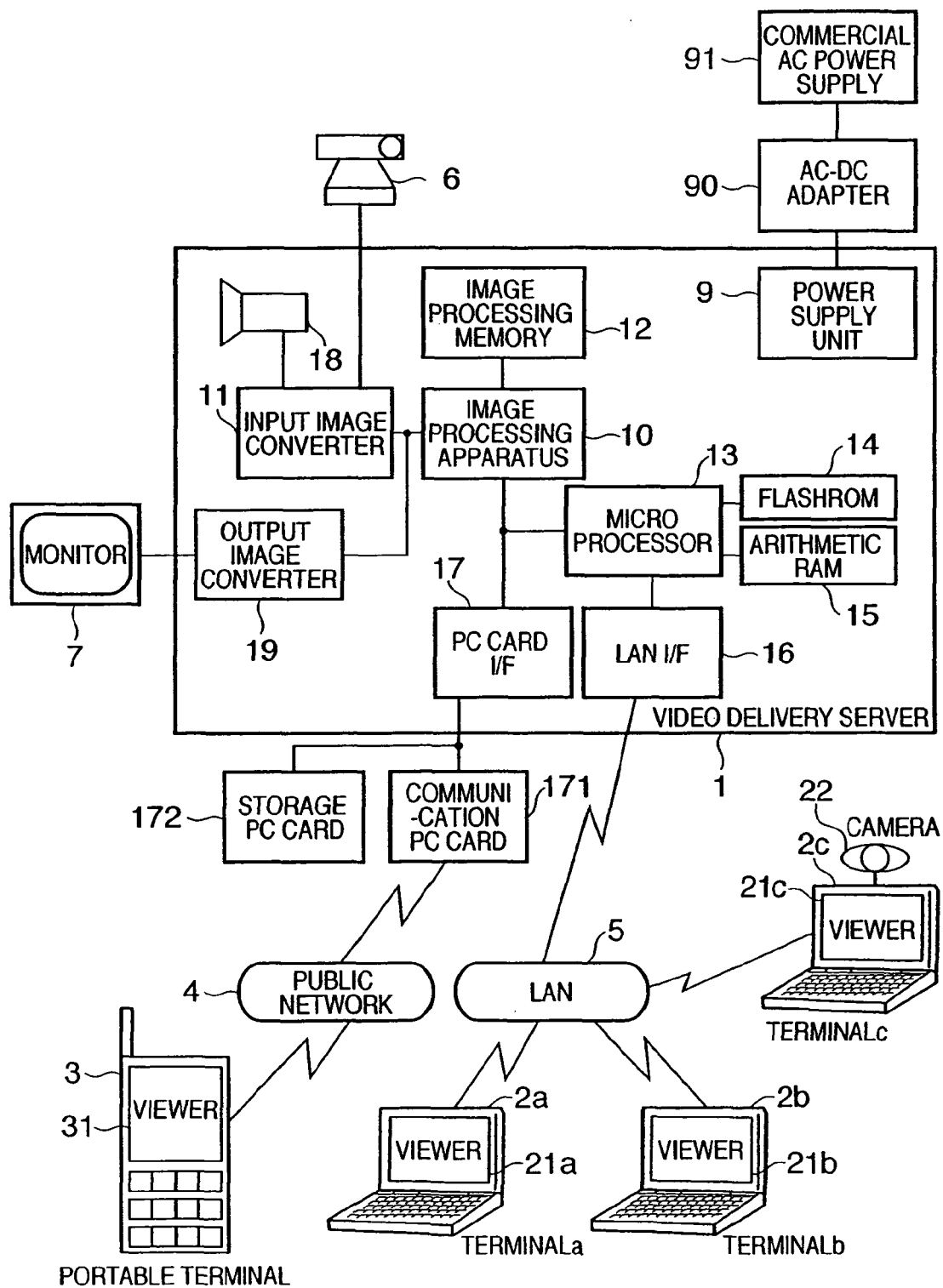
FIG. 51 is a block diagram showing a monitoring system using a video delivery system in the 16th embodiment of the present invention.

FIG. 51 is a block diagram showing an example of the arrangement of a video delivery server incorporating the image processing apparatus 10 shown in FIG. 49, and a monitoring system formed using that video delivery server.

Reference numeral 1 denotes a video delivery server which captures and compresses a video signal input from a camera 6 or a camera 18 which is attached to the video delivery server 1 and comprises a lens, CCD, and the like, and outputs the compressed video signal onto a network such as a public network 4, LAN 5, or the like. The output video data is received by a client such as a portable terminal 3 connected to the public network 4, a terminal 2 (e.g., 2a to 2c) connected to the LAN 5, or the like, and is displayed by a viewer 31 or 21. In some cases, the video delivery server 1 receives and expands video data transmitted from a partner terminal, and displays it on a monitor 7 connected to the server.

The internal arrangement and its basic operation of the video delivery server 1 will be described in detail below.

An input image converter 11 captures a video signal input from the camera 6 or the camera 18 which is attached to the video delivery server 1 and comprises a lens, CCD, and the like. At this time, assume that data supplied from the camera 6 is an analog video signal based on a method such as NTSC/PAL/SECAM or the like. Such analog video signal is A/D-converted by the input image converter 11, and is then converted into a digital data format (e.g., Y:U:V=4:2:2) suitable for an input of the image processing apparatus 10. On the other hand, video data output from the camera (video input unit) 18 already has a digital format. However, since an output signal line of video data from the camera 18 complies with an LVDS (Low Voltage Differential Signaling) format, the video data from the camera 18 is temporarily received by the input image converter 11, and is converted into a parallel data format which can be easily processed by the image processing apparatus 10. Then, the video data is input as image data 150 to the image processing apparatus 10.

Upon acquiring the image data 150, the image processing apparatus 10 temporarily holds the image data in the buffer 204, and compresses that image data by a method designated by the user. For example, the image processing apparatus 10 applies compression based on, e.g., M-JPEG or MPEG4. The compressed encoded data 151 is stored in an arithmetic RAM 15 connected to a microprocessor 13 via the microprocessor 13.

When the encoded data is transferred to the arithmetic RAM 15, the microprocessor 13 reads out the encoded data from the arithmetic RAM 15 and executes a process for segmenting the encoded data into an appropriate size, appending a header, and so forth in accordance with a program stored in a Flash ROM 14, so as to deliver it onto the network. The microprocessor 13 then transmits the encoded data to the portable terminal on the public network 4 via a communication PC card 171 (a modem card, ISDN card, or the like) inserted into a PC card I/F 17, or to other terminals or the like on the LAN 5 via a LAN interface 16.

The microprocessor 13 cannot only deliver encoded data but also store it. For example, when a storage PC card 172 (a hard disk card, Flash ROM card, or the like) is inserted into the PC card slot (I/F) 17, video data can be recorded on that storage PC card 172. As a storage destination, the Flash ROM 14 or the arithmetic RAM 15 as a nonvolatile storage can be selected.

Note that the video delivery server 1 acquires electric power, which is supplied from a commercial AC power supply 91 and is converted into a direct current by an AC-DC adapter 90, by a power supply unit 9, converts that electric power into a voltage and stability suited to operate ICs and the like inside the apparatus by the power supply unit 9, and then supplies the electric power to the entire system.

The operation executed when the video delivery server 1 delivers video data to a plurality of users while predicting the performance of the image processing apparatus 10 will be described below using FIGS. 52 to 54 with reference to FIGS. 49 to 51.

FIG. 52 shows an example of a parameter list of the currently requested processes of the video delivery server 1. As shown in FIG. 52, the parameter list describes parameters associated with a process number, priority, process type, encoding method, resolution, quality 1 and quality 2, and connection count. Note that higher priority is set with decreasing value indicating priority. The contents of the parameter list are included as codes in the parameter register 164. In this embodiment, assume that six processes with process numbers 0 to 5 are requested, and the process numbers match priority values, as shown in the parameter list of FIG. 52.

FIG. 52 includes a process of priority 0 (process number 0). This process is handled as a reference process, and this image process is executed prior to all other processes irrespective of the presence/absence of processing requests from the users. The processing volume of the image processor required to execute this reference process is measured, and execution of subsequent processes 1 to 5 is examined so as to allow processes in real time.

Figure 53:
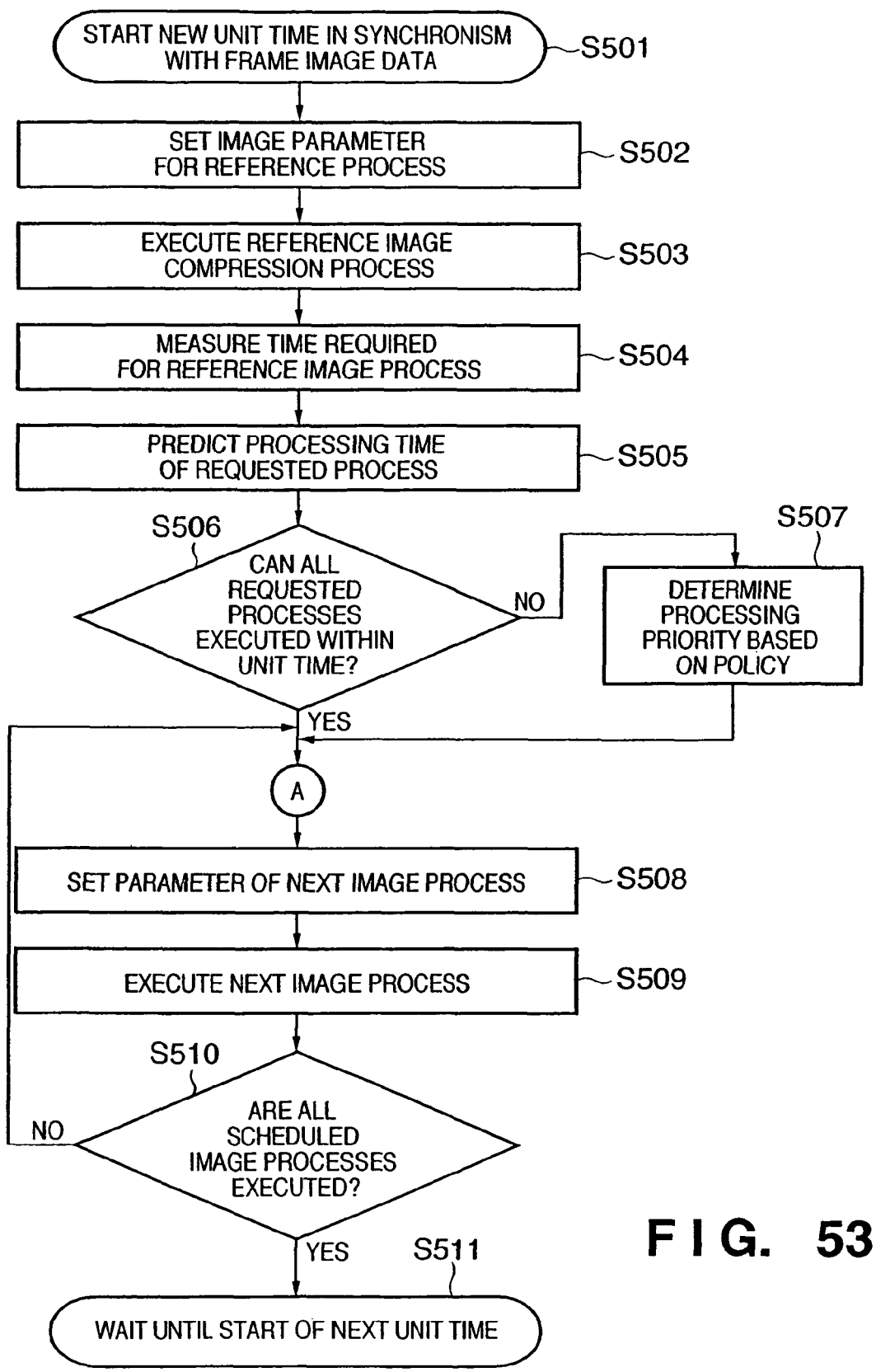
FIG. 53 is a flowchart showing the process in the image processing apparatus in the 16th embodiment of the present invention.

FIG. 53 is a flowchart showing the process in the image processing apparatus 10.

The video delivery server 1 continuously receives image data from the camera 18 for respective frames. The frame update interval is 1/30 sec, and the resolution of an input image is SVGA (800×600). Image data for respective frames are input from the input image converter 11 to the image processing apparatus 10. When frame image data for one frame is stored in the buffer 204, a new unit time starts in synchronism with that timing (step S501).

In this embodiment, process 0 of priority 0 is present, as described above. Since it is determined that this process is executed prior to all other image processes, parameter information associated with process 0 such as [compression by Motion-JPEG, resolution=320×240, quality Q=50] is supplied from the parameter register 164 to the resolution converter 201 and codec processor 202 as the parameter setting signal 152 (step S502).

Upon reception of a processing start instruction by a processing start signal 154, the resolution converter 201 applies a resolution conversion process from 800×600 to 320×240 to image data stored in the buffer 204, and the resolution-converted image data to the codec processor 202. In this case, since the Motion-JPEG process is to be done, the image data is sequentially input to the codec processor 202 for respective 8×8 bit blocks. When the codec processor 202 receives the block data from the resolution converter 201 and starts their processes, it asserts the processing busy signal 153. Then, the codec processor 202 executes Motion-JPEG encoding using the input quality parameter Q=50, and inputs the processed encoded data to the FIFO 203. The encoded data input to the FIFO 203 is transferred to the arithmetic RAM 15 (step S503).

Upon completion of the process of image data corresponding to the entire 320×240 window scheduled in process 0, the processing busy signal 153 is negated. In response to this, the processing performance measuring unit 162 measures the asserted time of the processing busy signal 153, and calculates a time required for the image process of the process number 0 (step S504).

Assume that the time required for the image process of the process number 0 is t0. Upon reception of this measurement result, the processing performance prediction unit 163 reads out the contents of processes 1 to 5 requested as subsequent processes from the parameter register 164, and predicts the processing times required for them (step S505).

For example, assume that the encoding process of the reference process as priority 0 is compression by Motion-JPEG. Let R0 be the resolution of that process, and t0 be the time required for the process. Then, a processing time tn of a process n with a resolution Rn can be calculated by:

$$tn=(Rn/R0) \times t0 \times M \times Q \qquad (1\text{-}1)$$

where M: an empirically obtained contributing factor in the encoding method

M=1 (when the encoding method is Motion-JPEG

M=1.05 (when the encoding method is MPEG4 and the frame to be processed is I-frame)

M=1.75 (when the encoding method is MPEG4 and the frame to be processed is P-frame)

Q: a quality factor (set to be 1 for all cases for the sake of simplicity)

When the above equation is calculated for n=1 to 5, the processing times of processes 1 to 5 are predicted. It is then checked if all the predicted processing times allow to complete processes within the unit time (step S506). In this case, the checking process in step S506 is done by:

$$(t0+P)+(t1+P)+ \ldots +(tn+P)<\text{processing unit time} \qquad (1\text{-}2)$$

where

P: a time required for parameter setting and the like in the image processor n: the process number of the requested process In this embodiment, since the frame update interval is 1/30 sec, the processing unit time is 1/30 sec, and all processes must be completed within that time. If inequality (1-2) holds after n is incremented in turn up to the currently accepted process, the condition in step S506 is satisfied, and the flow branches to YES. However, if inequality (1-2) does not hold before n is incremented to the end, the flow branches to NO.

FIG. 54 shows the process prediction state. In the processes of the first frame time in FIG. 54, it is predicted as a result of processing performance prediction that processes up to process 4 are done within the processing unit time (i.e., inequality (1-2) holds), but all processes cannot be done within the predetermined time if processes are executed up to process 5 (step S506→NO).

In such case, process priority is determined based on a policy (step S507). If the service policy of the video delivery server in this case is a priority-priority policy, and skips a process that cannot be executed within the real-time process, it is determined that process 5 with the lowest priority is not executed in the first frame time. Based on this determination result, the processes except for process 5 are executed in turn (steps S508 to S510). Upon completion of process 4, the image processor 180 enters a waiting time until the next new unit time starts (step S511).

In the processes of the second frame time in FIG. 54, since the compression process of process 3 is an I-frame process of MPEG4, the processing time becomes shorter than the first frame time, and it is determined that all processes up to process 5 can be executed (step S506→YES), thus executing all the requested processes.

Process 2 in FIG. 52 is an M-JPEG expansion process, and the processing flow upon executing process 2 will be described with reference to FIGS. 50 and 51 again.

Referring to FIG. 51, assume that a video picture is sensed by a camera 22 attached to a terminal 2c, that video signal is compressed by Motion-JPEG, and the compressed video data is input to the video delivery server 1 via the LAN 5. The video delivery system 1 receives the video data encoded by Motion-JPEG via the LAN I/F 16, and stores it in the arithmetic RAM 15. The microprocessor 13 removes a network communication header from the encoded data, shapes it into a format that can be received by the image processing apparatus 10 as an encoded data input, and then supplies the encoded data to the FIFO 203 of the image processor 180. At the same time, the microprocessor 13 informs the parameter register 164 of the contents of the requested process. When the order of the predetermined process is reached, the image processor 180 expands the encoded data 151 using the codec processor 202 in an expansion process, and outputs the expanded data to the resolution converter 201. In this embodiment, since the expanded data is output without any resolution conversion, the expanded image data 150 is passed to an output image converter 19 via the buffer 204, and is displayed on the externally connected monitor 7 after D/A conversion.

A series of processes are done in this way.

In this embodiment, the respective building components of the processing controller 160 in the image processing apparatus 10 are described as independent control units. Alternatively, a dedicated controller or the like may be prepared as the processing controller 160, and processes may be implemented by software. Furthermore, all processes of the processing controller may be implemented using dedicated software on the microprocessor 13 without preparing for any dedicated controller as the processing controller 160.

17th Embodiment

In the 16th embodiment, the predicted performance in the processing performance prediction unit is calculated using fixed prediction formulas such as equation (1-1) and inequality (1-2). However, the prediction result and actual processing time may differ depending on the contents of video data to be sensed and the like in practice.

Hence, in this embodiment, a case that adopts a feedback system which detects the difference between the prediction result and actual processing time due to a change in object to be sensed or the like, and reduces the difference will be explained using FIG. 55 and FIGS. 56A and 56B while quoting FIGS. 49 to 53. Since FIGS. 49 to 53 are common to the 16th embodiment, a description thereof will be omitted.

Figure 55:
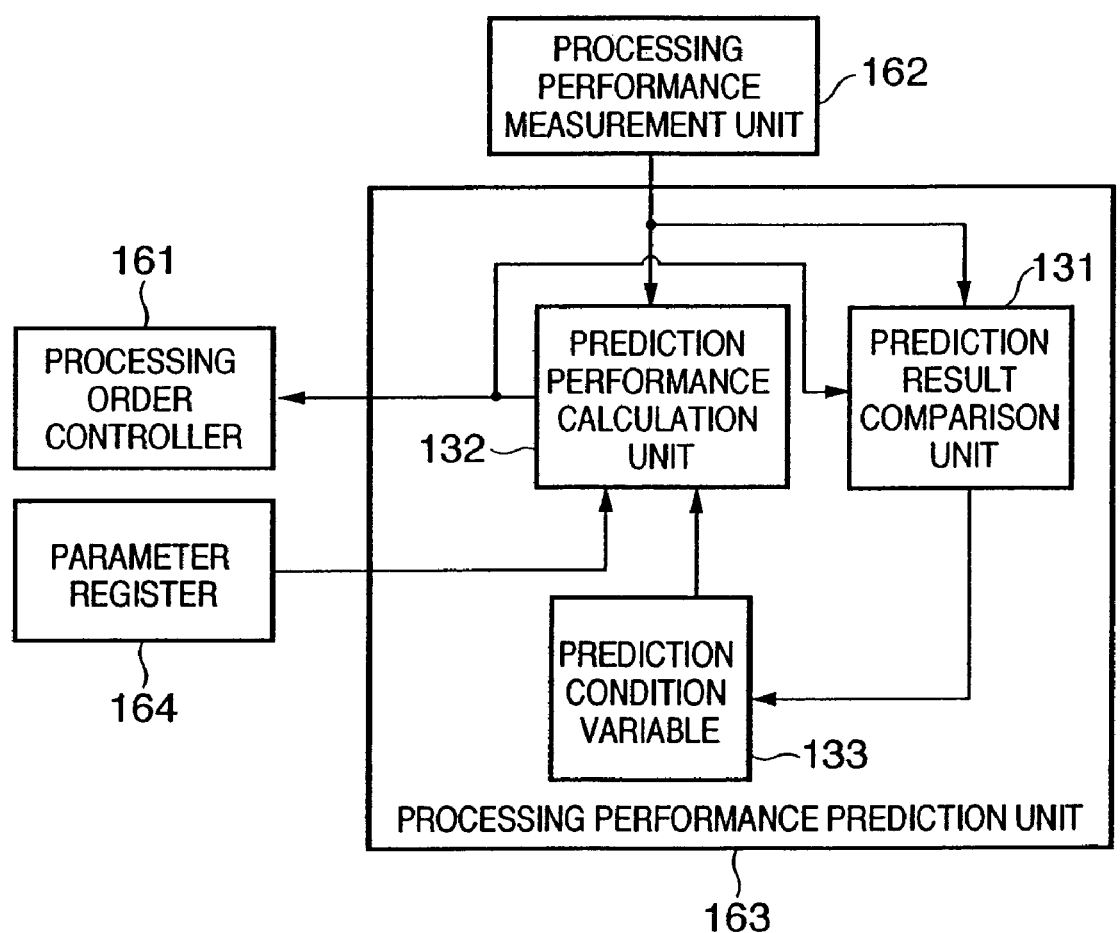
FIG. 55 is a block diagram showing the arrangement of a processing performance prediction unit in the 17th embodiment of the present invention.

FIG. 55 is a block diagram showing an example of the processing performance prediction unit 163 of this embodiment. The processing performance prediction unit 163 comprises a prediction result comparison unit 131, prediction performance calculation unit 132, and prediction condition variable storage unit 133.

Figure 56A:
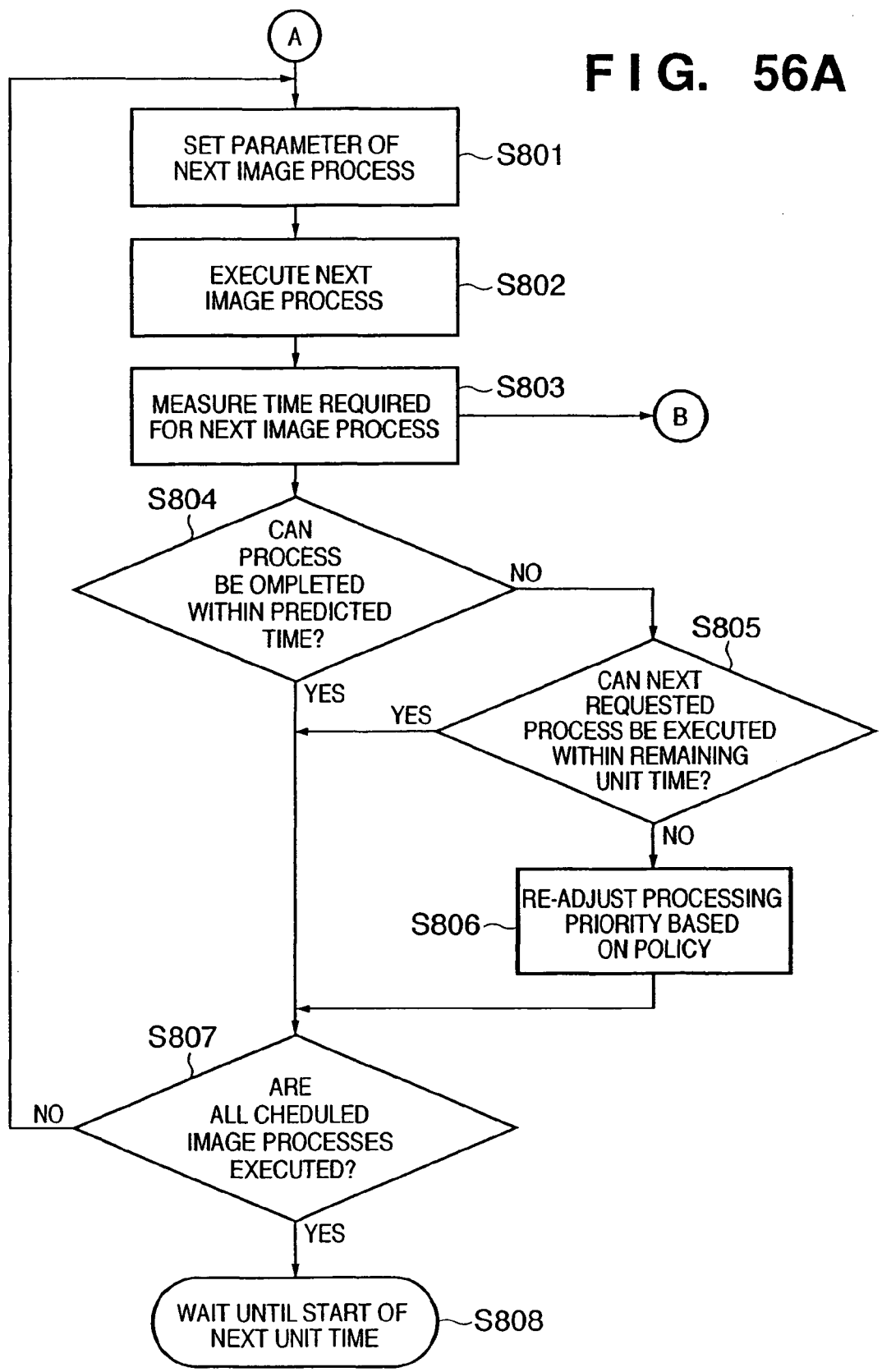
FIGS. 56A and 56B are flowcharts showing the process in an image processing apparatus in the 17th embodiment of the present invention.
Figure 56B:
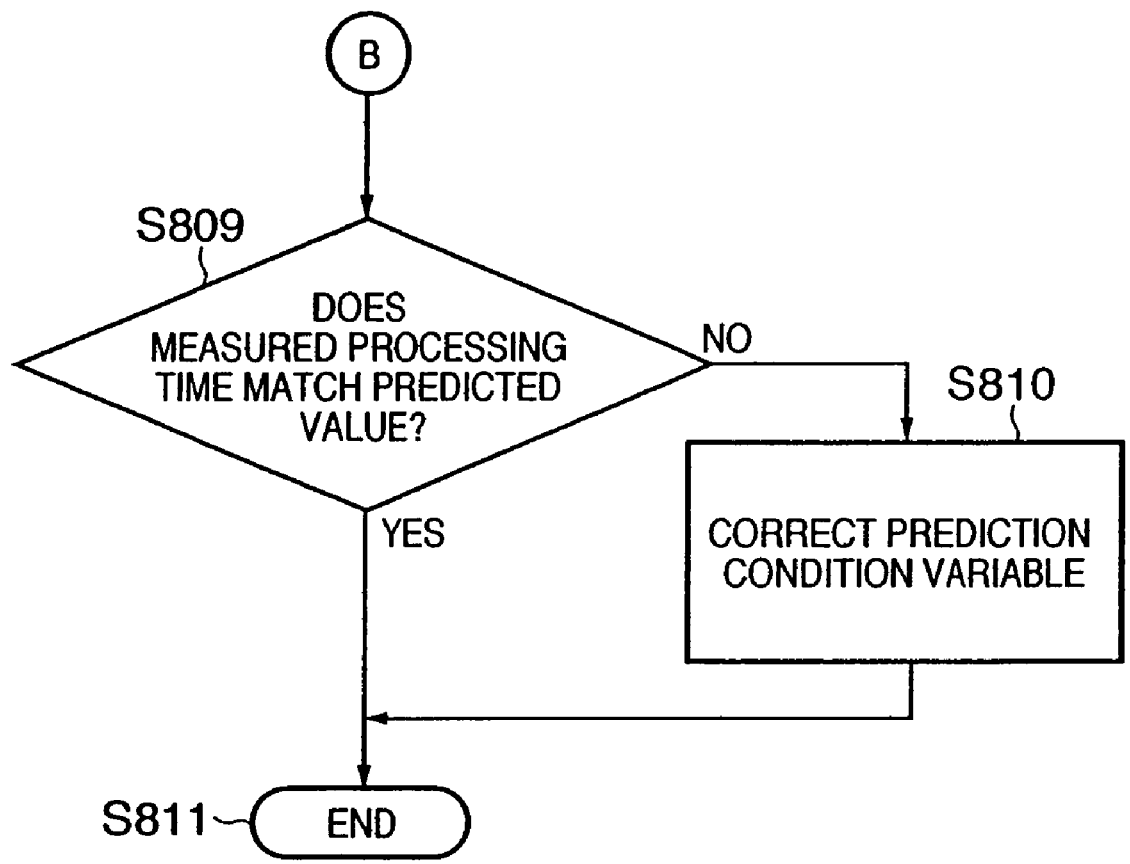

FIGS. 56A and 56B are flowcharts showing the process in the image processing apparatus 10 of this embodiment.

A mark "A" in these flowcharts indicates that the same processes as in steps (i.e., steps S501 to S507) indicated by "A" in FIG. 53 are executed. Therefore, a description of these processes will be omitted, and a description will start from the process in step S801 and subsequent steps.

Since the contents of the next process to be executed are determined until "A" (i.e., steps S501 to S507) in FIG. 53, parameters from the parameter register 164 are set in the image processor 180 in accordance with the determined contents (step S801). Upon completion of the parameter setting, the processing order controller 161 instructs the image processor 180 to execute the next process using the processing start signal 154.

Upon reception of that instruction, the image processor 180 starts an image process, and asserts the processing busy signal 153 during execution of that process (step S802). The processing performance measurement unit 162 measures the asserted time of the processing busy signal 153 (step S803). The prediction result comparison unit 131 compares the measured processing time, and the processing time predicted by the prediction performance calculation unit 132 (step S804).

If the process is complete within the predicted time (step S804→YES), the process is continued. That is, it is confirmed if all scheduled image processes are complete (step S807). If the processes to be executed still remain (step S807→NO), the flow returns to set parameters for the next image process so as to execute the next process (step S801). If all the scheduled processes have been executed, the control enters a waiting time until the next new unit time starts (step S808).

If the process is not complete yet within the predicted time (step S804→NO), it is examined if the subsequently requested processes can be done until the start of the next unit time (step S805). If the processes can be done (step S805→YES), they are executed by returning to the flow of the processes as they are scheduled previously (step S807). On the other hand, if the subsequently requested processes cannot be done until the next unit time starts (step S805→NO), process priority is determined again on the basis of the policy (step S806). This is to prevent a process with lower priority from being processed for a long period of time.

The flow of the processes of the image processor 180 is as has been described above. At the same time, the processing performance prediction unit 163 must execute a confirmation process of prediction condition variables. For this purpose, the flow also branches from step S803 to step S809 in FIG. 56, and the processing performance prediction unit 163 receives the measurement result of the asserted time of the processing busy signal 153 by the processing performance measurement unit 162 and checks if the measured processing time matches with the result previously calculated by the prediction performance calculation unit 132 within a range of a predetermined error (step S809). If the actually measured value matches the predicted value within the range of a predetermined error (step S809→YES), the flow ends without correcting the prediction condition variables (step S811). On the other hand, if the actually measured value and predicted value differ (step S809→NO), prediction condition variables are corrected to reduce their difference. As a correction method, the following one may be used.

The processing time prediction equation in the 16th embodiment is modified as follows. Assume that the encoding process of the reference process with priority 0 is Motion-JPEG. Let $R0$ be the resolution of that process, and $t0$ be the time required for the process. Then, a processing time $tn$ of a process $n$ with a resolution $Rn$ can be calculated by:

$$tn = (Rn/R0) \times r \times t0 \times M \times m \times Q \times C \qquad (1\text{-}1)$$

where
- M: a contributing factor in the encoding method
  M=1 (when the encoding method is Motion-JPEG
  M=1.05+i (when the encoding method is MPEG4 and the frame to be processed is I-frame)
  M=1.75+p (when the encoding method is MPEG4 and the frame to be processed is P-frame)
- r: a correction term of the processing time in association with the resolution ratio
- i: a correction term of the processing time upon i-frame processing of MPEG4
- p: a correction term of the processing time upon p-frame processing of MPEG4
- m: a correction term of the processing time associated with a limitation on a search range of a motion vector and the like upon p-frame processing of MPEG4
- Q: a quality factor (a correction term for difference in Q value of Motion-JPEG or the like)
- C: a correction term based on the difference between the compression and expansion processes Equation (1-1) in the 16th embodiment corresponds to equation (2-1) in which $i=p=0$ and $r=M=m=Q=C=1$, which are fixed.

When it is predicted that an image to be sensed has a motion due to a panning instruction of a camera, the processing speed can be increased by limiting the search range of a motion vector. Of the above correction terms, m is used to add such element.

The contents of the correction terms are corrected to reduce the difference between the actually measured value and predicted value, thus correcting the prediction condition variables.

18th Embodiment

The 16th and 17th embodiments relate to a process whose processing request is currently accepted. Also, in terms of delivery that keeps realtimeness of video data, how to cope with a service request as a new processing request must be taken into consideration.

Execution of the specific process as the reference process irrespective of the presence/absence of the processing request from the user of priority 0 as in the 16th embodiment does not always result in effective utilization of resources in some cases.

By contrast, in this embodiment, an example of a case using the processing performance prediction process in criteria, and an example of a case of changing the reference process depending on an accepted new process in terms of the way to cope with a new service request will be described below using FIGS. 57A and 57B, FIG. 58, and FIG. 59. Since other figures are common to the 16th and 17th embodiments, a description thereof will be omitted. However, assume that the resolution of an input image input from the camera 18 is an XGA size (1024×768).

FIG. 57A shows a parameter list of processes requested to the video delivery server 1 at given time 1. At the timing of time 1, three processes (processes 0 to 2) are being executed on the image processing apparatus 10. A process executed when the a request of new process 3 is generated by the user will be described below with reference to the flowchart of FIG. 58.

Figure 58:
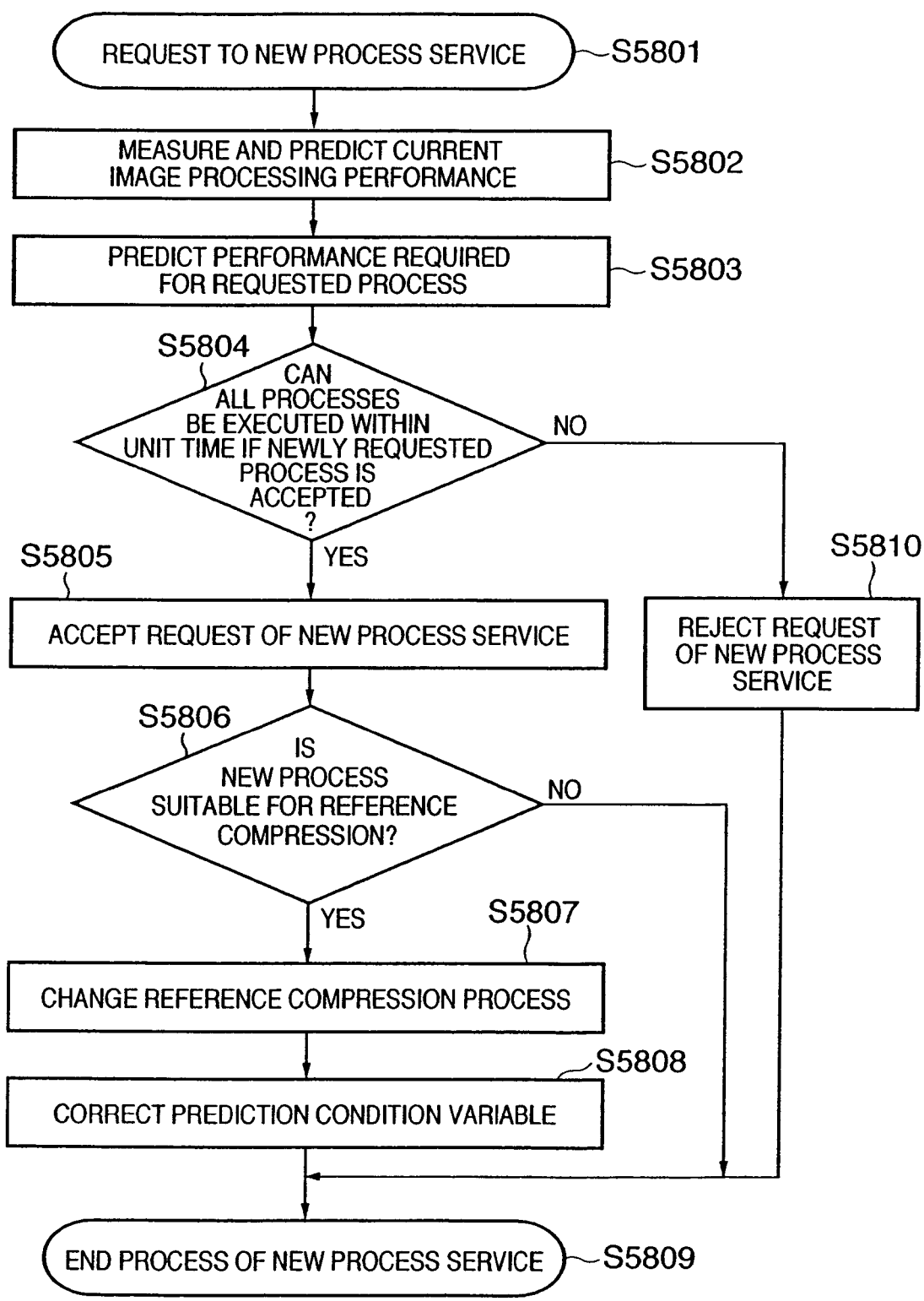
FIG. 58 is a flowchart showing the flow of a process upon determining whether or not a new demand process is accepted in the 18th embodiment of the present invention.

Referring to FIG. 58, if a new processing service request is generated (step S5801), the image processing apparatus 10 executes measurement and/or prediction of the processing performance required for the currently accepted image processes as a whole (step S5802). In this case, the actually measured result of the reference process (process 0 at the timing of time 1) and the prediction results of other processes derived based on the actually measured result may be used, or the measured results of all the currently accepted image processes may be used if the new service request can wait.

On the other hand, the processing performance prediction unit 163 estimates the processing performance of the image processing apparatus 10 required for the newly requested process on the basis of parameters of the newly requested process and the actually measured result of the reference process (step S5803).

It is then estimated if all processes can be done with the unit time even when the newly requested process is accepted (step S5804). In case of this embodiment, since the processing time relatively has a margin, and the resolution of the requested new process is small and does not influence the processing performance of the image processor (step S5804→YES), the new service request is accepted (step S5805).

If the new service request is accepted, and if no absolute reference process of priority 0 is present, it is in turn checked if the newly accepted process (process 3 in this case) is suitable for the reference process (step S5806). At the timing of time 1, process 0 is selected as the reference process and priority 1 higher by one level than other processes 1 and 2 is assigned to process 0. Upon comparison between processes 0 and 3, they are the Motion-JPEG process, but process 3 has a smaller resolution than process 0. If there is a selection policy of the reference process of the video delivery server 1, which preferably selects a process with a smaller resolution as the reference process, it is determined that process 3 should be adopted as the reference process (step S5806→YES). In this case, the reference process is changed (step S5807), and the priority values of processes are changed. Since the reference process has been changed, prediction condition variables are corrected at the same time (step S5808). Then, a series of processes for the new processing service end (step S5809).

A case will be examined below wherein three new processing requests are given to the video delivery server 1 at time 2 some time after time 1. FIG. 58B shows a parameter list of processes requested to the video delivery system 1 at time 2. As processes at the timing of time 2, four processes (processes 0 to 3) are being executed on the image processing apparatus 10. Upon comparison with FIG. 57A, since the reference process has been changed from process 0 to process 3, the priority value of process 3 is changed to 1, and those of other processes are changed to 2.

A process executed when requests of new processes 4 to 6 are generated from the users will be described below using FIGS. 58 and 59.

Figure 59:
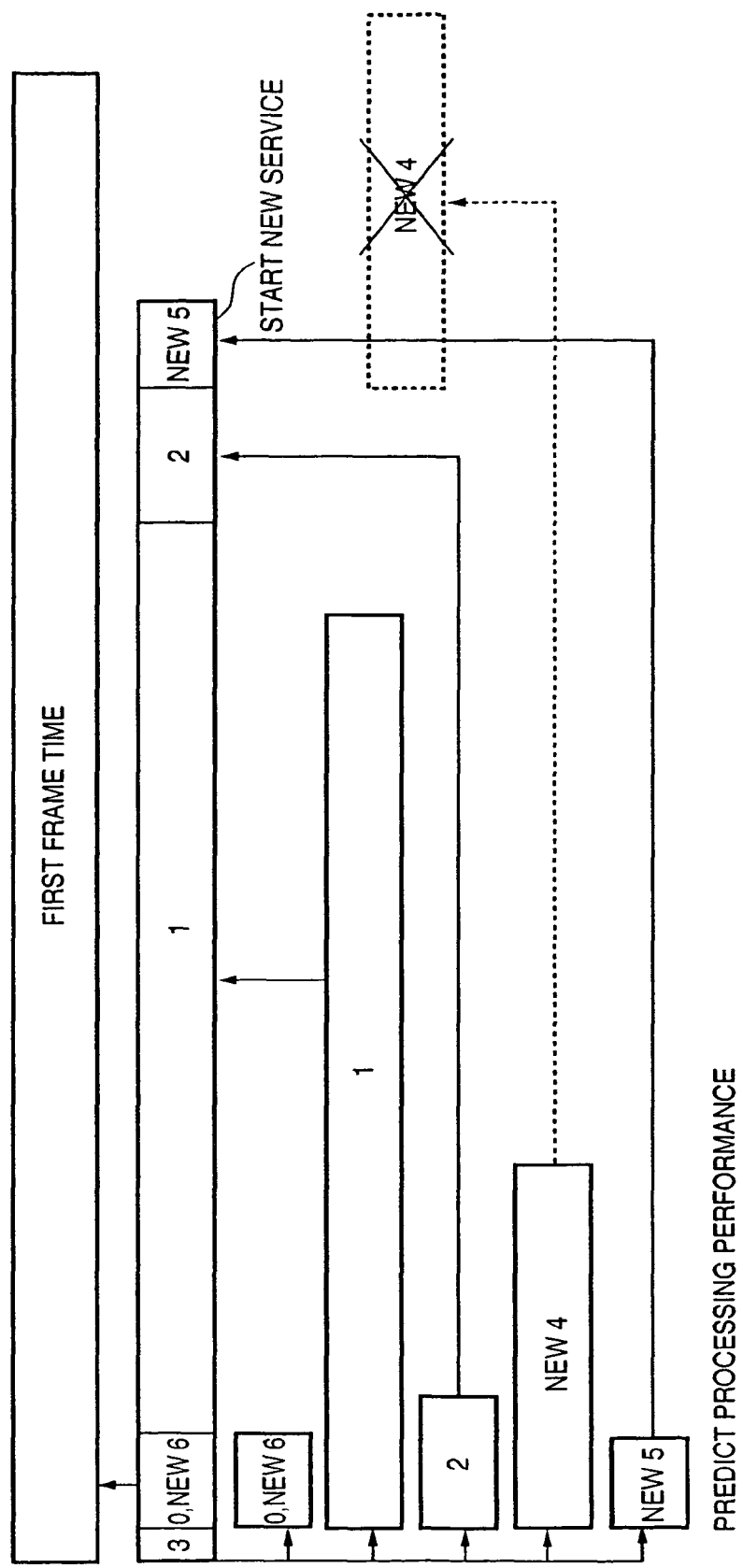
FIG. 59 is a view showing the processing performance prediction result in the 18th embodiment of the present invention.

FIG. 59 shows the prediction results of the times required to process the new processing requests via steps S5801 to S5803 in FIG. 58. As can be seen from FIGS. 57B and 59, when process 4 of the new processing requests is executed, it becomes impossible to complete processes within the unit time (step S5804→NO). Hence, the new processing service request of process 4 is rejected (step S5810). As for process 5, since it is determined from FIG. 59 that all processes can be done within the unit time if that process is added (step S5804→YES), the new processing service request of process 5 is accepted. However, since process 5 has a larger resolution than process 3 as the reference process at the timing of time 2, the reference process remains unchanged (step S5806→NO).

Since process 6 has the same compression method, resolution, and quality as those of process 0 except for a request frame rate, it is determined that the request is complied with by copying encoded data as the output result of the image compression process executed in process 0 on the arithmetic RAM 15 and outputting it onto the network. For this reason, since a service can be added without setting any new process in the image processing apparatus, this process 6 is added as a new processing service. However, process 6 is merged with process 0 on the parameter list, and the connection count of process 0 is indicated by 10.5, thus deleting an entry of process 6.

19th Embodiment

In the 16th to 18th embodiments, an image compression process used in actual delivery is used as the reference process upon making performance prediction. However, various methods of selecting the reference process may be used.

For example, when this video delivery server 1 also performs image storage for monitoring at the same time, that process can be adopted as the reference process. Upon executing video storage for monitoring, since the process must be done within a real time so as to eliminate any video capture failure, a limitation of the load on the image processing apparatus by means of prediction of the processing time in this proposal is effective. FIG. 60 shows an example of such case.

FIG. 60 shows a parameter list of requested processes in this embodiment. In this example, process 1 undergoes a top-priority process since it is video storage for monitoring. For this reason, process 1 is handled as priority 0 since its connection count is zero. In such case, this process 1 is handled as the reference process of performance prediction so as to effectively utilize the system processing performance. An image processed by process 1 is stored on the storage PC card 172.

In this example, process 1 is currently used in only image storage, but video data obtained by process 1 can also be used in delivery.

20th Embodiment

The processing performance prediction function is very effective when the processing performance of the image processing apparatus is variable. An example of such case will be explained below using FIGS. 61 and 62.

Figure 61:
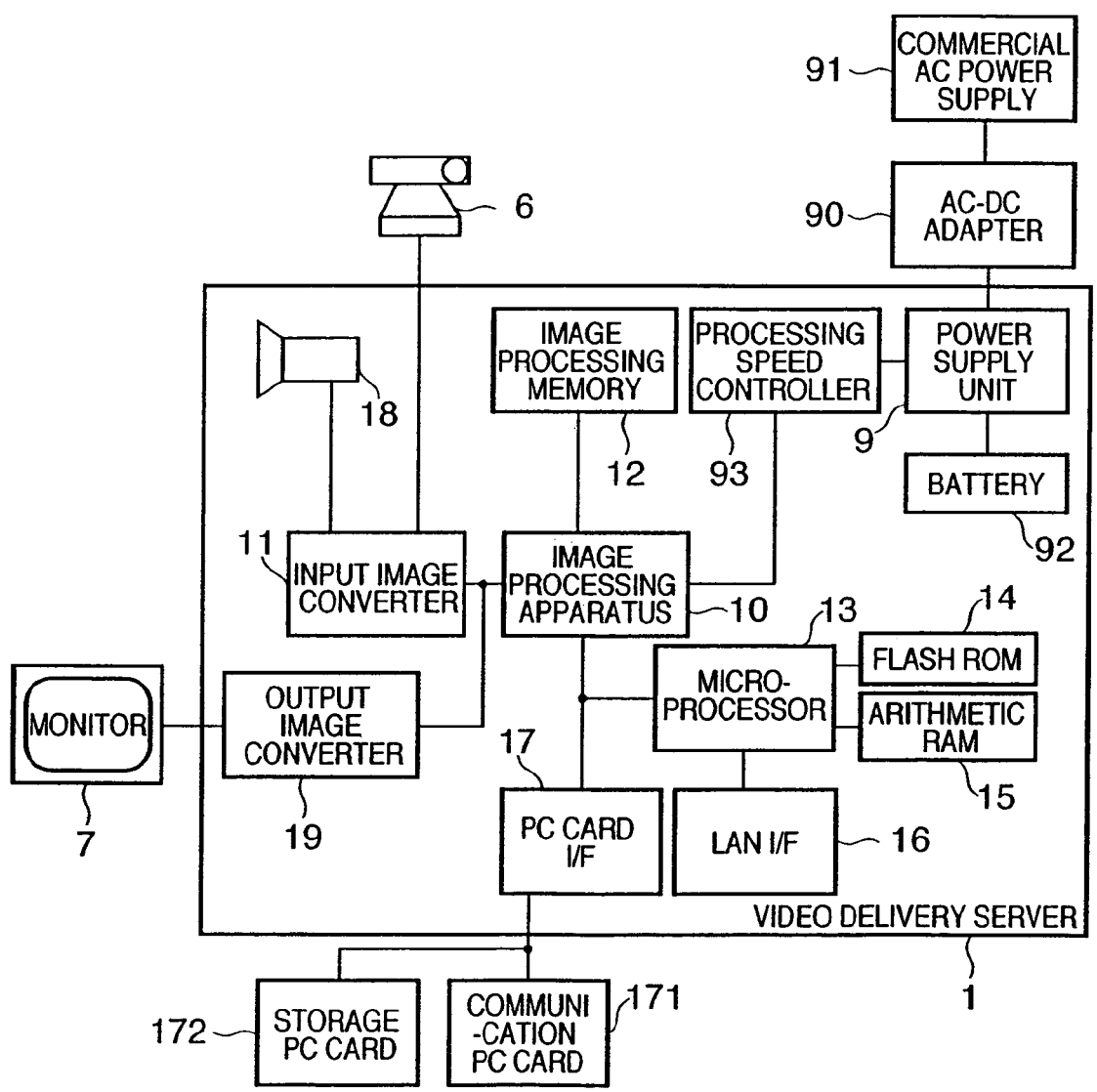
FIG. 61 is a block diagram showing the arrangement of a video delivery system according to the 20th embodiment of the present invention.

FIG. 61 is a block diagram showing an example of the arrangement of the video delivery server 1 when the processing performance of the image processing apparatus is variable. As building components in FIG. 61 which are different from those in FIG. 51, a battery 92 is connected to the power supply unit 9, a processing speed controller 93 is connected to the power supply unit 9, and a signal line used to control the processing speed of the image processor is connected from the processing speed controller 93 to the image processing apparatus 10.

Referring to FIG. 61, the power supply unit 9 monitors how to implement power supply to the video delivery server 1. If electric power is mainly supplied from the battery 92, the power supply unit 9 executes, e.g. control for lowering the frequency of clocks supplied to the image processing apparatus 10 using the processing speed controller 93 so as to decrease consumption power of the video delivery server 1, thus attaining power savings of the battery 92.

When the processing speed controller 93 lowers the frequency of clocks supplied to the image processing apparatus 10, the image processing performance of the image processing apparatus 10 drops, and it becomes difficult to execute all processes that can be executed before the frequency is lowered. FIG. 62 shows a parameter list of processes in consideration of such case. In this list, a flag indicating if a process requires consideration of realtimeness is set in a parameter of quality 3. In this embodiment, a realtimeness request parameter is set in processes 0 and 1. Since processes 0 and 2 have the same priority of processes, processing performance is preferentially distributed to processes 0 and 1 due to the presence of this parameter when the processing performance of the image processing apparatus 10 lowers. More specifically, process 1 is executed as the reference process first, the processing times of processes 1 to 5 are predicted on the basis of the measurement result of its processing performance, and the processing performance of the image processing apparatus 10 is distributed in the order of processes 0, 2, 3, 4, and 5 within the range that allows services in real time. (Which of processes 4 and 5 is preferential cannot be determined based on only information of this parameter list, and another priority policy is used.)

21st Embodiment

Figure 63:
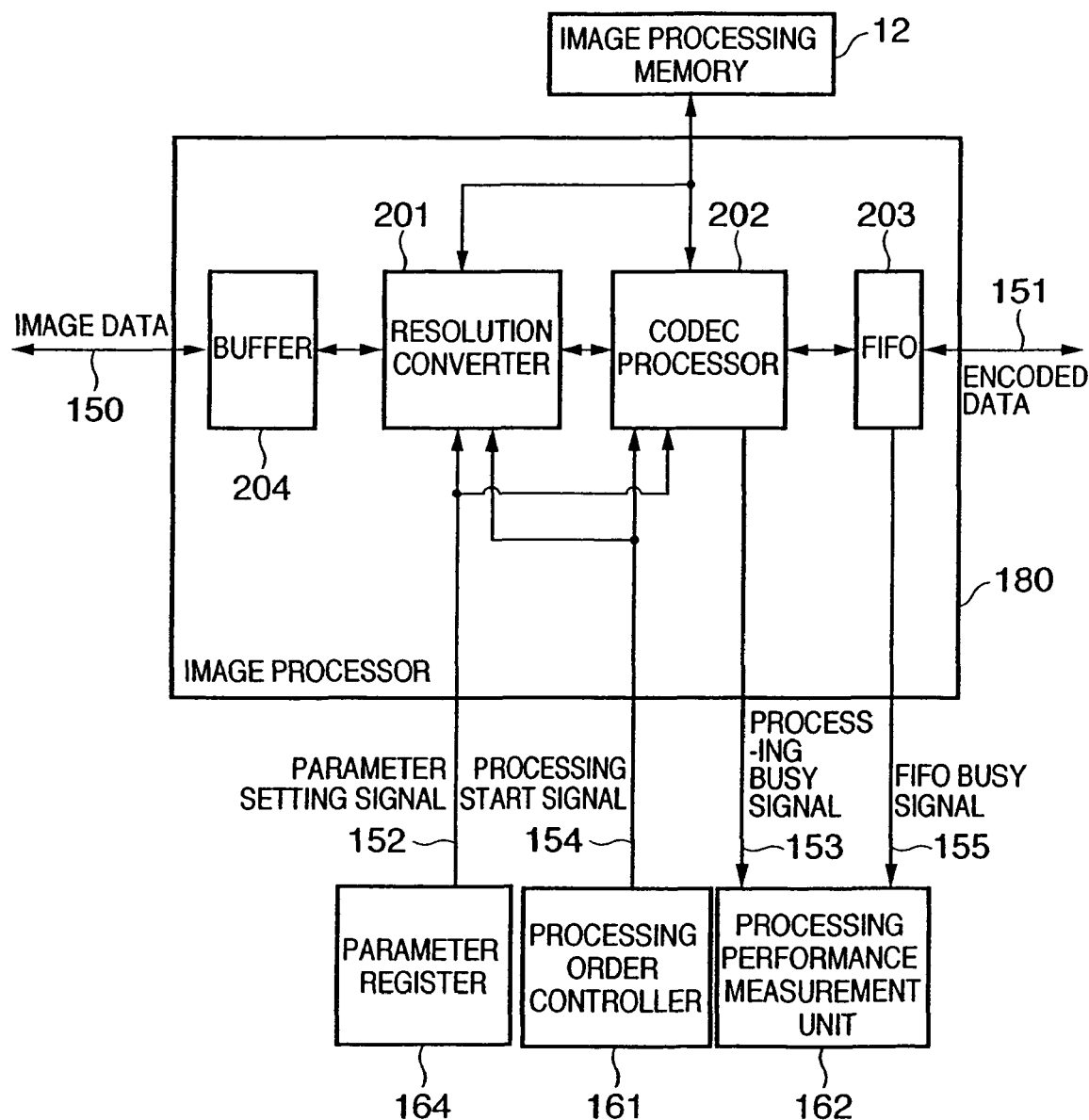
FIG. 63 is a block diagram showing the detailed arrangement of an image processor in the image processing apparatus according to the 21st embodiment of the present invention.

In the 16th to 20th embodiments, the processing busy signal 153 which indicates execution of the process of the codec processor 202 is mainly used as a criterion of the processing performance. However, the processing performance of the image processor 180 is determined not only by the use condition of the coded processor 202. FIG. 63 shows an example of such case.

FIG. 63 is a block diagram showing the arrangement of the image processor 180 of this embodiment. As can be seen from comparison with FIG. 50, a FIFO busy signal 155 output from the FIFO 203 is input to the processing performance measurement unit 162 in addition to the processing busy signal 153 output from the codec processor 202 in FIG. 63.

The FIFO busy signal 155 is a signal line that notifies the busy level and the like of an internal bus used upon transferring the encoded data 151 output from the codec processor 202 to the arithmetic RAM 15 connected to the microprocessor 13. In general, when a compression method such as Motion-JPEG or the like is used, if the Q value as a quality parameter used to adjust the image quality after compression is changed, the encoded data size output from the codec processor 202 changes accordingly. For this reason, that busy level or the like of the bus upon transferring the encoded data changes according to the data transfer size. In some cases, data cannot be transferred within one unit processing time. In such case, even when the processing performance of the codec processor 202 is sufficient, the realtimeness of processing is consequently lost. The FIFO busy signal 155 is used to indicate the transfer processing performance between the FIFO 203 and arithmetic RAM 15. This signal notifies the processing performance measurement unit 162 of information which indicates if the data transfer between the FIFO 203 and arithmetic RAM 15 is performed smoothly, the data size transferred between the FIFO 203 and arithmetic RAM, and so forth. The processing performance measurement unit 162 determines the processing performance actually required for the processing of the image processor 180 as a whole on the basis of both such processing information associated with data transfer and the processing busy signal 153 indicating the use condition of the codec processor 202, and passes the determination result to the processing performance prediction unit 163 when it is used.

22nd Embodiment

In the above embodiments, the image data 151, which is input image converter 11 to the image processing apparatus 10 so as to undergo a compression process, is temporarily stored in the buffer 204 for one frame, and is read out and processed at high speed, so that a plurality of image processes are implemented within a unit time required to input image data for one frame.

By contrast, this embodiment implements an equivalent process without any image storage for one frame in the buffer 204. Such example will be described using FIG. 64.

Figure 64:
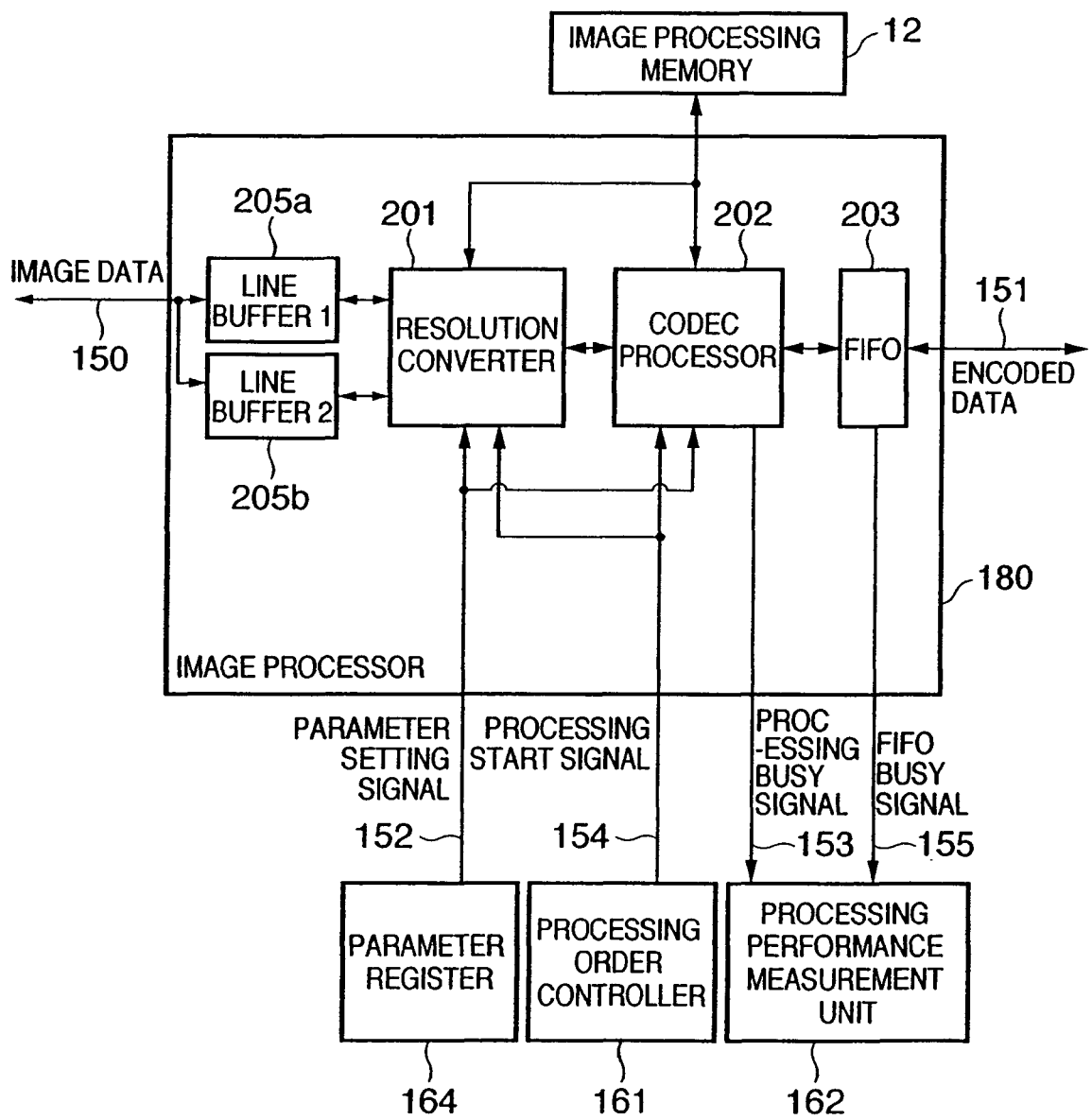
FIG. 64 is a block diagram showing the detailed arrangement of an image processor in the image processing apparatus according to the 22nd embodiment of the present invention.

Referring to FIG. 64, line buffers 205a and 205b are prepared in place of the buffer 204 unlike in FIGS. 50 and 63. Each of these line buffers 205a and 205b has a width twice the horizontal maximum value of the image size which is input according to the format of, e.g., Y:U:V=4:2:2, and can save data for 16 lines. If data of the XGA size is input as image data in this embodiment, since the line buffer size is 1024×2=2048, 2048 bytes×16 lines can be stored.

The image data 150 are alternately input to the line buffers 205a and 205b every 16 lines. When data for 16 lines are stored in the line buffer, the resolution converter 201 reads out the data at high speed, converts them into blocks according to a compression process, and supplies them to the codec processor 202. At the same time, the resolution converter 201 applies the resolution conversion process to the data to convert into the resolution for the required compression process. The resolution conversion process result is stored in the image processing memory 12.

In this case, as the reference process, it is desirable in terms of optimization of the whole processing performance to use a process with a possible maximum resolution so as to minimize the load on the data read process. When such process is done, prediction or the like of the processing performance on the basis of the reference process is performed for each line buffer. Upon completion of the reference process for each line buffer, the codec processor 202 reads out data of the required resolution from the image processing memory 12 in accordance with the prediction result, and sequentially performs the next conversion process. In this case, the prediction result of the first line buffer is applied to the process of the other line buffer of the identical frame. If a problem occurs upon processing of the other line buffer of the identical frame on the basis of the prediction result of the first line buffer, the prediction result of the process upon occurrence of the problem is re-examined, and that result is applied to the process of the identical frame.

According to the 16th to 22nd embodiments described above, in a video delivery system such as a network camera server which is used in a monitoring system that places an importance on realtimeness, whether or not a process required from the user to the image processing apparatus is complete within a predetermined unit time can be determined. In this way, when connection requests with various resolutions, compression methods, and qualities from a plurality of users are input at the same time in the video delivery system, processes which can be completed in real time can be determined. As a result, video delivery services can be provided to a plurality of users without losing realtimeness.

Furthermore, since services are implemented without parallelly mounting a plurality of processing units, the services can be provided without limiting the contents (the types, resolutions, Q values, and frame rates of video compression methods) of services by the number of processing units and the like in advance within the range in which the realtimeness is not lost.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-136022 filed Apr. 30, 2004, Japanese Patent Application No. 2004-136023 filed Apr. 30, 2004, and Japanese Patent Application No. 2004-136019 filed Apr. 30, 2004, which are hereby incorporated by reference herein.

What is claimed is:

1. A video delivery apparatus for delivering a video stream to clients, comprising:
   an input unit configured to input video data from an image sensing device;
   a processing unit configured to process the video data to generate the video stream to be delivered to the clients;
   a control unit configured to control a direction of the image sensing device;
   a reception unit configured to receive from a first client a request including a control request of the image sensing device and a delivery request of the video stream;
   a determining unit configured to determine whether the video stream corresponding to the delivery request is to be delivered to the first client in accordance with a first processing load based on a sum total of the processing loads of the processing unit to generate the video stream to be delivered to other clients, a second processing load of the control unit to control the image sensing device, and a third processing load of the processing unit to generate the video stream to be delivered to the first client, wherein the first processing load is related to a resolution of the video stream to be delivered to other clients and the third processing load is related to a resolution of the video stream corresponding to the delivery request; and
   a delivery unit configured to deliver the video stream corresponding to the delivery request to the first client in accordance with the determination by the determining unit.

2. The apparatus according to claim 1, further comprising:
   an estimation unit configured to estimate the first processing load based on whether the other clients control the image sensing device.

3. The apparatus according to claim 1, wherein said determining unit includes:
   a calculation unit configured to calculate a difference between a predetermined upper limit value and the first processing load as a reserve capacity;
   an extraction unit configured to extract candidates of video streams which can be provided within a range of the reserve capacity calculated by said calculation unit; and
   a notification unit configured to notify to the first client the candidates extracted by the extraction unit.

4. The apparatus according to claim 3, wherein
   the extraction unit extracts candidates of video stream in accordance with the decrease of the number of the other clients, and
   the notification unit notifies the first client of the candidates extracted by the extraction unit in a case where at least one of the candidates of video stream which can be provided within the range of the reserve capacity is changed.

5. The apparatus according to claim 1, wherein said delivery control unit delivers the video stream and a control right of the image sensing device to the first client in a case where the determining unit determines that delivering the video stream and controlling the image sensing device are allowable in accordance with the first, second, and third processing loads, and
   delivers the video stream and does not deliver the control right to the first client in a case where the determining unit determines that delivering the video stream is allowable without allowing controlling the image sensing device in accordance with the first, second, and third processing loads.

6. The apparatus according to claim 1, wherein the delivery unit delivers a message to at least one of the other clients for asking whether video stream delivering can be changed to a video stream of which processing load is smaller the requested video stream in a case where the sum total of the first processing load, the second processing load, and third processing load is higher than a predetermined upper limit value, and changes video stream delivering to at least one of the other clients to the video stream of which processing load is smaller the requested video stream and delivering the video stream to the first client according to the response from at least one of the other clients.

7. The apparatus according to claim 1, further comprising:
   storage unit configured to store a priority-dependent load information based on the processing load of the processing unit to acquire the video stream and priority of the video stream;
   wherein the delivery unit delivers, in a case where the determining unit determines that delivering a first video stream corresponding to the request from the first client is not allowable based on first priority-dependent load information of the video stream delivering to the other clients and second priority-dependent load information of the first video stream, a second video stream which is determined that delivering is allowable based on the first priority-dependent load information and a third priority-dependent load information of the second video stream.

8. The apparatus according to claim 1, wherein
   the control unit executes a camera control program for controlling the direction of the image sensing device in accordance with reception of the control request, and
   the second processing load is related to a processing load to execute the camera control program.

9. A video delivery method for delivering a video stream to clients, comprising:
   an input step of inputting video data from an image sensing device;
   a processing step of processing the image data to generate the video stream to be delivered to the clients;
   a controlling step of controlling a direction of the image sensing device;

a reception step of receiving from a first client a request including a control request of the image sensing device and a delivery request of the video stream;

a determining step of determining whether the video stream corresponding to the delivery request is to be delivered to the first client in accordance with a first processing load based on a sum total of the processing loads of the processing step to generate the video stream to be delivered to other clients, a second processing load of the controlling step to control the image sensing device, and a third processing load of the processing step to generate the video stream to be delivered to the first client, wherein the first processing load is related to a resolution of the video stream to be delivered to other clients and the third processing load is related to a resolution of the video stream corresponding to the delivery request; and a delivery step of delivering the video stream corresponding to the delivery request to the first client in accordance with the determination by the determining step.

10. The method according to claim 9, wherein said determining step includes:

a calculating step of calculating a difference between a predetermined upper limit value and the first processing load as a reserve capacity;

an extracting step of extracting candidates of video streams which can be provided within a range of the reserve capacity calculated by said calculating step; and a notifying step of notifying to the first client the candidates extracted in the extracting step.

11. The method according to claim 10, wherein the extracting step extracts candidates of video stream in accordance with the decrease of the number of the other clients, and the notifying step notifies the first client of the candidates extracted in the extracting step in a case where at least one of the candidates of video stream which can be provided within the range of the reserve capacity is changed.

12. The method according to claim 9, wherein the controlling step executes a camera control program for controlling the direction of the image sensing device in accordance with reception of the control request, and the second processing load is related to a processing load to execute the camera control program.

13. A non-transitory computer-readable storage medium storing a program for controlling a video delivery server that delivers a video stream to clients, comprising:

a code of an input step of input video data from an image sensing device;

a code of a processing step of processing the video data to generate the video stream to be delivered to the clients;

a code of a controlling step of controlling a direction of the image sensing device;

a code of a reception step of receiving from a first client a request including a control request of the image sensing device and a delivery request;

a code of a determining step of determining whether the video stream corresponding to the delivery request is to be delivered to the first client in accordance with a first processing load based on a sum total of the processing loads of the processing step to generate the video stream to be delivered to other clients, a second processing load of the controlling step to control the image sensing device, and a third processing load of the processing step to generate the video stream to be delivered to the first client, wherein the first processing load is related to a resolution of the video stream to be delivered to other clients and the third processing load is related a resolution of the video stream corresponding to the delivery request; and a code for a delivery step of delivering the video stream corresponding to the delivery request to the first client in accordance with the determination by the determining step.

14. The storage medium according to claim 13, wherein said delivery step includes a calculating step of calculating a difference between a predetermined upper limit value and the first processing load as a reserve capacity;

an extracting step of extracting candidates of video streams which can be provided within a range of the reserve capacity calculated by said calculating step; and a notifying step of notifying to the first client the candidates extracted in the extracting step.

15. The storage medium according to claim 14, wherein the extracting step extracts candidates of video stream in accordance with the decrease of the number of the other clients, and the notifying step notifies the first client of the candidates extracted in the extracting step in a case where at least one of the candidates of video stream which can be provided within the range of the reserve capacity is changed.

* * * * *